(12) United States Patent
Kanada et al.

(10) Patent No.: US 11,711,004 B2
(45) Date of Patent: Jul. 25, 2023

(54) AXIAL GAP MOTOR WITH CURVED ROTOR AND STATOR CORES

(71) Applicant: TOYOTA JIDOSHA KABUSHIKI KAISHA, Toyota (JP)

(72) Inventors: Keiu Kanada, Miyoshi (JP); Kazuaki Haga, Toyota (JP); Toshimitsu Takahashi, Toyota (JP); Mayumi Takazawa, Okazaki (JP); Takuya Nomura, Kasugai (JP); Shinya Sano, Toyota (JP); Takeshi Tomonaga, Nisshin (JP); Hisanori Koma, Miyoshi (JP); Yasuhide Yagyu, Nagakute (JP); Kensuke Komori, Toyota (JP); Tatsuhiko Hirano, Toyota (JP); Masaaki Ito, Anjo (JP); Hiroaki Wakimoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 166 days.

(21) Appl. No.: 17/227,653

(22) Filed: Apr. 12, 2021

(65) Prior Publication Data
US 2021/0328490 A1    Oct. 21, 2021

(30) Foreign Application Priority Data

Apr. 17, 2020 (JP) ................................ 2020-073864
Jul. 16, 2020 (JP) ................................ 2020-122246
Feb. 16, 2021 (JP) ................................ 2021-022700

(51) Int. Cl.
*H02K 1/18*     (2006.01)
*H02K 21/24*   (2006.01)
(Continued)

(52) U.S. Cl.
CPC ............. *H02K 21/24* (2013.01); *H02K 1/182* (2013.01); *H02K 1/2793* (2013.01); *H02K 1/28* (2013.01); *H02K 2213/03* (2013.01)

(58) Field of Classification Search
CPC ...... H02K 1/141; H02K 1/143; H02K 1/2793; H02K 1/2795; H02K 1/2796;
(Continued)

(56) References Cited

U.S. PATENT DOCUMENTS 4,973,868 A * 11/1990 Wust ........................ H02K 1/27
                                                              310/90
11,594,946 B2 * 2/2023 Haga ........................ H02K 1/182
(Continued)

FOREIGN PATENT DOCUMENTS

CN    105827027 A  *  8/2016 ............... H02K 1/02
JP    2004-015976 A    1/2004
(Continued)

OTHER PUBLICATIONS

Machine Translation of CN 105827027 A (Year: 2016).*

*Primary Examiner* — Dang D Le
(74) *Attorney, Agent, or Firm* — Sughrue Mion, PLLC

(57) ABSTRACT

In an axial gap motor, a rotor includes a plurality of rotor cores fixed in a circumferential direction of a rotor base, and a stator includes a plurality of stator cores fixed in a circumferential direction of a stator base, and coils wound around the stator cores. End faces of each of the rotor cores and end faces of the corresponding stator core are opposed to each other while being exposed to each other.

13 Claims, 41 Drawing Sheets

(51) Int. Cl.
*H02K 1/2793* (2022.01)
*H02K 1/28* (2006.01)

(58) Field of Classification Search
CPC .......... H02K 1/2798; H02K 1/28; H02K 1/30;
H02K 1/182; H02K 15/02; H02K 15/022;
H02K 15/028; H02K 16/02; H02K
16/025; H02K 21/24
USPC .......... 310/156.32, 156.38, 156.45, 216.023,
310/216.037
See application file for complete search history.

(56) References Cited

U.S. PATENT DOCUMENTS

| 2004/0075358 | A1* | 4/2004 | Furuse | H02K 16/02 |
| | | | | 310/156.32 |
| 2015/0048713 | A1* | 2/2015 | Caamano | H02K 1/148 |
| | | | | 310/216.106 |
| 2019/0214179 | A1* | 7/2019 | Pyrhönen | H01F 41/02 |
| 2020/0153293 | A1* | 5/2020 | Huang | H02K 1/2793 |
| 2021/0044162 | A1* | 2/2021 | Maruyama | H02K 21/24 |

FOREIGN PATENT DOCUMENTS

| JP | 2004166354 A | 6/2004 |
| JP | 2004-222384 A | 8/2004 |
| JP | 2018-033281 A | 3/2018 |

* cited by examiner

AXIAL GAP MOTOR WITH CURVED ROTOR AND STATOR CORES

CROSS-REFERENCE TO RELATED APPLICATIONS

This application claims priority to Japanese Patent Application No. 2020-073864 filed on Apr. 17, 2020, Japanese Patent Application No. 2020-122246 filed on Jul. 16, 2020, and Japanese Patent Application No. 2021-022700 filed on Feb. 16, 2021, each incorporated herein by reference in its entirety.

BACKGROUND

1. Technical Field

The disclosure relates to an axial gap motor including a rotor fixed to a rotary shaft, and a stator opposed to the rotor in an axial direction of the rotary shaft, with a gap provided between the rotor and the stator.

2. Description of Related Art

An axial gap motor is known which includes a rotor fixed to a rotary shaft, and a stator opposed to the rotor in the axial direction of the rotary shaft, with a gap provided between the rotor and the stator (see, for example, Japanese Unexamined Patent Application Publication No. 2018-33281 (JP 2018-33281 A)). In JP 2018-33281 A, an axial gap motor including a rotor fixed to a rotary shaft, and stators located with gaps from the rotor such that the rotor is interposed between the stators in the axial direction of the rotary shaft, is described. The rotor includes a rotor frame (rotor base), and a plurality of magnet pieces fixed in the circumferential direction of the rotor frame. The stator includes a plurality of cut cores (stator cores) arranged in the circumferential direction, and coils having conducting wires wound around the cut cores. The cut cores are formed by dividing a wound core formed by winding a strip-shaped magnetic material into a plurality of turns, into two segments. The cut cores of each stator are positioned such that end faces of the cut cores are opposed to the magnet pieces of the rotor with gaps provided therebetween.

SUMMARY

In the axial gap motor of JP 2018-33281 A, the magnetic pieces of the rotor pass through between the stator cores of the two stators. At this time, if the rotor rotates at a high speed, back electromotive force is generated in the coils of the stator due to movement of the magnets, and the electric power consumption during high-speed rotation is increased. Also, a precious, rare-earth element is used as a material of the magnets; thus, it is not desirable to use the magnets.

This disclosure provides an axial gap motor that does not use magnets, so as to prevent back electromotive force from being generated in coils.

One aspect of the disclosure is concerned with an axial gap motor including a rotor fixed to a rotary shaft, and a stator opposed to the rotor in an axial direction of the rotary shaft with a gap provided between the stator and the rotor. The rotor includes a rotor base made of a non-magnetic material, and a plurality of rotor cores fixed and arranged in a circumferential direction of the rotor base, and the stator includes a stator base made of a non-magnetic material, a plurality of stator cores fixed and arranged in a circumferential direction of the stator base, and coils wound around the stator cores. Each of the rotor cores is made of a soft magnetic material, and has a first end face and a second end face. The rotor cores are curved, such that the first end face and the second end face face in the same direction. Each of the stator cores is made of a soft magnetic material, and has a third end face and a fourth end face. The stator cores are curved, such that the third end face and the fourth end face face in the same direction. The first end face and the second end face of each of the rotor cores and the third end face and the fourth end face of each of the stator cores are in exposed states. The first end face and the second end face of each of the rotor cores are respectively opposed to the third end face and the fourth end face of a corresponding one of the stator cores.

In the axial gap motor according to the above aspect of the disclosure, the two end faces of the rotor core and the two end faces of the stator cores are opposed to each other such that they are exposed to each other. With this arrangement, magnetic flux is generated in the stator core when the coils wound around the stator core are energized. With the magnetic flux thus generated in a given stator core, the rotor core is drawn to a position opposed to the given stator core due to the magnetic flux, so that the rotor core is rotated by a given angle. Then, energization of the coils on the given stator core is stopped, and magnetic flux is generated in an adjacent stator core, so that the rotor core is drawn to a position opposed to the adjacent stator core due to the magnetic flux, so that the rotor core is further rotated by the given angle. By repeating this operation, the rotor is continuously rotated. In this axial gap motor, magnets (permanent magnets) are not used; therefore, even when the rotor is rotated at a high speed, no back electromotive force is generated in the coils of the stator, and electric power consumption is less likely or unlikely to be increased during high-speed rotation.

More specifically, in the case where a general interior permanent magnet (IPM) motor, or the like, having magnets is used as a drive motor for a hybrid vehicle, for example, when the vehicle travels at a high speed mainly with the engine, a rotor of the motor coupled to an output shaft of the engine rotates in accordance with rotation of the output shaft, so that the magnets of the rotor are rotated, and back electromotive force is generated in the coils due to magnetic fields caused by the magnets. As a result, force (load) is generated in the rotor, in a direction opposite to that of engine torque, and the amount of fuel consumed for ensuring necessary torque is increased, resulting in reduction of the fuel efficiency. Thus, electric current is passed through the coils when the stator is positioned in synchronization with (opposed to) the magnet, so as to generate a reverse magnetic field that acts against the magnetic field generated by the magnet (so-called field weakening is performed). As a result, the back electromotive force caused by rotation of the magnets is reduced, and the fuel efficiency is less likely or unlikely to be reduced. At this time, since current is passed through the coils so as to perform field weakening, electric power consumption is increased. Thus, when the general IPM motor, or the like, having magnets is used in the hybrid vehicle, there arise problems, such as reduction of the fuel efficiency, and increase of the electric power consumption. On the other hand, the axial gap motor of this disclosure does not use magnets (permanent magnets); therefore, no back electromotive force due to the magnets is generated. Thus, no force (load) is generated in the rotor in the direction opposite to that of the engine torque, and the fuel efficiency is not reduced. Also, since the back electromotive force due to the magnets is not generated, there is no need to perform field weakening, and electric power consumption for performing field weakening can be eliminated.

The axial gap motor as described above may have a first rotor and a second rotor as the rotor, and have a first stator and a second stator as the stator. The first rotor and the second rotor may be disposed between the first stator and the second stator, in the axial direction of the rotary shaft. A portion of each of the rotor cores of the first rotor opposite to the first end face and the second end face may be fixed to a portion of each of the rotor cores of the second rotor opposite to the first end face and the second end face. With this arrangement, when the stator cores are attracted to the rotor cores, the force with which one of the rotors is attracted to one of the stators and the force with which the other rotor is attracted to the other stator act on each other so as to be cancelled out; therefore, the rotor bases are less likely or unlikely to be deflected, and the rotors and the stators are prevented from contacting with each other. Also, the output torque relative to the motor size can be improved, as compared with the case where one rotor and one stator are provided.

In the axial gap motor as described above, a plurality of rows of the rotor cores may be formed and fixed in the circumferential direction of the rotor base, and a plurality of rows of the stator cores may be formed and fixed in the circumferential direction of the stator base. With this arrangement, the number of the rotor cores and the number of the stator cores can be easily increased, and the output torque relative to the motor size can be further improved.

In the axial gap motor as described above, each of the rotor cores may be formed with the first end face and the second end face, by dividing a wound body comprising a plurality of turns of a strip-shaped soft magnetic material, in a direction intersecting with a circumferential direction of the wound body. Each of the stator cores may be formed with the third face and the fourth end face, by dividing the wound body comprising the plurality of turns of the strip-shaped soft magnetic material, in the direction intersecting with the circumferential direction of the wound body. The strip-shaped soft magnetic material may comprise an oriented magnetic steel sheet having a crystal orientation that is aligned with a longitudinal direction. The saturated magnetic flux density of the oriented magnetic steel sheet is higher than that of the non-oriented magnetic steel sheet. Thus, when the rotor cores and stator cores formed from the oriented magnetic steel sheets are used, the output torque of the axial gap motor can be increased, as compared with the case where rotor cores and stator cores formed from non-oriented magnetic steel sheets are used.

In this connection, the oriented magnetic steel sheet refers to a magnetic steel sheet of which the crystal orientation is aligned with a particular direction (rolling direction), and which has an axis of easy magnetization in this direction. Also, the width direction of the strip-shaped soft magnetic material is the short direction, and the direction in which the strip-shaped soft magnetic material extends is the long or longitudinal direction.

In the axial gap motor as described above, the rotary shaft may have a rotor fixed portion to which the rotor base is fixed, and the stator base may have an insertion hole in which the rotary shaft is inserted. The rotor fixed portion may have a larger diameter than an inside diameter of the insertion hole of the stator base. When the rotor cores are attracted to the stator cores, the force with which the stator is attracted to the rotor is generated. In the above axial gap motor, the diameter of the rotor fixed portion is larger than the inside diameter of the insertion hole of the stator base; therefore, the stator abuts against an end face of the rotor fixed portion, and movement of the stator toward the rotor is restricted. Thus, the radially inner portion of the stator base is less likely or unlikely to be deflected, and the stator and the rotor are prevented from contacting with each other.

The axial gap motor as described above may further include a case that rotatably supports the rotary shaft, and houses the rotor and the stator in a sealed state. The interior of the case may be partitioned by the stator base in the axial direction of the rotary shaft, into a first region in which the rotor is placed, and a second region in which the coils are placed. The case may be provided with a coolant inlet and a coolant outlet which allow a coolant to flow through the second region. With this arrangement, when the coolant flows through the second region, the coils that generate heat during energization are cooled by the coolant, so that the temperature of the axial gap motor is made less likely or unlikely to be high. Also, the coolant cannot pass through the first region in which the rotor is placed; therefore, the coolant can be prevented from becoming a load on the rotating rotor, and impeding rotation of the rotor.

In the axial gap motor as described above, each of the stator cores may have a first inner face and a second inner face that are opposed to each other and are provided continuously with the third end face and the fourth end face, respectively, Where Lg is a distance between the first end face of each of the rotor cores and the third end face of each of the stator cores, Sr is an area of the first end face of each of the rotor cores, Wsc is a distance between the first inner face and the second inner face of each of the stator cores, and Ss is an area of the first inner face of each of the stator cores, $Wsc/(2*Lg) \geq 20$, $Sr/Ss \geq 0.2$ may be satisfied. With this arrangement, it is possible to obtain larger output torque, than output torque obtained when it is assumed that an ideal axial gap motor with no flux leakage is constructed, using rotor cores and stator cores formed from non-oriented magnetic steel sheets, as will be described later. Thus, the output torque can be surely increased, as compared with the case where the rotor cores and stator cores formed from the non-oriented magnetic steel sheets are used.

The axial gap motor as described above may have two or more pairs of the stator and the rotor which are stacked in the axial direction of the rotary shaft. In the initial position, the rotor cores of an (n+1)-th pair may be located at positions rotated by an angle of $\varepsilon/(n+1)$ about the rotary shaft, relative to the rotor cores of an n-th pair, and the stator cores of the (n+1)-th pair may be located at positions rotated by the angle of $\varepsilon/(n+1)$ about the rotary shaft, relative to the stator cores of the n-th pair, where $\varepsilon$ is a step angle. With this arrangement, torque ripples can be reduced, and the axial gap motor is more smoothly rotated or driven.

In the axial gap motor as described above, where Ns is the number of the stator cores, the rotor cores may be inclined at an angle of $360°/Ns$ in a rotational direction of the rotor relative to a radial direction of the rotor base, about an intersecting point of an axis of a center of curvature of each of the rotor cores and a central axis of each of the rotor cores in a width direction. With this arrangement, torque ripples can be reduced.

In the axial gap motor as described above, each of the rotor cores may have an asymmetric structure in a width direction of the rotor core. With this arrangement, the initial torque at the time of switching of energization can be increased, and torque ripples can be reduced.

In the axial gap motor as described above, each of the rotor cores may have a large-width inner portion that is disposed on a side closer to an axis of a center of curvature of the rotor core and protrudes in a rotational direction of the rotor, and a small-width outer portion disposed on a side remote from the axis of the center of curvature of the rotor core. With this arrangement, the initial torque at the time of switching of energization can be increased, and torque ripples can be reduced.

In the axial gap motor as described above, the large-width inner portion of each of the rotor cores may be made of a first soft magnetic material, and the small-width outer portion may be made of a second soft magnetic material that is different from the first soft magnetic material. With this arrangement, various types of axial gap motors, such as high-speed and low-loss type, low-speed and high-torque type, and low cost type, can be provided, depending on the use of the axial gap motor, by using different soft magnetic materials for the large-width inner portion and small-width outer portion of the rotor core. Thus, variations in the axial gap motors can be increased.

In the axial gap motor as described above, each of the stator cores may have a constant width, and have an inner core portion that is disposed on a side closer to an axis of a center of curvature of the stator core, and is made of the same material as the large-width inner portion of each of the rotor cores, and an outer core portion that is disposed on a side remote from the axis of the center of curvature of the stator core, and is made of the same material as the small-width outer portion of each of the rotor cores. With this arrangement, various types of axial gap motors, such as high-speed and low-loss type, low-speed and high-torque type, and low cost type, can be provided, depending on the use of the axial gap motor, by using different soft magnetic materials for the inner core portion and the outer core portion of the stator core. Thus, variations in the axial gap motors can be increased.

In the axial gap motor as described above, each of the rotor cores and the stator cores may be a laminate body of a plurality of curved sheets comprising a plurality of types of strip-shaped soft magnetic materials, in which adjacent ones of the curved sheets are made of different types of soft magnetic materials. With this arrangement, various types of axial gap motors, such as high-speed and low-loss type, low-speed and high-torque type, and low cost type, having a multi-layer structure can be provided, depending on the use of the axial gap motor, by using different soft magnetic materials for the rotor core and the stator core. Thus, variations in the axial gap motors can be increased.

The axial gap motor as described above may have two or more pairs of the stator and the rotor stacked in the axial direction of the rotary shaft. The number of poles of the stator cores may be equal to that of the rotor cores, and the stator cores and the rotor cores may be oriented such that a width direction of each of the stator cores is in parallel with a radial direction of the stator base, and a width direction of each of the rotor cores is in parallel with a radial direction of the rotor base. Where Ns is the number of the stator cores, and $\varepsilon$ is a step angle that is equal to 360°/(3Ns), energization of each pair may be switched, such that the rotor of each pair is rotated by $\varepsilon$ upon each energization. With this arrangement, as compared with the case where the stator cores and the rotor cores are oriented such that the width direction of each core is in parallel with the circumferential direction of the stator or rotor base, the torque average radius and the core width needed for rotation can be increased, and therefore, the torque can be further increased.

According to the disclosure, the axial gap motor that does not use magnets so as to prevent back electromotive force from being generated in the coils can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
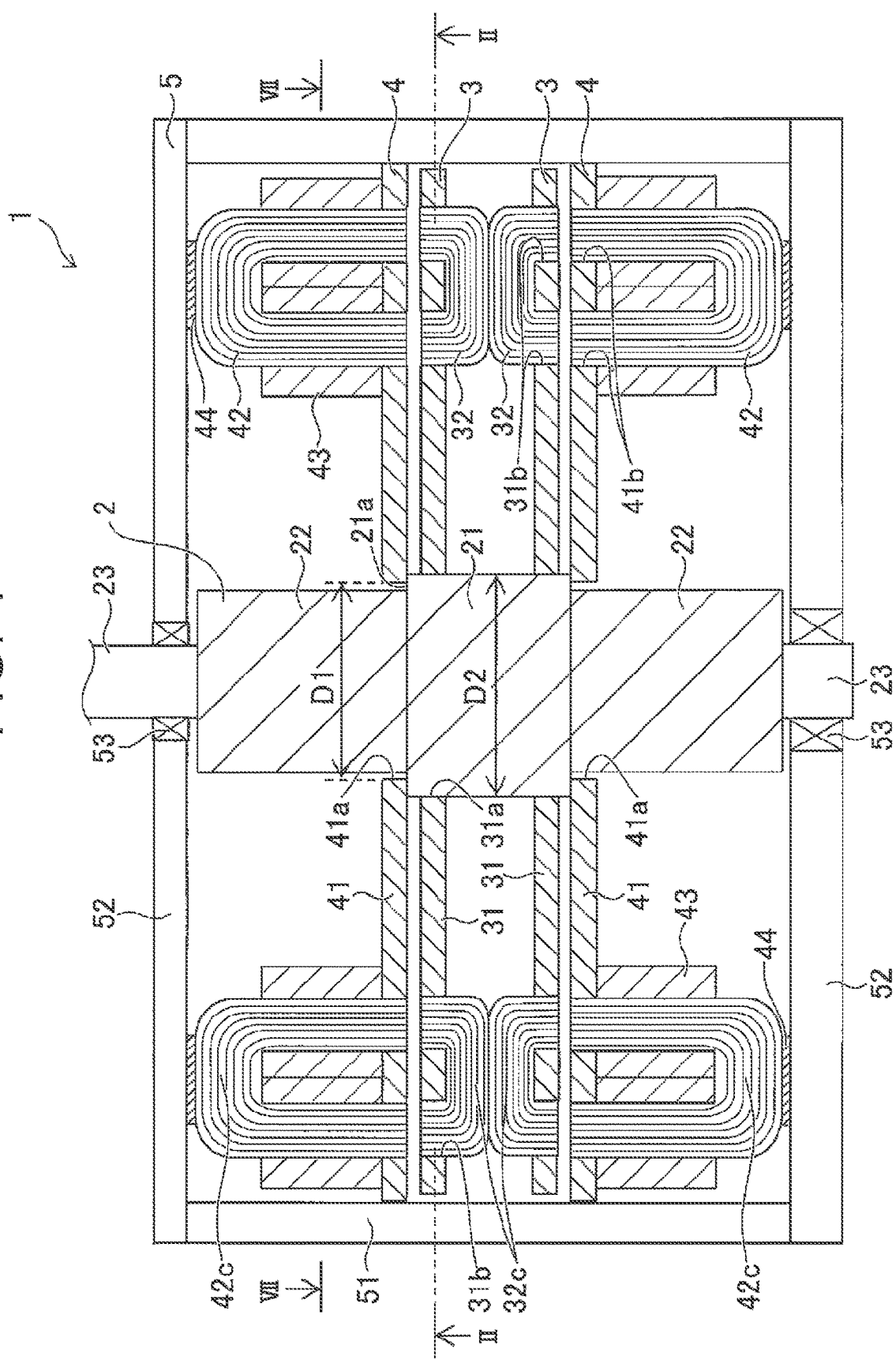
FIG. 1 is a schematic cross-sectional view showing the overall configuration of an axial gap motor according to a first embodiment of the disclosure.

Referring to FIG. 1, the overall configuration of an axial gap motor 1 according to a first embodiment of the disclosure will be described.

As shown in FIG. 1, the axial gap motor 1 principally consists of a rotary shaft 2 made of metal, for example, rotors 3 fixed to the rotary shaft 2, stators 4 opposed to the rotors 3 with gaps provided therebetween in the axial direction of the rotary shaft 2, and a case 5 that houses the rotary shaft 2, rotors 3, and stators 4 in a sealed state. In this embodiment, two rotors 3 are interposed between two stators 4, and the rotors 3 and stators 4 are arranged symmetrically in the axial direction.

The case 5 includes a cylindrical side portion 51, and a pair of disk-shaped lid portions 52 that close openings at opposite ends of the side portion 51. A bearing member 53 that rotatably supports the rotary shaft 2 is mounted in a central portion of each lid portion 52. While the case 5 is not limited to any particular material, it is preferably made of metal, in terms of the mechanical strength and heat dissipation.

The rotary shaft 2 includes a large-diameter portion (rotor fixed portion) 21 disposed in an axially middle portion of the case 5, a pair of middle-diameter portions 22 disposed on axially opposite sides of the large-diameter portion 21 and having a smaller diameter than the large-diameter portion 21, and a pair of small-diameter portions 23 disposed on axially opposite sides of the middle-diameter portions 22 and having a smaller diameter than the middle-diameter portions 22. The small-diameter portions 23 are rotatably supported by the bearing members 53.

The large-diameter portion 21 is fixed to insertion holes 31a of rotor bases 31, as will be described later. The diameter of the large-diameter portion 21 is larger than the inside diameter of insertion holes 41a of stator bases 41 that will be described later. Then, stepped portions are formed between the large-diameter portion 21 and the middle-diameter portions 22.

Figure 2:
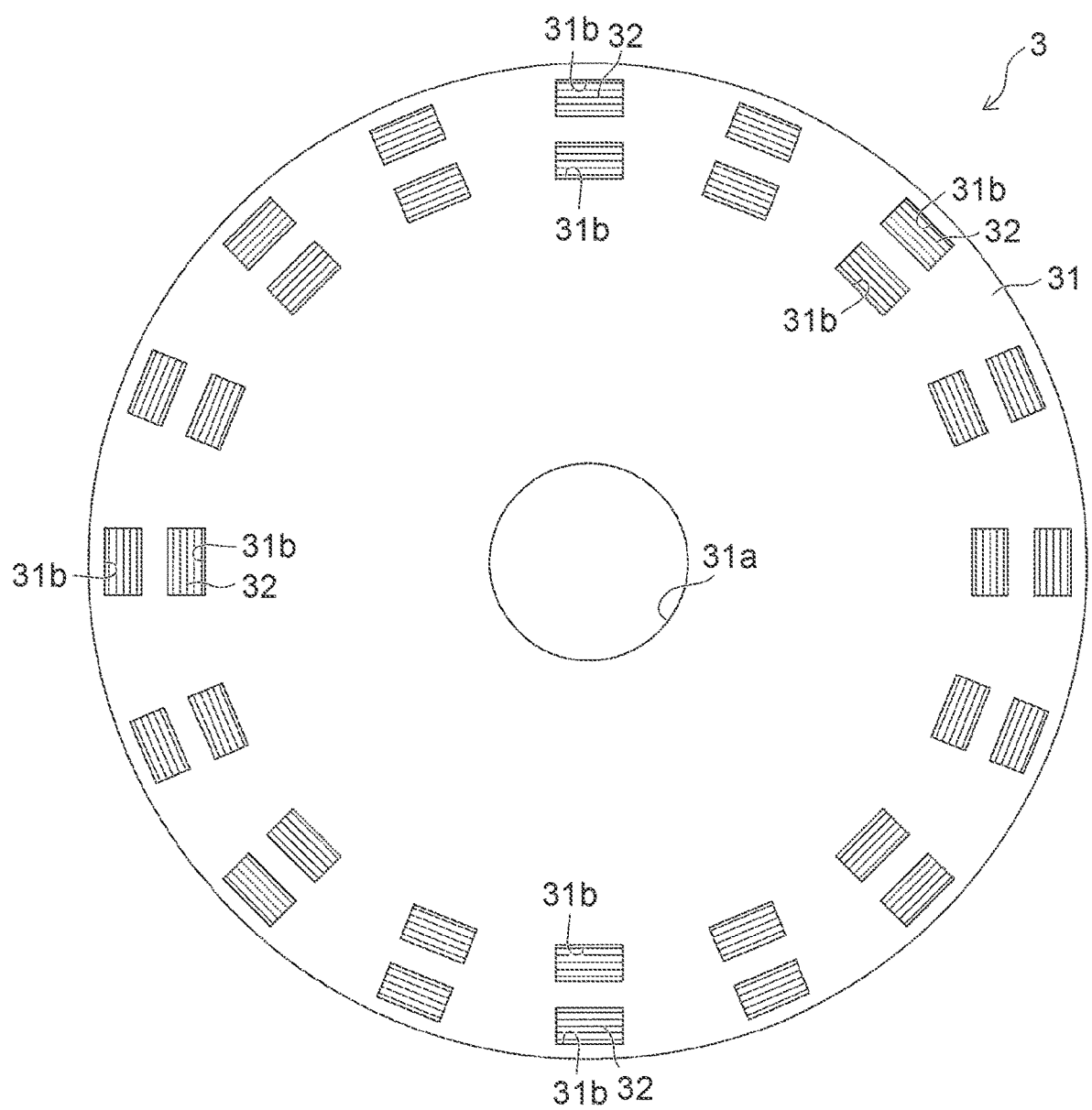
FIG. 2 is a cross-sectional view showing the structure of a rotor, which is taken along line II-II of FIG. 1.

As shown in FIG. 1 and FIG. 2, the rotor 3 consists of a disk-shaped rotor base 31 made of a non-magnetic material, and a plurality of (16 in this embodiment) rotor cores 32 fixed and arranged in the circumferential direction of the rotor base 31. Since two rotors 3 are provided in this embodiment, the number of rotor poles of the axial gap motor 1 is 32.

The material of the rotor base 31 is not limited to any particular one, provided that it is a non-magnetic material. While metal or resin may be used, non-magnetic stainless steel may be used, for example, in terms of the mechanical strength. The insertion hole 31a in which the large-diameter portion 21 of the rotary shaft 2 is inserted and fixed is formed in a central portion of the rotor base 31. Also, the rotor base 31 is configured to rotate as a unit with the rotary shaft 2. In this case, a keyway may be formed in an inner circumferential wall of the insertion hole 31a and an outer circumferential surface of the large-diameter portion 21 of the rotary shaft 2, and the rotor base 31 may be fixed to the rotary shaft 2 by fitting a key in the keyway. Alternatively, the large-diameter portion 21 of the rotary shaft 2 may be press-fitted into and fixed in the insertion hole 31a of the rotor base 31. A plurality of through holes 31b is formed in a radially outer portion of the rotor base 31, and end portions of the rotor cores 32 that extend over the entire thickness of the rotor base 31 are embedded in the through holes 31b. A pair of through holes 31b are provided for one rotor core 32, such that the through holes 31b are located adjacent to each other in the radial direction of the rotor base 31. The paired through holes 31b are formed equiangularly about the insertion hole 31a (the rotary shaft 2), and, in this embodiment, 16 pairs are formed at intervals of 22.5°. The outer periphery of the rotor base 31 is formed with a given clearance from the inner surface of the side portion 51 of the case 5.

Figure 3:
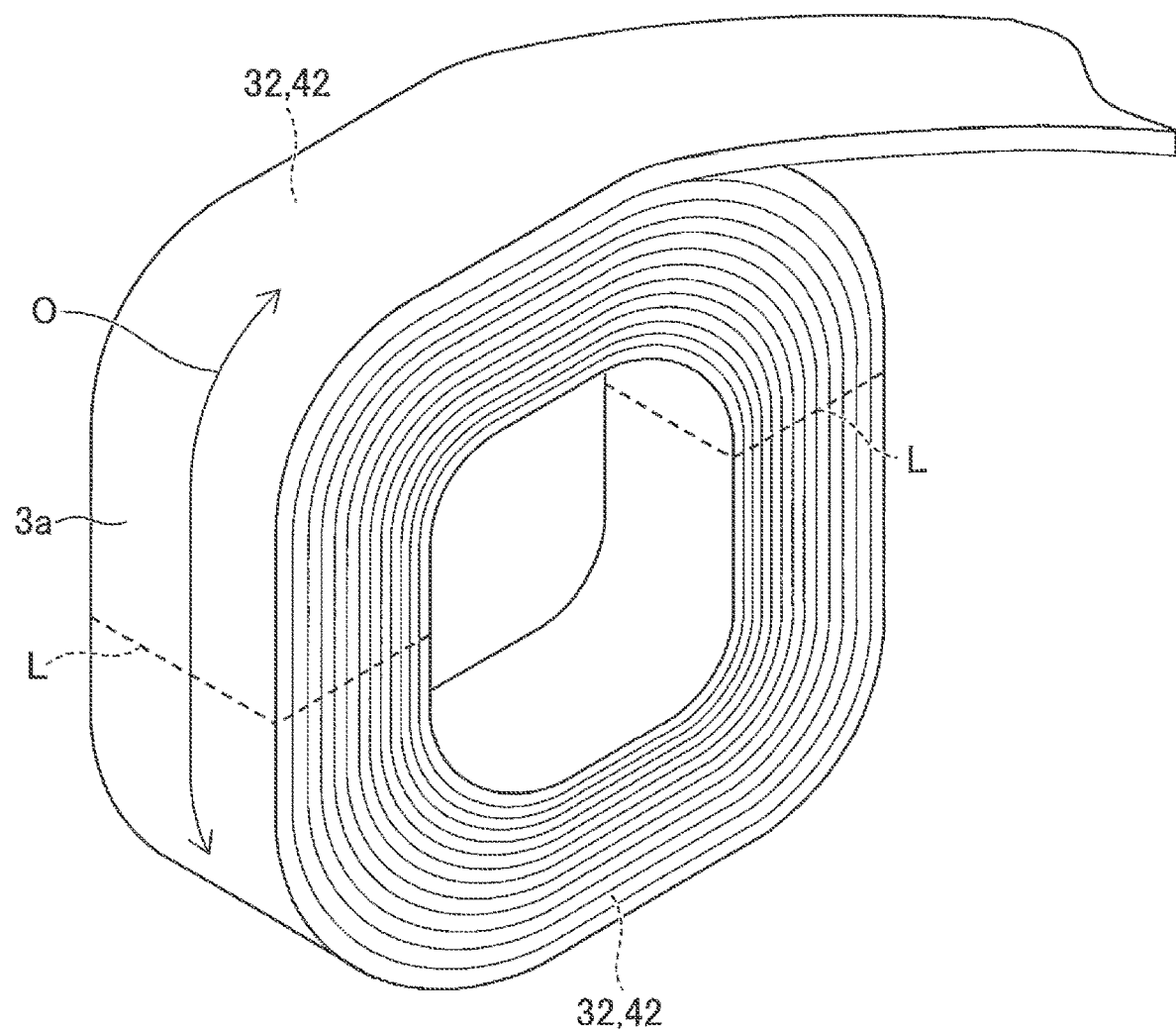
FIG. 3 is a perspective view useful for describing a method of producing rotor cores and stator cores of the axial gap motor according to the first embodiment of the disclosure.

The material of the rotor core 32 is not limited to any particular one provided that it is a soft magnetic material. While oriented or non-oriented magnetic steel sheet, iron-containing soft magnetic amorphous, cobalt-containing soft magnetic amorphous, and nanocrystalline soft magnetic materials, permendur as a cobalt-iron alloy, etc., may be used for the rotor core 32, the oriented magnetic steel sheet is preferably used. The rotor core 32 is a U-shaped cut core. As shown in FIG. 3, the rotor cores 32 are formed by dividing a wound body 3a that is formed by winding a strip-shaped soft magnetic material (oriented magnetic steel sheet) into a plurality of turns, into two segments, in a direction that intersects with the circumferential direction (arrow O direction). In FIG. 3, the division position L of the wound body 3a is indicated.

Figure 4:
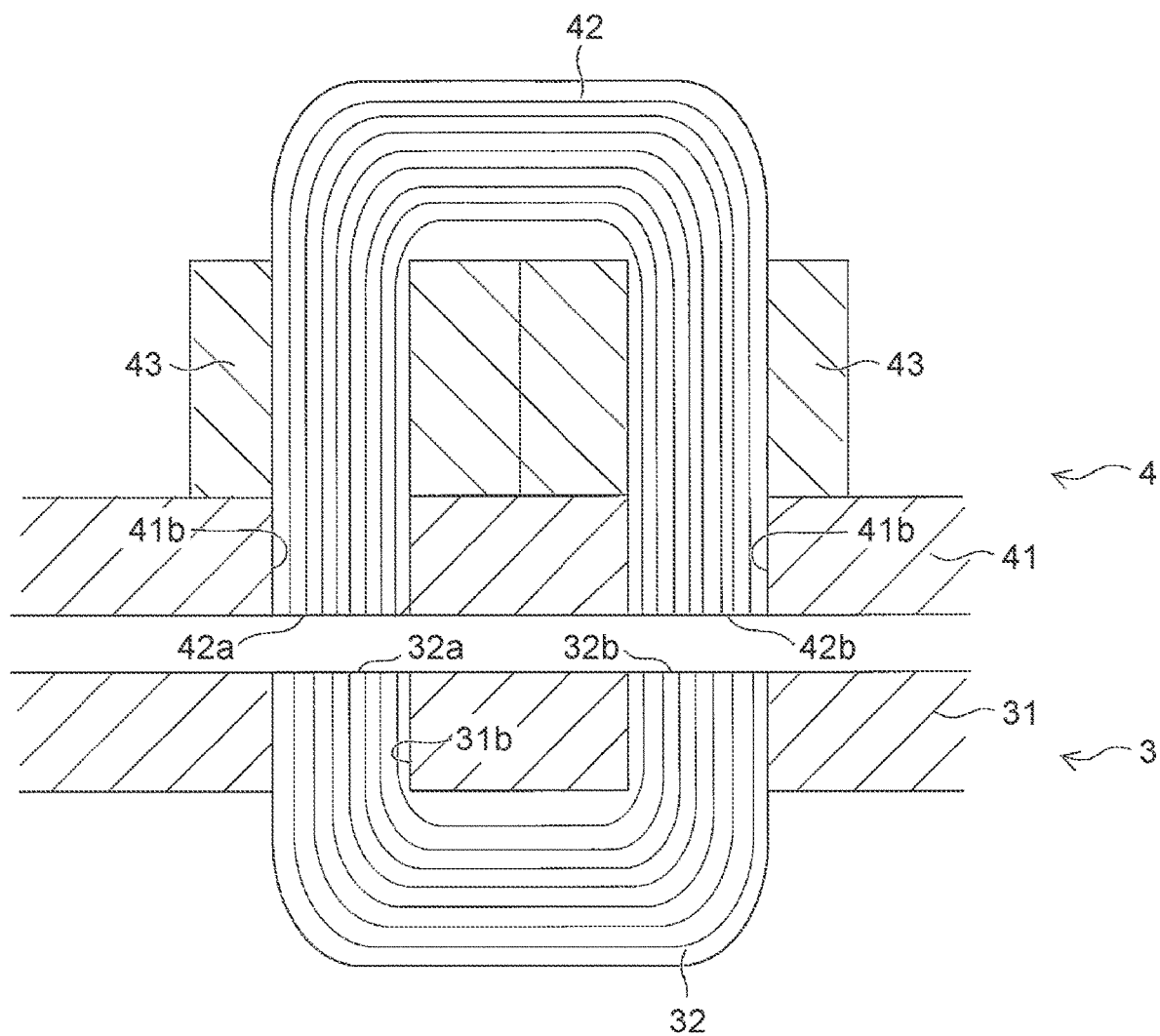
FIG. 4 is a cross-sectional view showing the structure of the rotor core, stator core, and their vicinity of the axial gap motor according to the first embodiment of the disclosure.

As shown in FIG. 4, the rotor core 32 has two end faces 32a, 32b. The two end faces 32a, 32b are formed on the same plane, so as to face in the same direction. The rotor core 32 is positioned such that its portions adjacent to the end faces 32a, 32b are inserted in the through holes 31b of the rotor base 31. The rotor core 32 is positioned such that the end faces 32a, 32b are flush with the surface of the rotor base 31 facing the stator 4, in a condition where the rotor core 32 is partially embedded in the through holes 31b of the rotor base 31. In this embodiment, the end faces 32a, 32b of the rotor core 32 and end faces 42a, 42b (which will be described later) of the stator core 42 are opposed to each other while being exposed to each other. In this embodiment, the crystal orientation of the oriented magnetic steel sheet used for the rotor core 32 is aligned with the longitudinal direction (rolling direction), and the oriented magnetic steel sheet has an axis of easy magnetization in this direction; therefore, the rotor core 32 has excellent magnetic characteristics as will be described later.

In a condition where the end faces 32a, 32b of the rotor core 32 are opposed to the end faces 42a, 42b of the stator core 42 that will be described later, the magnetic flux emitted from the end face 42a or 42b of the stator core 42 enters the end face 32a or 32b of the rotor core 32. Then, after passing through the rotor core 32, the magnetic flux emits from the end face 32b or 32a, and enters the end face 42b or 42a of the stator core 42.

The end faces 32a, 32b of each rotor core 32 are arranged in the radial direction of the rotor base 31. In this embodiment, the winding width direction (strip width direction) of the rotor core 32 is in parallel with the circumferential direction of the rotor base 31, in other words, the direction of lamination of the strip-shaped soft magnetic material at the end faces 32a, 32b of the rotor core 32 is in parallel with the radial direction of the rotor base 31.

In this embodiment, two rotors 3 are provided, as shown in FIG. 1, and the rotor cores 32 of the respective rotors 3 are opposed to each other. Each rotor core 32 has a portion 32c (which will also be called "back portion 32c") opposite to the end faces 32a, 32b, and the back portions 32c of the respective rotor cores 32 are opposed to each other, and fixed to each other. With this arrangement, the rotor cores 32 of the two rotors 3 are disposed at the same angular positions (namely, with no phase difference).

Figure 5:
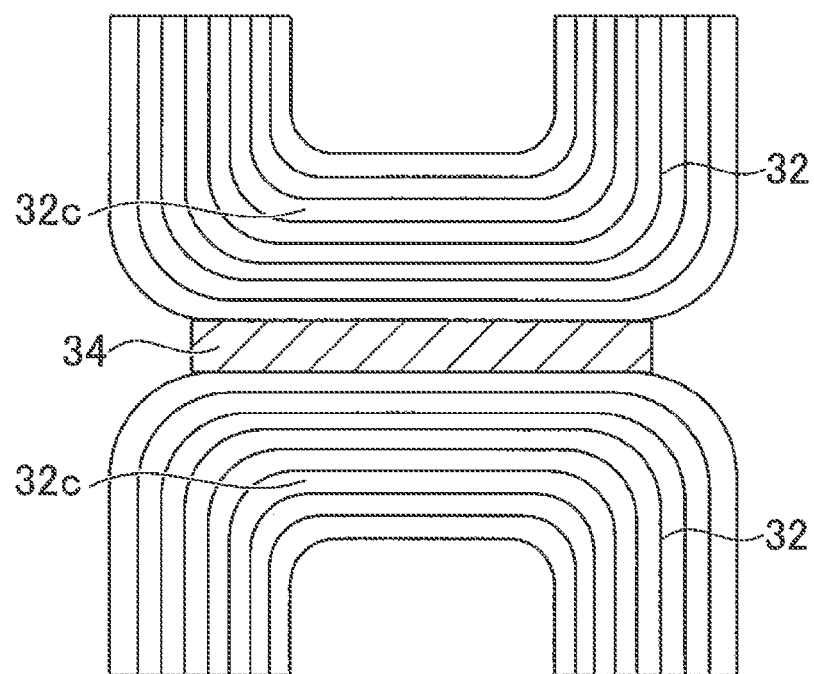
FIG. 5 is a side view useful for describing a method of fixing the rotor cores to each other in the axial gap motor according to the first embodiment of the disclosure.
Figure 6:
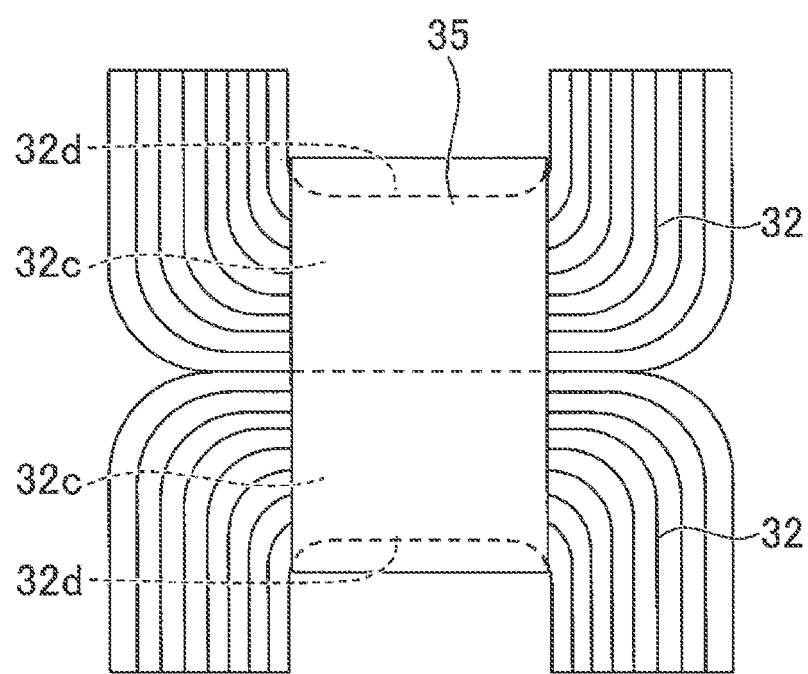
FIG. 6 is a side view useful for describing a method of fixing the rotor cores to each other in the axial gap motor according to the first embodiment of the disclosure.

The method of fixing the rotor cores 32 to each other is not limited to any particular method. For example, as shown in FIG. 5, the back portions 32c of the rotor cores 32 may be welded and fixed to each other, or may be bonded and fixed to each other by use of an adhesive (in FIG. 5, a fixing portion 34 indicates a welded portion or the adhesive). Also, as shown in FIG. 6, in a condition prior to mounting of the rotor cores 32 to the rotor bases 31, a belt 35 made of resin may be wrapped around the back portions 32c of the two rotor cores 32 so as to cover inner faces 32d of the back portions 32c, so that the two rotor cores 32 are fixed to each other. While a metal belt may be used as the belt 35, a belt made of resin is preferably used, because of a possibility that the metal belt itself generates eddy current, or belts located adjacent to each other in the circumferential direction of the rotor base 31 contact with each other and conduct electricity. Thus, the rotor cores 32 of the two rotors 3 are fixed to each other; therefore, when the rotor cores 32 are attracted to the stator cores 42, the axial force with which one of the rotors 3 is attracted to one of the stators 4 and the axial force with which the other rotor 3 is attracted to the other stator 4 act on each other to be cancelled out, so that the rotor bases 31 are prevented from being deflected, and the rotors 3 and the stators 4 are prevented from contacting with each other.

Figure 7:
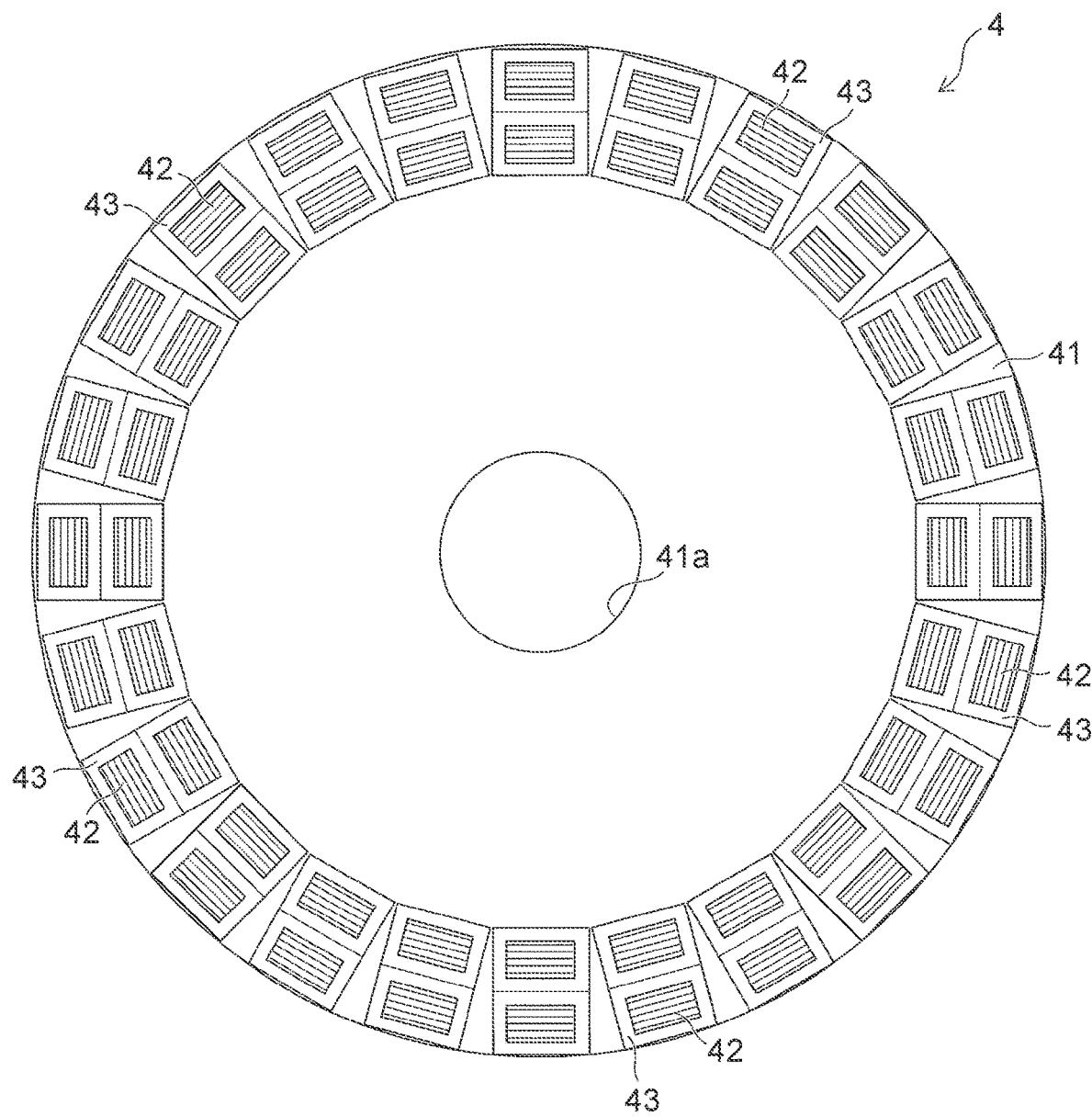
FIG. 7 is a cross-sectional view showing the structure of a stator, which is taken along line VII-VII of FIG. 1.

As shown in FIG. 1 and FIG. 7, the stator 4 consists of a disk-shaped stator base 41 made of a non-magnetic material, a plurality of (24 in this embodiment) stator cores 42 fixed and arranged in the circumferential direction of the stator base 41, and coils 43 wound around the stator cores 42. Since two stators 4 are provided in this embodiment, the number of stator poles of the axial gap motor 1 is 48. In this embodiment, the stator cores 42 of the two stators 4 are disposed at the same angular positions (namely, with no phase difference).

While the stator base 41 is not limited to any particular material provided that it is made of a non-magnetic material, non-magnetic stainless steel may be used, for example, in terms of the mechanical strength. The insertion hole 41a in which the middle-diameter portion 22 of the rotary shaft 2 is inserted is formed in a central portion of the stator base 41. The inner wall of the insertion hole 41a of the stator base 41 is formed with a given clearance from the middle-diameter portion 22 of the rotary shaft 2. Also, the inside diameter D1 of the insertion hole 41a of the stator base 41 is smaller than the outside diameter D2 of the large-diameter portion 21 of the rotary shaft 2. While the force with which the stator 4 is attracted to the rotor 3 is generated when the rotor core 32 is attracted to the stator core 42, movement of the central portion of the stator base 41 toward the rotor 3 is restricted by an end face 21a of the large-diameter portion 21, so that a radially inner portion of the stator base 41 is prevented from being deflected toward the rotor base 31 and contacting with the rotor base 31.

A plurality of through holes 41b is formed in a radially outer portion of the stator base 41, and end portions of the stator cores 42 that extend over the entire thickness of the stator base 41 are fitted in the through holes 41b. A pair of through holes 41b is provided for one stator core 42, such that the through holes 41b are located adjacent to each other in the radial direction of the stator base 41. The paired through holes 41b are formed equiangularly about the insertion hole 41a (the rotary shaft 2), and, in this embodiment, 24 pairs are formed at intervals of 15°. An outer periphery of the stator base 41 is fixed to the inner surface of the side portion 51 of the case 5. Also, the stator base 41 is configured not to rotate relative to the case 5. In this case, a keyway may be formed in the outer periphery of the stator base 41 and the inner circumferential surface of the side portion 51 of the case 5, and the stator base 41 may be fixed to the case 5 with a key fitted in the keyway. Alternatively, the outer periphery of the stator base 41 may be press-fitted into and fixed to the inner circumferential surface of the side portion 51 of the case 5.

Figure 8:
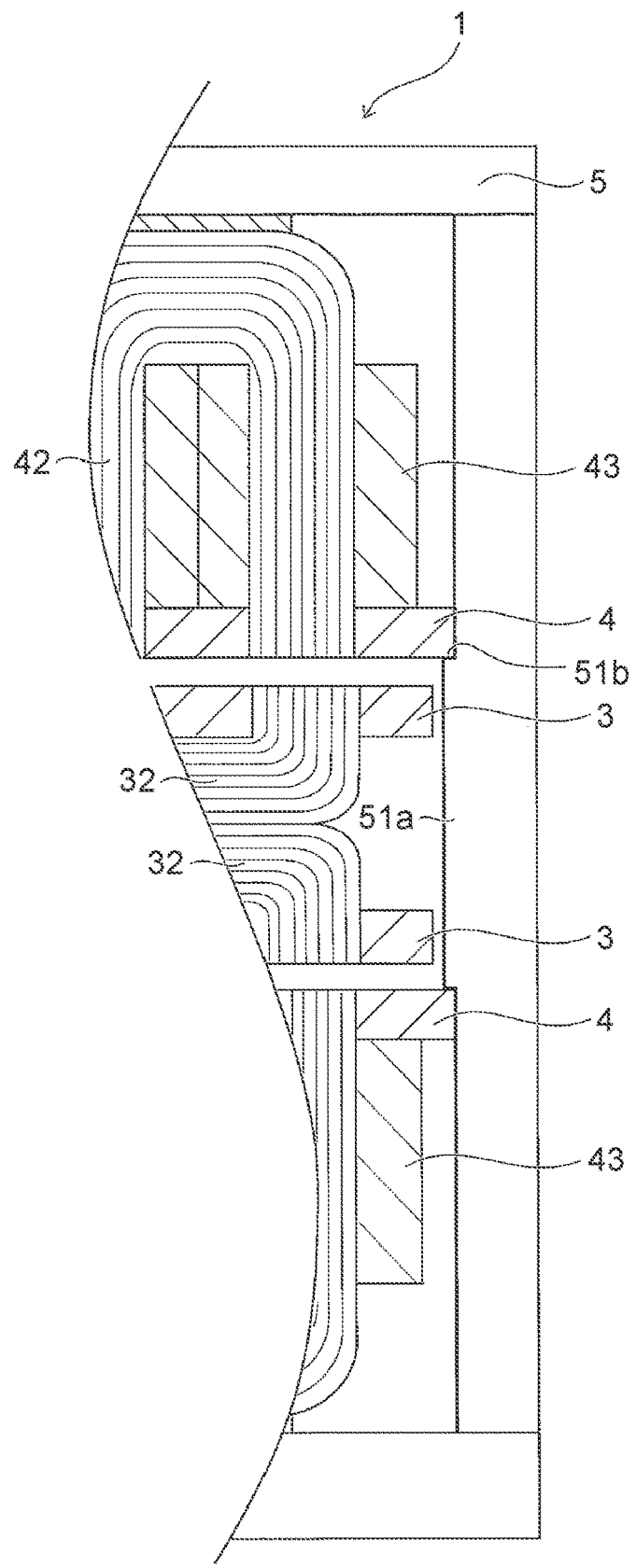
FIG. 8 is a cross-sectional view showing the structure of an axial gap motor as a first modified example of the disclosure.

As in a first modified example shown in FIG. 8, a restricting protrusion 51a that restricts movement of the stator base 41 toward the rotor 3 may be provided on the side portion 51 of the case 5, such that the restricting protrusion 51a protrudes toward the rotary shaft 2. With this arrangement, when the rotor core 32 is attracted to the stator core 42, the force with which the stator 4 is attracted to the rotor 3 is generated in the stator 4, but the radially outer portion of the stator base 41 abuts against an end face 51b of the restricting protrusion 51a, and its movement toward the rotor base 31 is restricted. As a result, the radially outer portion of the stator base 41 is prevented from being deflected toward the rotor base 31 and contacting with the rotor base 31.

The material of the stator core 42 is not limited to any particular one provided that it is a soft magnetic material. While oriented or non-oriented magnetic steel sheet, iron-containing soft magnetic amorphous, cobalt-containing soft magnetic amorphous, and nanocrystalline soft magnetic materials, permendur as a cobalt-iron alloy, etc., may be used for the stator core 42, an oriented magnetic steel sheet is preferably used. Each stator core 42 is a U-shaped cut core. As shown in FIG. 3, the stator cores 42 are formed by dividing a wound body 3a that is formed by winding a strip-shaped soft magnetic material (oriented magnetic steel sheet) into a plurality of turns, into two segments, in a direction that intersects with the circumferential direction (arrow O direction). At this time, two stator cores 42 (or rotor cores 32) may be formed from one wound body 3a, or one stator core 42 and one rotor core 32 may be formed from one wound body 3a. In this embodiment, the rotor cores 32 and stator cores 42 are formed by dividing the wound body 3a formed by winding the strip-shaped soft magnetic material into a plurality of turns; therefore, the yield can be significantly improved, as compared with the case where cores are formed by punching a magnetic steel sheet, as generally employed in the manufacture of radial gap motors.

The manner of forming the rotor cores 32 and the stator cores 42 is not limited to the above-described method. For example, the core may be formed by curving the strip-shaped soft magnetic material into the U shape, and stacking a plurality of sheets of the soft magnetic material. The core may also be formed by other methods, such as sintering or casting, rather than stacking sheets of the strip-shaped soft magnetic material.

As shown in FIG. 4, the stator core 42 has two end faces 42a, 42b that face in the same direction. The stator core 42 is inserted in and fixed to the through holes 41b, such that the end faces 42a, 42b are flush with one surface of the stator base 41 which faces the rotor 3. In this embodiment, the stator core 42 is formed from the oriented magnetic steel sheet, and therefore, has excellent magnetic characteristics as will be described later.

Also, the end faces 42a, 42b of each stator core 42 are arranged in the radial direction of the stator base 41. In this embodiment, the winding width direction (strip width direction) of the stator core 42 is in parallel with the circumferential direction of the stator base 41, in other words, the direction of lamination of the strip-shaped soft magnetic material at the end faces 42a, 42b of the stator core 42 is in parallel with the radial direction of the stator base 41.

As shown in FIG. 1, a portion (which will also be called "back portion") 42c of the stator core 42 opposite to the rotor core 32 is fixed to the inner surface of the lid portion 52. While the method of fixing the stator core 42 to the lid portion 52 is not limited to any particular method, the stator core 42 may be fixed by welding, or fixed using an adhesive, for example (in FIG. 1, a fixing portion 44 indicates a welded portion or the adhesive).

Figure 9:
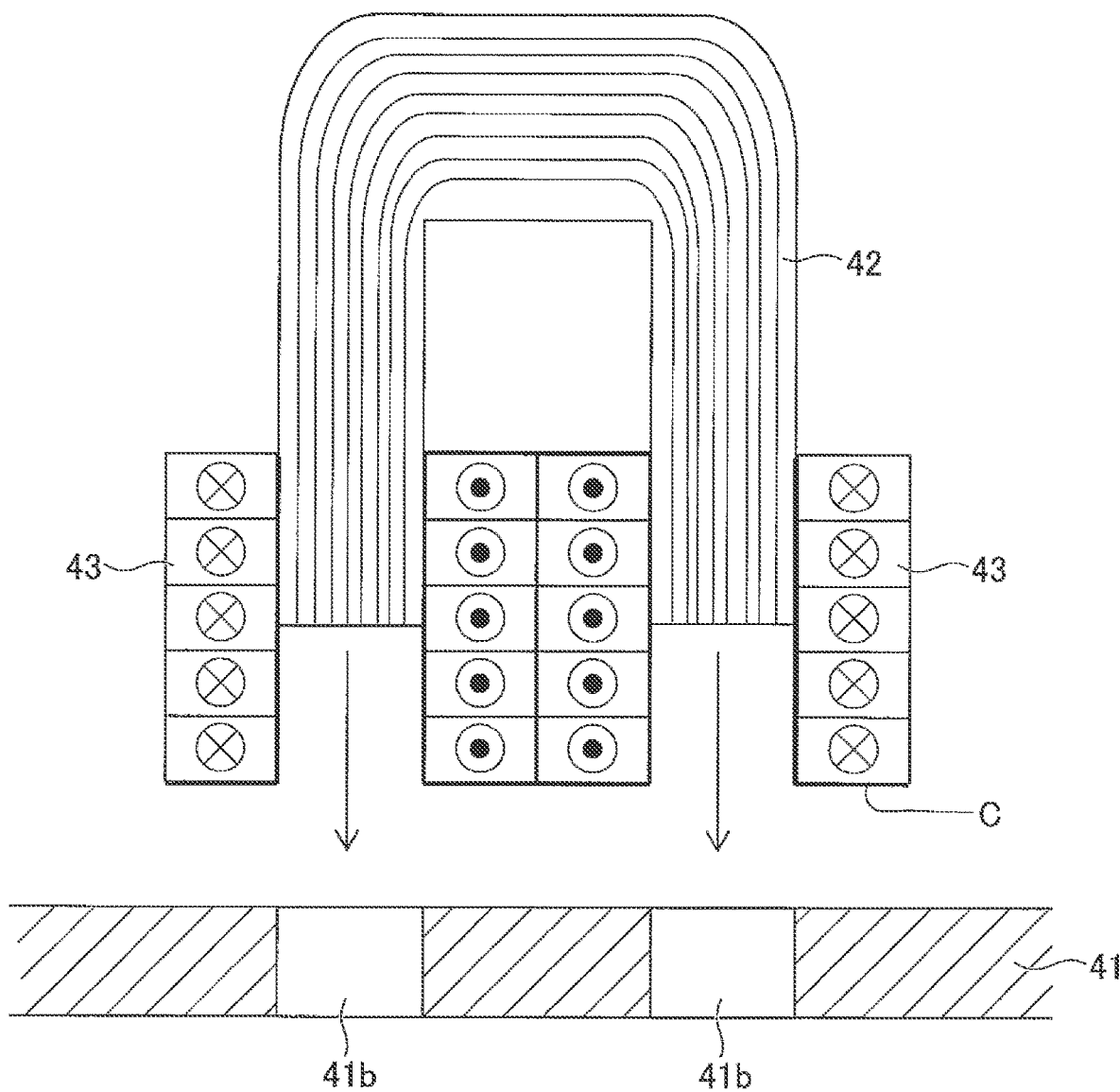
FIG. 9 is a cross-sectional view useful for describing a method of mounting coils on the stator core of the axial gap motor according to the first embodiment of the disclosure.

Each of the coils 43 is formed by winding a conducting wire a plurality of times to provide a plurality of turns. An insertion hole in which the stator core 42 is inserted is formed in a middle portion of the coil 43. When the stator 4 is assembled, two coils 43 connected in series are arranged side by side, and opposite end portions of the stator core 42 are inserted in the insertion holes of the coils 43, as shown in FIG. 9. Then, the stator core 42 on which the coils 43 are mounted is inserted in the through holes 41b of the stator base 41, so that the stator 4 is assembled. Thus, the stator 4 can be easily produced, as compared with the case where a coil is formed by winding a conducting wire around a stator core as a laminate of a plurality of sheets, as in a radial gap motor. In this connection, the stator core 42 may be inserted in the insertion holes of the coils 43, in a condition where each coil 43 is housed in a resin case, or a surface of the coil 43 is covered with insulating paper. In FIG. 9, reference sign C denotes the resin case or insulating paper. With this arrangement, the efficiency in the assembling work is improved, and electricity is prevented from being conducted between adjacent coils 43. While the coil 43 can be formed by concentrated winding, for example, it may be formed by distributed winding.

When rectangular electric current, for example, is passed through each coil 43 in given timing, magnetic flux is generated in the stator core 42, and the rotor core 32 of the rotor 3 is attracted to the stator core 42 due to the magnetic flux, so that the rotor 3 is rotated. More specifically, when current is passed through the coils 43 wound on a given stator core 42, magnetic flux is generated in the given stator core 42, and the rotor core 32 is drawn to a position opposed to the given stator core 42 due to the magnetic flux, so that the rotor core 32 is rotated by a given angle. Then, energization of the coils 43 of the given stator core 42 is stopped, and current is passed through the coils 43 of an adjacent stator core 42, so that magnetic flux is generated in the adjacent stator core 42. As a result, the rotor core 32 is drawn to a position opposed to the adjacent stator core 42 due to the magnetic flux of the adjacent stator core 42, and the rotor core 32 is further rotated by the given angle. With this operation repeated, the rotor 3 is continuously rotated.

Figure 10:
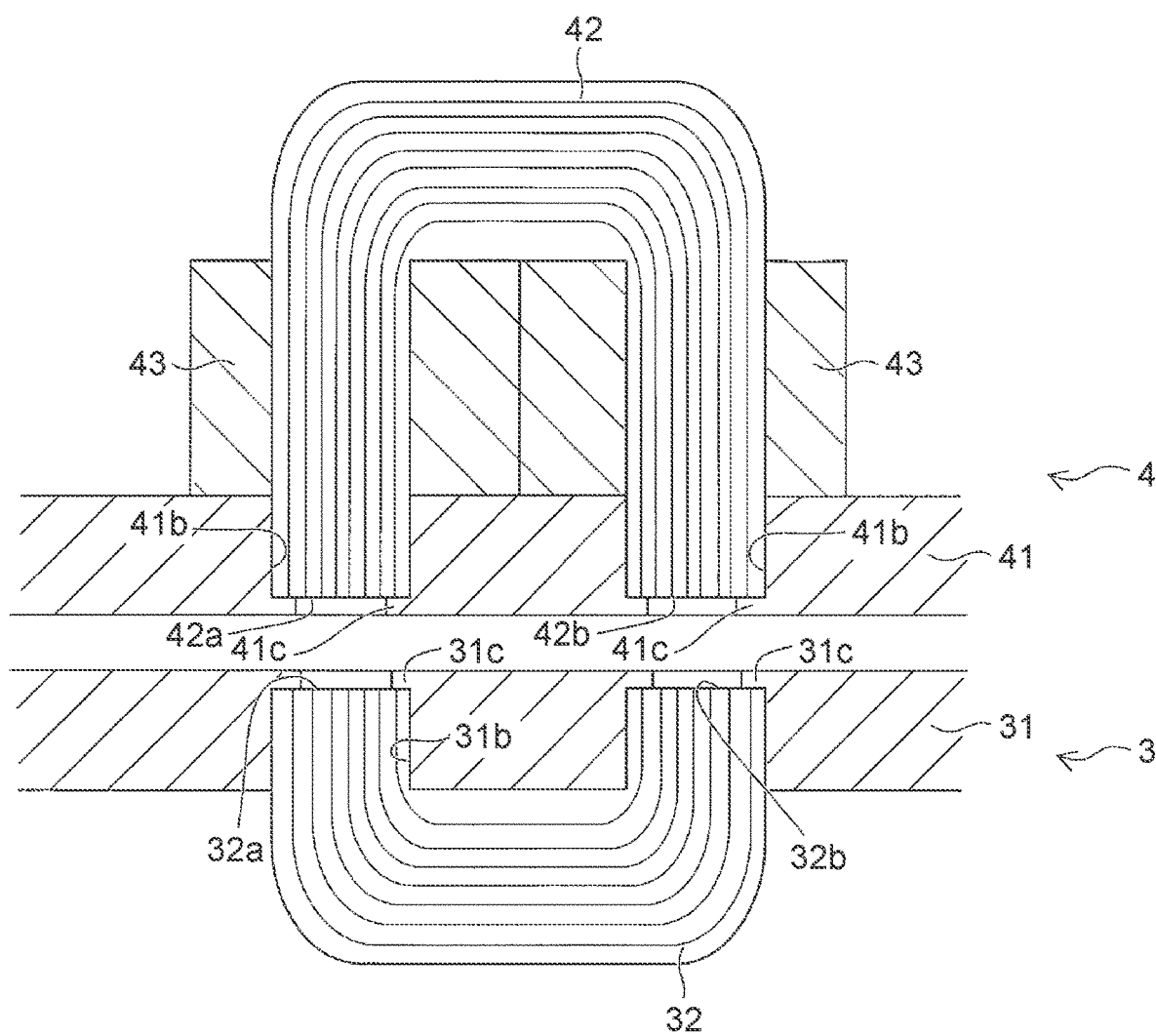
FIG. 10 is a cross-sectional view showing the structure of an axial gap motor as a second modified example of the disclosure.

In this embodiment, the end faces 32a, 32b of the rotor core 32 are positioned so as to be flush with the surface of the rotor base 31 which faces the stator 4, and the end faces 42a, 42b of the stator core 42 are positioned so as to be flush with the surface of the stator base 41 which faces the rotor 3. However, the arrangement of a second modified example shown in FIG. 10, for example, may be employed. More specifically, the rotor base 31 may be provided with protruding portions 31c that are located in portions of the through holes 31b which face the stator 4, and protrude inwardly of the through holes 31b. With this arrangement, the protruding portions 31c can prevent the end faces 32a, 32b of the rotor core 32 from protruding from the rotor base 31 due to dimensional errors, etc. of the rotor core 32, and the rotor core 32 is prevented from contacting with the stator core 42. Similarly, the stator base 41 may be provided with protruding portions 41c that are located in portions of the through holes 41b which face the rotor 3, and protrude inwardly of the through holes 41b. With this arrangement, the protruding portions 41c can prevent the end faces 42a, 42b of the stator core 42 from protruding from the stator base 41 due to dimensional errors, etc. of the stator core 42, and the stator core 42 is prevented from contacting with the rotor core 32.

Figure 11:
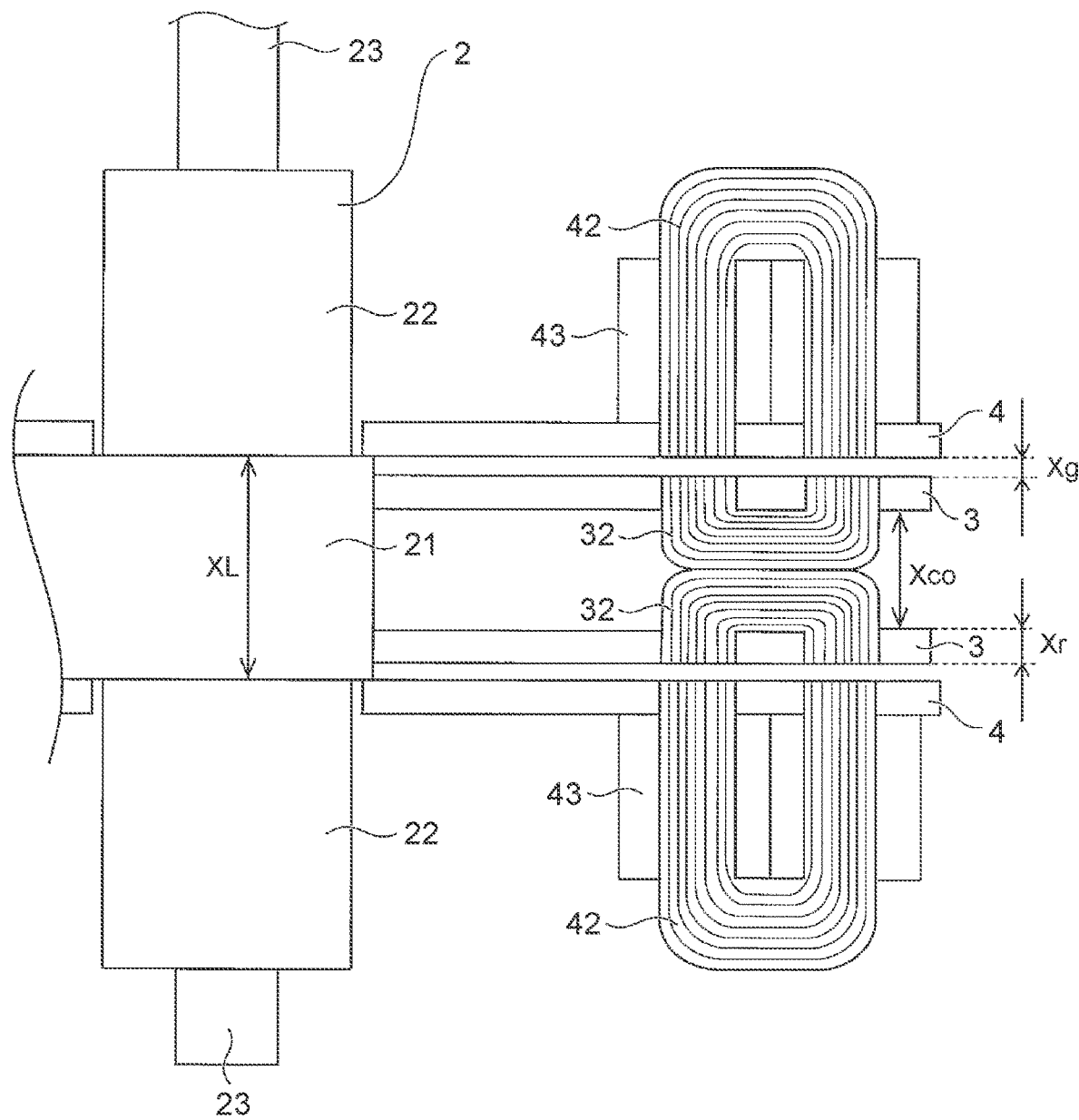
FIG. 11 is a cross-sectional view useful for describing a method of setting a gap between a rotor base and a stator base of the axial gap motor according to the first embodiment of the disclosure.

Referring next to FIG. 11, the method of setting a gap Xg between the rotor base 31 and the stator base 41 will be briefly described. As shown in FIG. 11, where XL denotes the axial length of the large-diameter portion 21, Xg denotes the gap between the rotor base 31 and the stator base 41 (between the rotor core 32 and the stator core 42, in this embodiment), Xr denotes the thickness of the rotor base 31, and Xco denotes the distance between two rotor bases 31, XL is set with respect to predetermined Xr and Xco, so as to satisfy XL=2·Xg+2·Xr+Xco, so that Xg can be set to a desired size.

Next, the effect provided by forming the rotor core 32 and the stator core 42 using oriented magnetic steel sheets will be briefly described.

Figure 12:
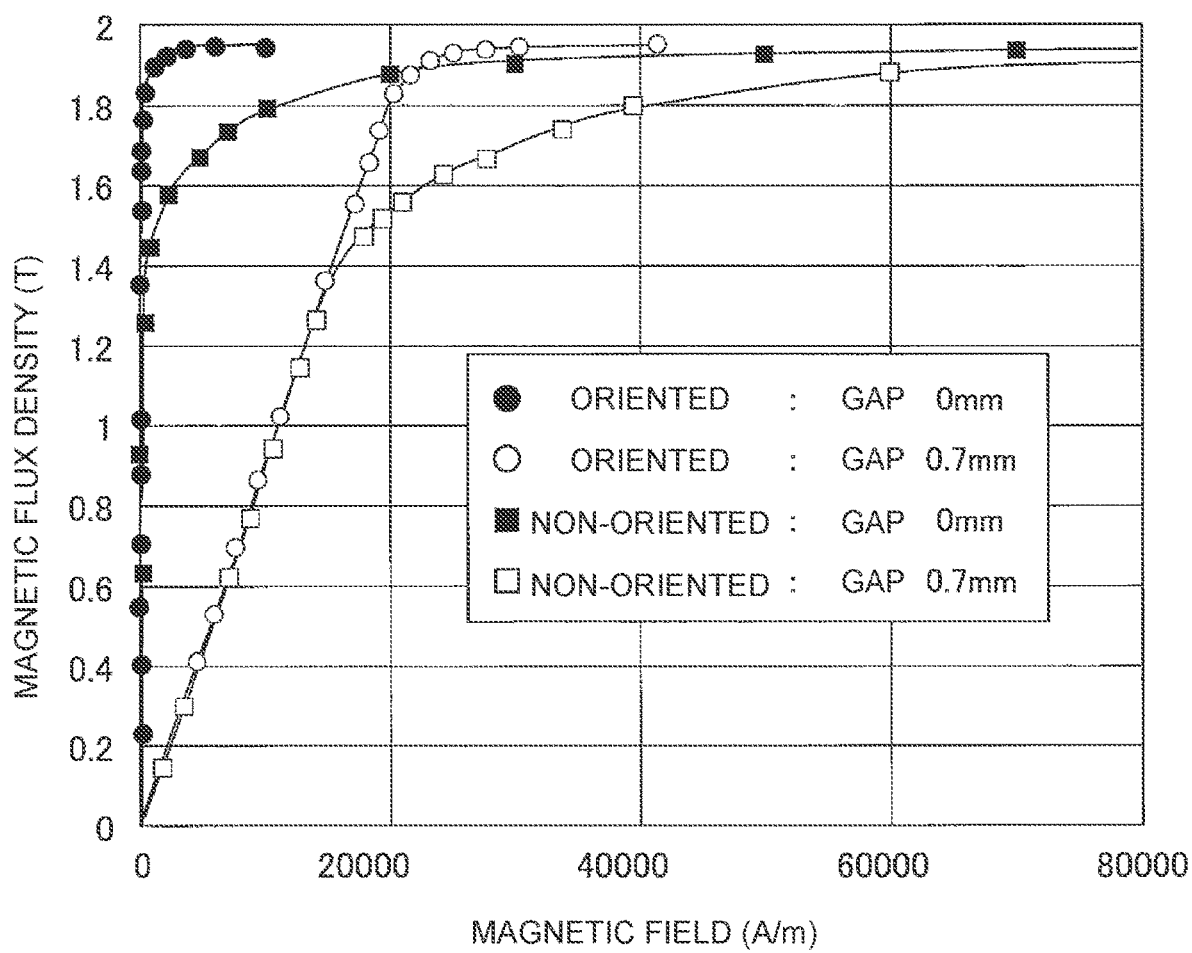
FIG. 12 is a view showing the relationship between the magnetic field strength and the magnetic flux density, when oriented magnetic steel sheets or non-oriented magnetic steel sheets are used for the rotor cores and stator cores, and a gap between the rotor core and the stator core is varied.

FIG. 12 is a graph showing the relationship between the magnetic field strength and the magnetic flux density, when oriented magnetic steel sheets or non-oriented magnetic steel sheets are used for the rotor core 32 and the stator core 42, and the gap between the rotor core 32 and the stator core 42 is set to 0.7 mm or 0 mm. As shown in FIG. 12, in the case where the gap between the rotor core 32 and the stator core 42 is 0.7 mm, the magnetic field strength at the time when the magnetic flux density is saturated (at this time, the output torque is also saturated) where the oriented magnetic steel sheets are used is equal to or smaller than ½ of that in the case where the non-oriented magnetic steel sheets are used. Since the magnetic field strength is proportional to the magnitude of electric current passing through the coils 43, a copper loss at the saturated magnetic flux density when the oriented magnetic steel sheets are used can be reduced to be equal to or smaller than ¼ of that in the case where the non-oriented magnetic steel sheets are used. When the case where the gap is 0.7 mm is compared with the case where the gap is 0 mm in FIG. 12, it is understood that the copper loss can be further reduced as the gap becomes smaller.

Next, one example of the combination of the number of the rotor cores 32 and the number of the stator cores 42 will be described. For simplicity of description, it is assumed that the ratio of the number of the rotor cores 32 and the number of the stator cores 42 does not exceed three. Where the number of the rotor cores 32 is Nr, the number of the stator cores 42 is Ns, and the step angle is ε, the pitch (which will be called "inter-rotor angle") of the rotor cores 32 around the rotary shaft 2 is θr (=360°/Nr), and the pitch (which will be called "inter-stator angle") of the stator cores 42 around the rotary shaft 2 is θs (=360°/Ns). The step angle refers to the angle of rotation of the rotary shaft 2 per pulse of rectangular current applied to the coil 43. Also, the pitch of the rotor cores 32 (or stator cores 42) around the rotary shaft 2 refers to an angular pitch of the rotor cores 32 (or stator cores 42) about the rotary shaft 2, and is obtained by dividing 360° by the number of the rotor cores 32 (or the number of the stator cores 42).

Figure 13:
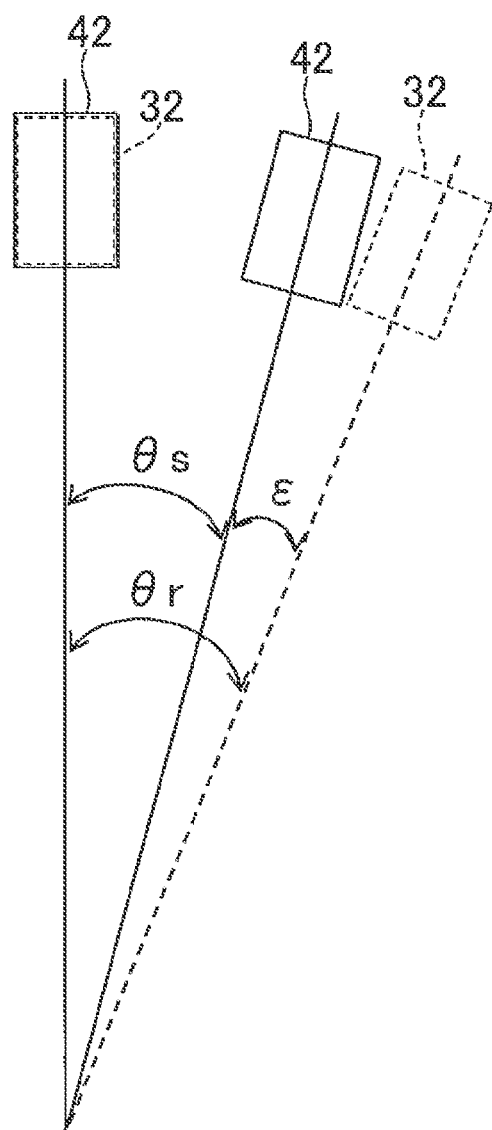
FIG. 13 is a schematic view useful for describing one example of a combination of the number of rotor cores and the number of stator cores.

When the number Ns of the stator cores 42 is larger than the number Nr of the rotor cores 32, Ns=360° Nr/(360°−ε·Nr), because the step number ε is expressed as ε=360°(1/Nr−1/Ns), as shown in FIG. 13. By using the equation, combinations of Nr and Ns, which are integers, are obtained, with respect to a given step angle E. At this time, when Ns is an integral multiple of Nr (when 2Nr=Ns or 3Nr=Ns, in this example), the rotor 3 may not be stably rotated; therefore, it is preferable that 2Nr≠Ns and 3Nr≠Ns. The result is indicated in TABLE 1 below.

TABLE 1

| No. | Number of Stator Poles Ns | Number of Rotor Poles Nr | Number of Synchronous Poles = GCD of Ns and Nr | Inter-Stator Angle θs (°) | Inter-Rotor Angle θr (°) | ε = Step Angle (°) |
|---|---|---|---|---|---|---|
| 1 | 4 | 3 | 1 | 90 | 120 | 30 |
| 2 | 5 | 4 | 1 | 72 | 90 | 18 |
| 3 | 6 | 5 | 1 | 60 | 72 | 12 |
| 4 | 6 | 4 | 2 | 60 | 90 | 30 |
| 5 | 8 | 6 | 2 | 45 | 60 | 15 |
| 6 | 8 | 5 | 1 | 45 | 72 | 27 |
| 7 | 9 | 8 | 1 | 40 | 45 | 5 |
| 8 | 9 | 6 | 3 | 40 | 60 | 20 |
| 9 | 10 | 9 | 1 | 36 | 40 | 4 |
| 10 | 10 | 8 | 2 | 36 | 45 | 9 |
| 11 | 10 | 6 | 2 | 36 | 60 | 24 |
| 12 | 12 | 10 | 2 | 30 | 36 | 6 |
| 13 | 12 | 9 | 3 | 30 | 40 | 10 |
| 14 | 12 | 8 | 4 | 30 | 45 | 15 |
| 15 | 15 | 12 | 3 | 24 | 30 | 6 |
| 16 | 15 | 10 | 5 | 24 | 36 | 12 |
| 17 | 15 | 9 | 3 | 24 | 40 | 16 |
| 18 | 15 | 8 | 1 | 24 | 45 | 21 |
| 19 | 15 | 6 | 3 | 24 | 60 | 36 |
| 20 | 16 | 15 | 1 | 22.5 | 24 | 1.5 |
| 21 | 16 | 12 | 4 | 22.5 | 30 | 7.5 |
| 22 | 16 | 10 | 2 | 22.5 | 36 | 13.5 |
| 23 | 16 | 9 | 1 | 22.5 | 40 | 17.5 |
| 24 | 18 | 16 | 2 | 20 | 22.5 | 2.5 |
| 25 | 18 | 15 | 3 | 20 | 24 | 4 |
| 26 | 18 | 12 | 6 | 20 | 30 | 10 |
| 27 | 18 | 10 | 2 | 20 | 36 | 16 |
| 28 | 18 | 8 | 2 | 20 | 45 | 25 |
| 29 | 20 | 18 | 2 | 18 | 20 | 2 |
| 30 | 20 | 16 | 4 | 18 | 22.5 | 4.5 |
| 31 | 20 | 15 | 5 | 18 | 24 | 6 |
| 32 | 20 | 12 | 4 | 18 | 30 | 12 |
| 33 | 20 | 9 | 1 | 18 | 40 | 22 |
| 34 | 20 | 8 | 4 | 18 | 45 | 27 |
| 35 | 24 | 20 | 4 | 15 | 18 | 3 |
| 36 | 24 | 18 | 6 | 15 | 20 | 5 |
| 37 | 24 | 16 | 8 | 15 | 22.5 | 7.5 |
| 38 | 24 | 15 | 3 | 15 | 24 | 9 |
| 39 | 24 | 10 | 2 | 15 | 36 | 21 |
| 40 | 30 | 24 | 6 | 12 | 15 | 3 |
| 41 | 30 | 20 | 10 | 12 | 18 | 6 |
| 42 | 30 | 18 | 6 | 12 | 20 | 8 |
| 43 | 30 | 16 | 2 | 12 | 22.5 | 10.5 |
| 44 | 30 | 12 | 6 | 12 | 30 | 18 |
| 45 | 30 | 9 | 3 | 12 | 40 | 28 |
| 46 | 36 | 24 | 12 | 10 | 15 | 5 |
| 47 | 36 | 30 | 6 | 10 | 12 | 2 |
| 48 | 45 | 30 | 15 | 8 | 12 | 4 |

Referring to TABLE 1, when Ns is larger than Nr (where Ns/Nr<3), there are 48 combinations of Ns and Nr. When the number of synchronous poles is equal to or larger than six (for example, in the case of Pattern No. 26, 36, 37, 40, 41, 42, 44, 46, 47, or 48), the axial gap motor 1 can generate higher torque than those having other numbers of synchronous poles. Also, when the step angle ε is equal to or smaller than 4° (in the case of Pattern No. 9, 20, 24, 25, 29, 35, 40, 47, or 48), it is possible to control the rotational angle with higher accuracy, than those having other step angles ε. Namely, a suitable combination can be selected from various numbers of poles, depending on required motor performance.

Figure 14:
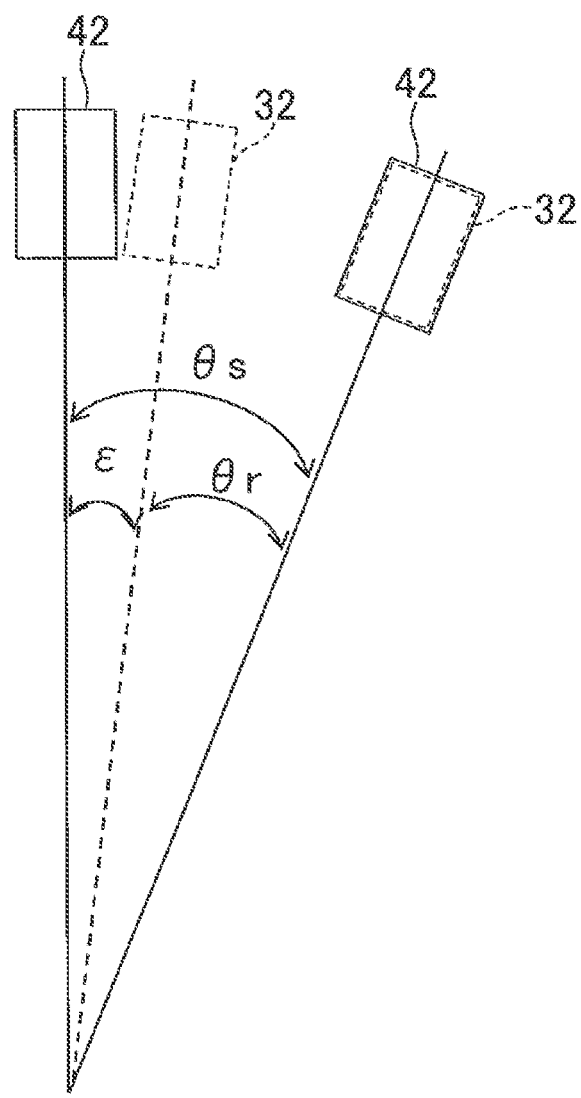
FIG. 14 is a schematic view useful for describing one example of a combination of the number of rotor cores and the number of stator cores.

On the other hand, when the number Ns of the stator cores 42 is smaller than the number Nr of the rotor cores 32, Ns=360° Nr/(360°+ε·Nr), because the step number ε is expressed as ε=360°(1/Nr−1/Ns), as shown in FIG. 14. By using the equation, the combinations of Nr and Ns, which are integers, are obtained, with respect to a given step angle E. At this time, where Nr is an integral multiple of Ns (where 2Ns=Nr or 3Ns=Nr, in this example), the rotor 3 may not be stably rotated; therefore, it is preferable that 2Ns≠Nr and 3Ns≠Nr. The result is indicated in TABLE 2 below.

TABLE 2

| No. | Number of Stator Poles Ns | Number of Rotor Poles Nr | Number of Synchronous Poles = GCD of Ns and Nr | Inter-Stator Angle θs (°) | Inter-Rotor Angle θr (°) | ε = Step Angle (°) |
|---|---|---|---|---|---|---|
| 1 | 3 | 4 | 1 | 120 | 90 | 30 |
| 2 | 4 | 5 | 1 | 90 | 72 | 18 |
| 3 | 4 | 6 | 2 | 90 | 60 | 30 |
| 4 | 5 | 6 | 1 | 72 | 60 | 12 |
| 5 | 5 | 8 | 1 | 72 | 45 | 27 |
| 6 | 6 | 8 | 2 | 60 | 45 | 15 |
| 7 | 8 | 9 | 1 | 45 | 40 | 5 |
| 8 | 8 | 10 | 2 | 45 | 36 | 9 |
| 9 | 8 | 15 | 1 | 45 | 24 | 21 |
| 10 | 9 | 10 | 1 | 40 | 36 | 4 |
| 11 | 9 | 15 | 3 | 40 | 24 | 16 |
| 12 | 9 | 16 | 1 | 40 | 22.5 | 17.5 |
| 13 | 10 | 12 | 2 | 36 | 30 | 6 |
| 14 | 10 | 15 | 5 | 36 | 24 | 12 |
| 15 | 10 | 18 | 2 | 36 | 20 | 16 |
| 16 | 12 | 16 | 4 | 30 | 22.5 | 7.5 |
| 17 | 12 | 18 | 6 | 30 | 20 | 10 |
| 18 | 12 | 20 | 4 | 30 | 18 | 12 |
| 19 | 15 | 16 | 1 | 24 | 22.5 | 1.5 |
| 20 | 15 | 18 | 3 | 24 | 20 | 4 |
| 21 | 15 | 20 | 5 | 24 | 18 | 6 |
| 22 | 15 | 24 | 3 | 24 | 15 | 9 |
| 23 | 16 | 18 | 2 | 22.5 | 20 | 2.5 |
| 24 | 16 | 20 | 4 | 22.5 | 18 | 4.5 |
| 25 | 16 | 24 | 8 | 22.5 | 15 | 7.5 |
| 26 | 16 | 30 | 4 | 22.5 | 12 | 10.5 |
| 27 | 18 | 20 | 2 | 20 | 18 | 2 |
| 28 | 18 | 24 | 6 | 20 | 15 | 5 |
| 29 | 18 | 30 | 6 | 20 | 12 | 8 |
| 30 | 18 | 32 | 2 | 20 | 11.25 | 8.75 |
| 31 | 20 | 24 | 4 | 18 | 15 | 3 |
| 32 | 20 | 30 | 10 | 18 | 12 | 6 |
| 33 | 20 | 32 | 4 | 18 | 11.25 | 6.75 |
| 34 | 20 | 36 | 4 | 18 | 10 | 8 |
| 35 | 24 | 30 | 6 | 15 | 12 | 3 |
| 36 | 24 | 32 | 8 | 15 | 11.55 | 3.75 |
| 37 | 24 | 36 | 12 | 15 | 10 | 5 |
| 38 | 24 | 40 | 8 | 15 | 9 | 6 |
| 39 | 30 | 32 | 2 | 12 | 11.25 | 0.75 |
| 40 | 30 | 36 | 6 | 12 | 10 | 2 |
| 41 | 30 | 40 | 10 | 12 | 9 | 3 |
| 42 | 30 | 45 | 15 | 12 | 8 | 4 |
| 43 | 30 | 48 | 6 | 12 | 7.5 | 4.5 |

Referring to TABLE 2, when Ns is smaller than Nr (where Nr/Ns<3), there are 43 combinations of Ns and Nr. The number of patterns (for example, Pattern Nos. 17, 25, 28, 29, 32, 35 to 38, and 40 to 43 having six or more synchronous poles) of combinations having a large number of synchronous poles is larger than that of TABLE 1. Also, the number of patterns (for example, Pattern Nos. 10, 19, 20, 23, 27, 31, 35, 36, and 39 to 42 in which the step angle ε is equal to or smaller than 4°) of combination having a small step angle ε is larger than that of TABLE 1. Thus, the number of choices of the combination patterns is increased when the number Ns of the stator cores 42 Ns is set to be smaller than the number Nr of the rotor cores 32.

Next, the results of comparison between the axial gap motor 1 as shown in FIG. 1 and a radial gap motor of the related art using magnets in the case where the output torque is equal will be briefly described. The rotor cores 32 and stator cores 42 of the axial gap motor 1 are formed from oriented magnetic steel sheets. The ratio of each comparison item of the axial gap motor 1 to that of the radial gap motor of the related art is obtained, and the results are shown in TABLE 3 below.

TABLE 3

| Item | Axial Gap Motor | Radial Gap Motor |
|---|---|---|
| Torque Ratio of Motor | 1.00 | 1.00 |
| Volume Ratio of Motor | 1.74 | 1.00 |
| Outside Diameter Ratio of Core | 1.10 | 1.00 |
| Axial Length Ratio of Motor | 1.39 | 1.00 |
| Mass Ratio of Magnet | 0.00 | 1.00 |
| Mass Ratio of Core | 0.44 | 1.00 |
| Mass Ratio of Winding | 0.45 | 1.00 |

As shown in Table 3, when the output torque is set to be equal, with respect to the axial gap motor 1, and the radial gap motor of the related art using magnets, the physical sizes (dimensions) of the axial gap motor 1, such as the volume of the motor, outside diameter of the cores, and the axial length of the motor, are larger than those of the radial gap motor. In the meantime, the axial gap motor 1, in which the mass (amount used) of magnets is zero, does not fail to be manufactured due to resource depletion. Also, in the axial gap motor 1, the mass (amount used) of the cores can be reduced to be equal to or smaller than one half. It is to be noted that the result in Table 3 indicates the amount of cores used in a condition where the motor is a completed product. However, since the cores of the radial gap motor of the related art are formed by punching magnetic steel sheets, the amount of the cores used can be reduced to be considerably small in the manufacture of the axial gap motor 1, in view of the yield. Also, in the axial gap motor 1, the mass (amount used) of windings can also be reduced to be equal to or smaller than one half. Thus, in the axial gap motor 1, the masses of the magnets, cores, and windings can be reduced to be small, and the inertia moment of the rotor is reduced, which leads to improved response.

In this embodiment, the end faces 32a, 32b of the rotor core 32 and the end faces 42a, 42b of the stator core 42 are opposed to each other while being exposed to each other. Thus, when current is passed through the coils 43 wound around the stator core 42, magnetic flux is generated in the stator core 42. As described above, when magnetic flux is sequentially generated in adjacent stator cores 42, the rotor cores 32 are sequentially attracted to the stator cores 42 due to the magnetic flux, to be continuously rotated. In the axial gap motor 1, magnets (permanent magnets) are not used. Therefore, when the axial gap motor 1 is used as a drive motor for a hybrid vehicle, for example, no back electromotive force is generated in the coils 43 of the stator 4, even when the vehicle travels at a high speed, mainly using the engine, and the rotor 3 is rotated at a high speed. Thus, force (load) applied in a direction reverse to that of engine torque is not generated in the rotor 3, and thus, the fuel efficiency is not deteriorated. Also, since the back electromotive force caused by magnets (permanent magnets) is not generated, there is no need to perform field weakening, and electric power consumption for performing field weakening can be eliminated. Also, since no magnet is used, a precious rare-earth element need not be used.

The rotor 3 and the stator 4 can be assembled merely by fixing the rotor cores 32 and the stator cores 42 in the form of cut cores, to the rotor base 31 and the stator base 41, respectively. Thus, the assembling work for the rotor 3 and the stator 4 can be simplified, as compared with the radial gap motor of the related art.

The axial gap motor 1 has two pairs of rotors 3 and stators 4, as described above. It is thus possible to improve the output torque relative to the motor size, as compared with the case where one rotor 3 and one stator 4 are provided.

Also, the rotors 3 and the stators 4 are arranged symmetrically in the axial direction. Thus, since the rotor cores 32 can be fixed to each other, the axial force with which one of the rotors 3 is attracted to one of the stators 4 and the axial force with which the other rotor 3 is attracted to the other stator 4 act on each other to be cancelled out; therefore, the rotor bases 31 are less likely or unlikely to be deflected, and the rotors 3 are prevented from contacting with the stators 4.

For example, the rotors 3 and the stators 4 may be alternately arranged in the axial direction (more specifically, they may be arranged in the order of the first rotor 3, first stator 4, second rotor 3, and second stator 4). In this case, however, since a gap needs to be provided between the rotor 3 and the stator 4, the axial size of the resulting axial gap motor is larger than that of the axial gap motor 1 of this embodiment, by an amount corresponding to a gap between the first stator 4 and the second rotor 3. Also, when the rotors 3 and the stators 4 are alternately arranged in the axial direction, the center of gravity of the axial gap motor 1 is located at a position shifted from the center of the case 5 in the axial direction. In the axial gap motor 1 of this embodiment, the displacement of the center of gravity relative to the center of the case 5 can be reduced.

Second Embodiment

In a second embodiment, two or more rows (two rows in this embodiment) of rotor cores 32 are formed and fixed in the circumferential direction of the rotor base 31, and two or more rows (two rows in this embodiment) of stator cores 42 are formed and fixed in the circumferential direction of the stator base 41. While two rows of the rotor cores 32 and two rows of the stator cores 42 are formed in this embodiment, three or more rows of the rotor cores 32 and three or more rows of the stator cores 42 may be formed.

Figure 15:
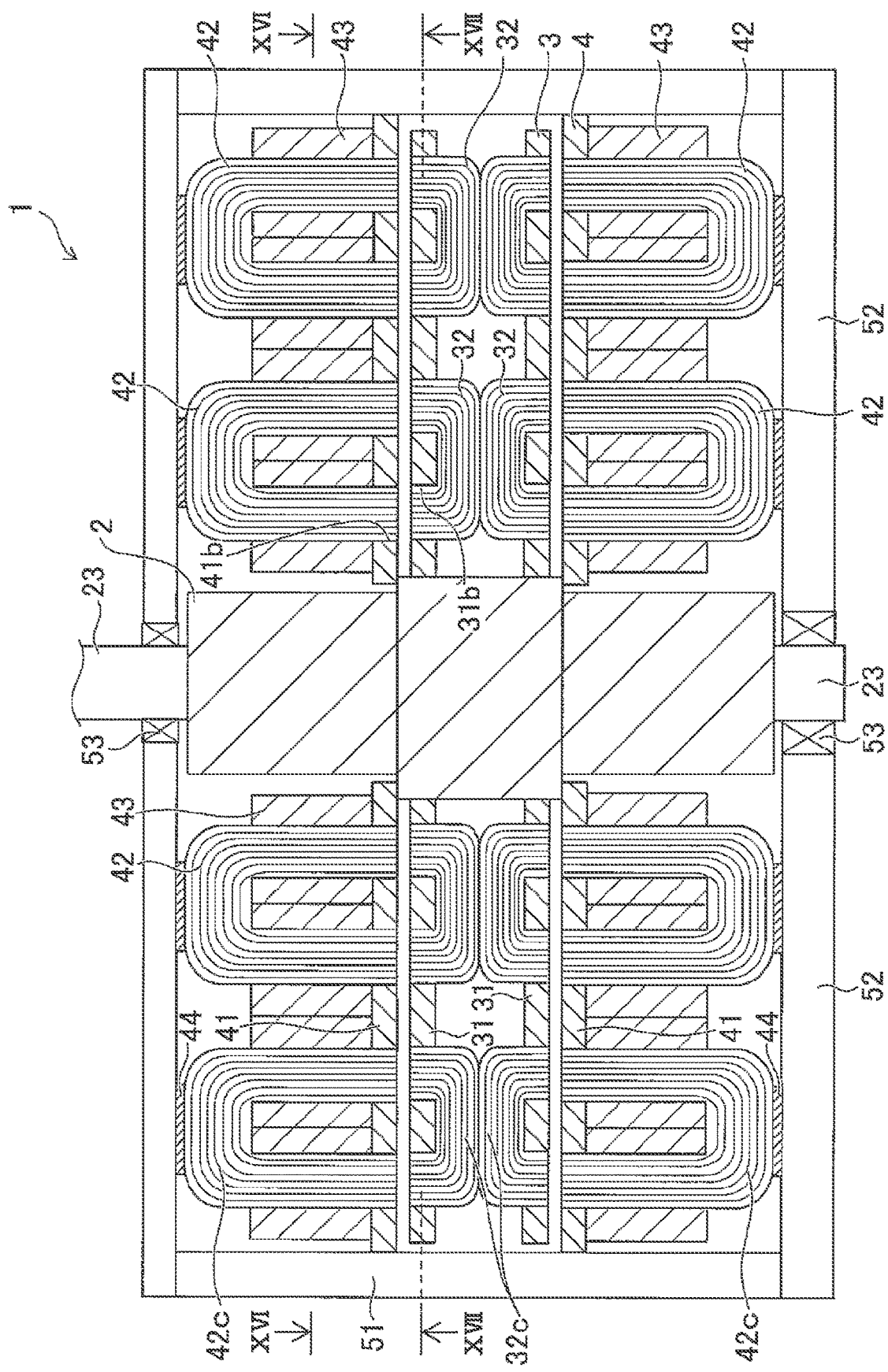
FIG. 15 is a schematic cross-sectional view showing the overall configuration of an axial gap motor according to a second embodiment of the disclosure.
Figure 16:
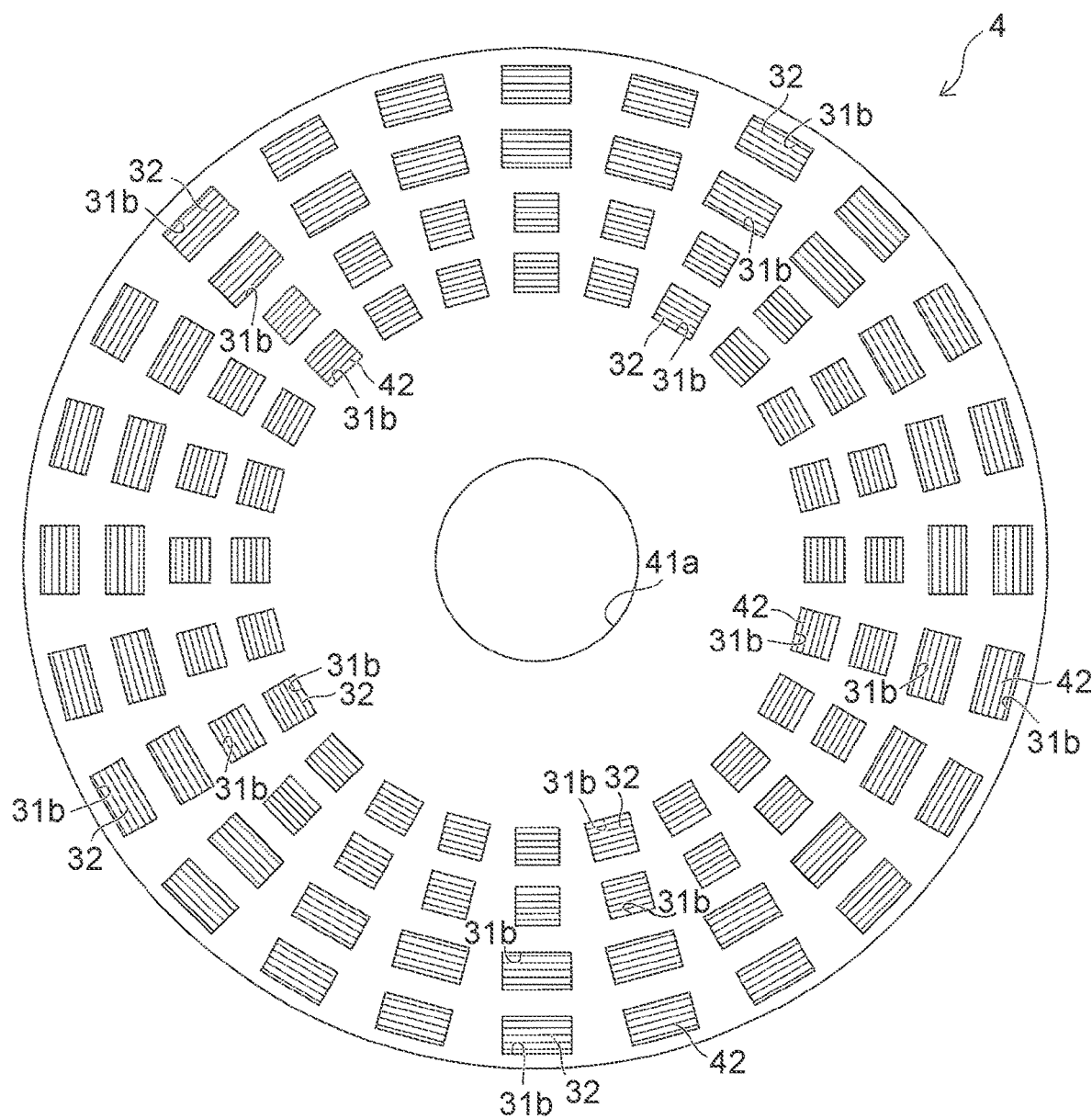
FIG. 16 is a cross-sectional view showing the structure of a rotor, which is taken along line XVI-XVI of FIG. 15.

In this embodiment, a plurality of through holes 31b is formed in a radially inner portion, as well as a radially outer portion, of the rotor base 31, as shown in FIG. 15 and FIG. 16. Namely, in this embodiment, not only the through holes 31b (which will be called "outer through holes 31b") of the first embodiment are formed, but also the through holes 31b (which will be called "inner through holes 31b") are formed on the inner side of the outer through holes 31b.

Like the outer through holes 31b, a pair of inner through hole 31b are provided adjacent to each other in the radial direction of the rotor base 31. The paired inner through holes 31b are formed at the same angles as the paired outer through holes 31b about the insertion hole 31a (the rotary shaft 2). The inner through holes 31b are formed with the same length in the radial direction and the smaller length in the circumferential direction, as compared with the outer through holes 31b.

The rotor cores 32 are provided which correspond to the through holes 31b of the rotor base 31. More specifically, the rotor cores 32 include the rotor cores 32 (which will be called "outer rotor cores 32") fixed to the outer through holes 31b, and the rotor cores 32 (which will be called "inner rotor cores 32") fixed to the inner through holes 31b. The inner rotor cores 32 are positioned at the same angles as the outer rotor cores 32 about the insertion hole 31a (the rotary shaft 2). The inner rotor cores 32 are formed with the same length in the radial direction of the rotary shaft 2, and the smaller length in the circumferential direction, as compared with the outer rotor cores 32.

Figure 17:
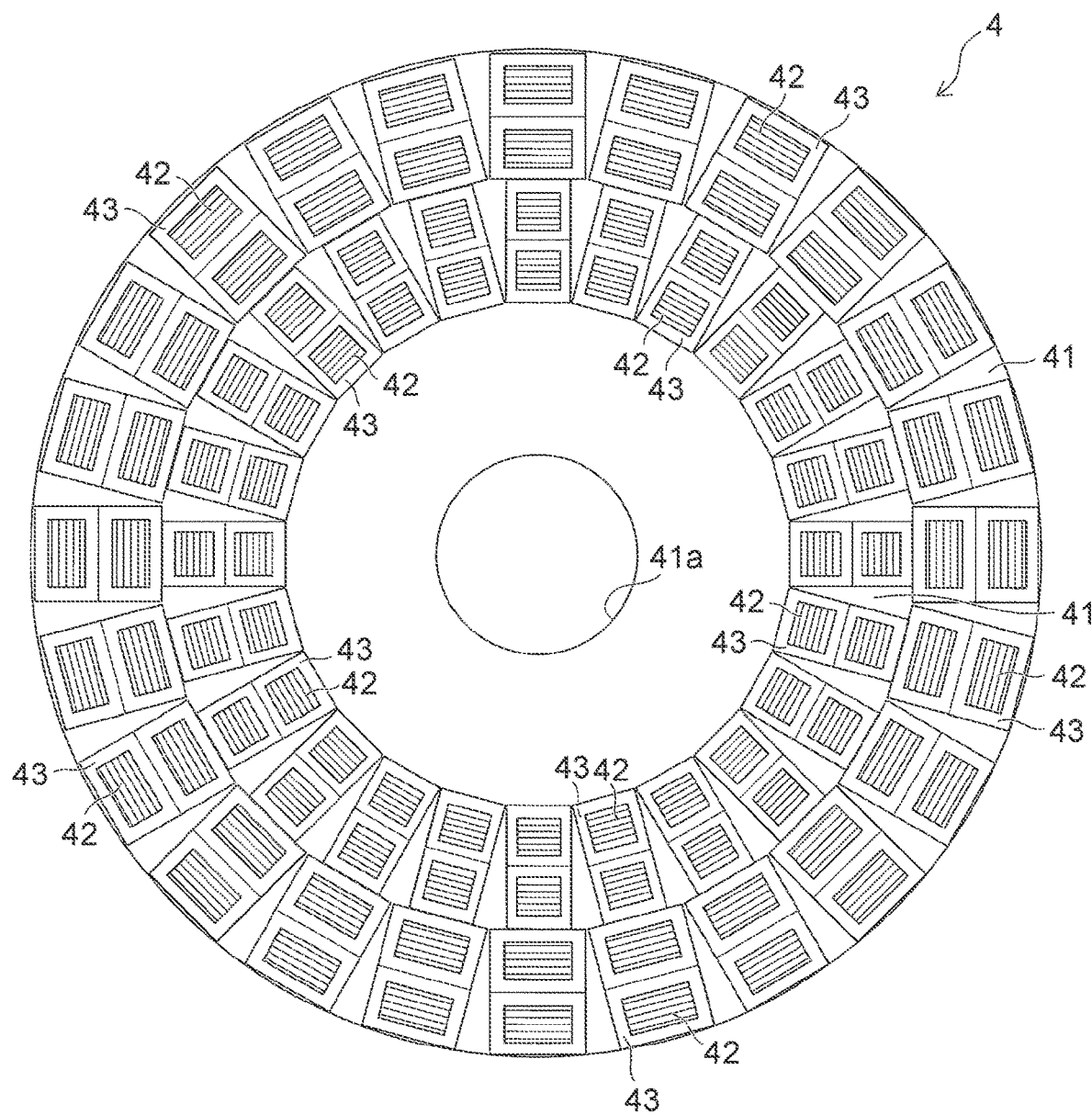
FIG. 17 is a cross-sectional view showing the structure of a stator, which is taken along line XVII-XVII of FIG. 15.

As shown in FIG. 15 and FIG. 17, a plurality of through holes 41b is formed in a radially inner portion, as well as a radially outer portion, of the stator base 41. Namely, in this embodiment, not only the through holes 41b (which will be called "outer through holes 41b") of the first embodiment are formed, but also the through holes 41b (which will be called "inner through holes 41b") are formed on the inner side of the outer through holes 41b.

Like the outer through holes 41b, a pair of inner through hole 41b are provided adjacent to each other in the radial direction of the stator base 41. The paired inner through holes 41b are formed at the same angles as the paired outer through holes 41b about the insertion hole 41a (the rotary shaft 2). The inner through holes 41b are formed with the same length in the radial direction and the smaller length in the circumferential direction, as compared with the outer through holes 41b.

The stator cores 42 are provided which correspond to the through holes 41b of the stator bases 41. More specifically, the stator cores 42 include the stator cores 42 (which will be called "outer stator cores 42") fixed to the outer through holes 41b, and the stator cores 42 (which will be called "inner stator cores 42") fixed to the inner through holes 41b. The inner stator cores 42 are positioned at the same angles as the outer stator cores 42 about the insertion hole 41a (the rotary shaft 2). The inner stator cores 42 are formed with the same length in the radial direction of the rotary shaft 2 and the smaller length in the circumferential direction, as compared with the outer stator cores 42.

Figure 18:
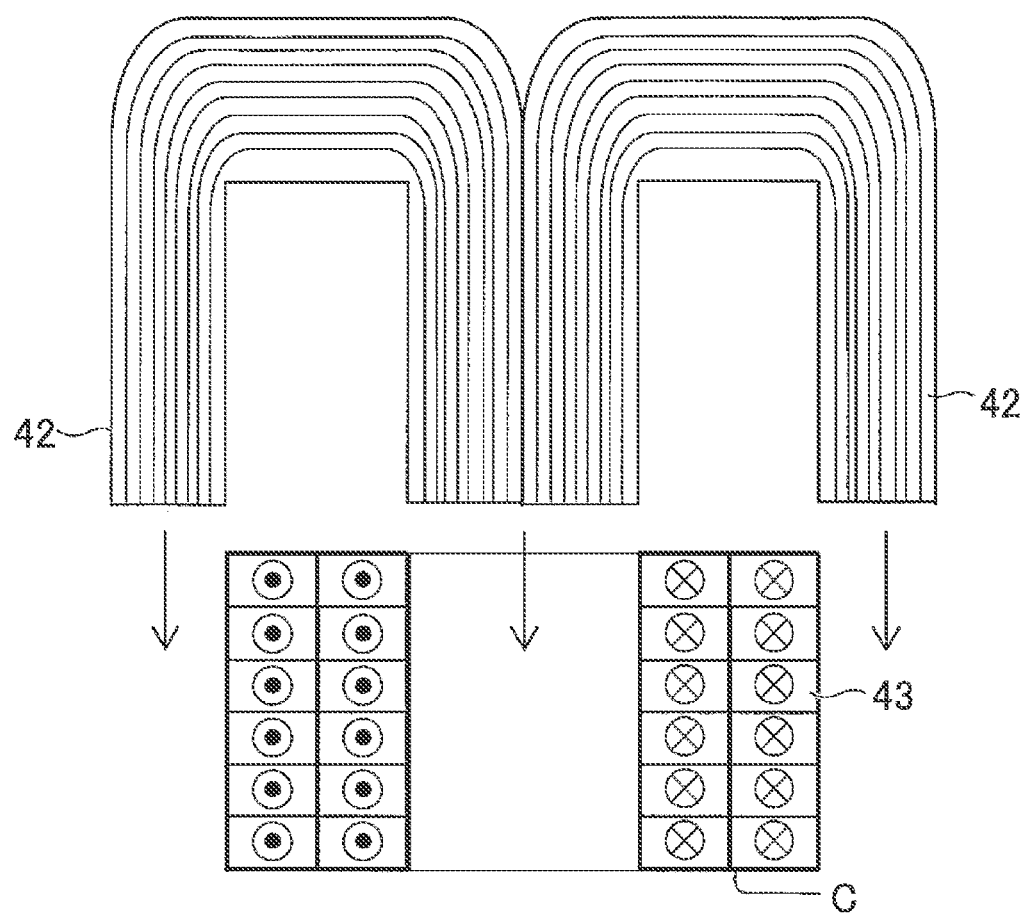
FIG. 18 is a cross-sectional view useful for describing a method of mounting coils on stator cores of a third modified example of the disclosure.
Figure 19:
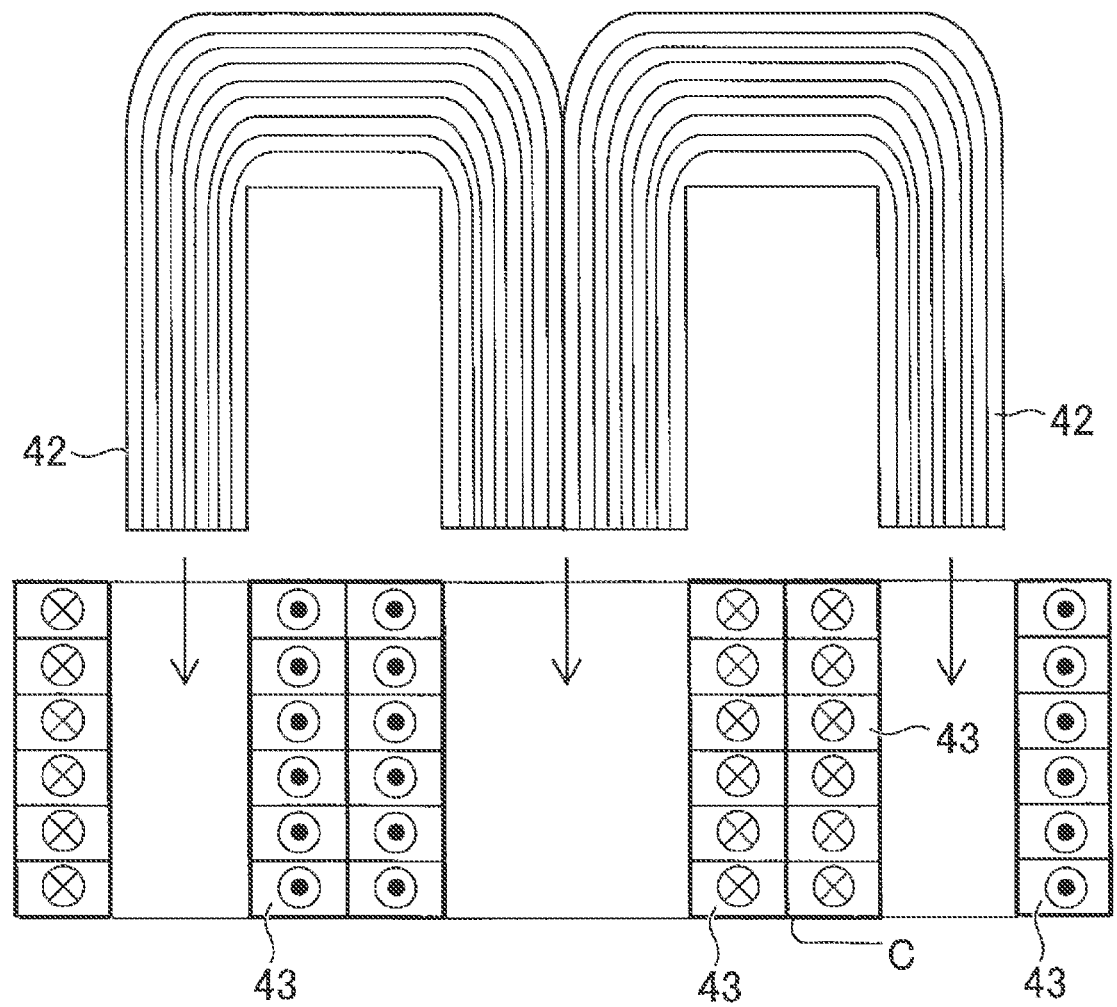
FIG. 19 is a cross-sectional view useful for describing a method of mounting coils on stator cores of a fourth modified example of the disclosure.

The method of mounting the coils 43 on the stator cores 42 is similar to that of the first embodiment, but end portions of the outer stator core 42 and inner stator core 42 may be inserted in an insertion hole of one coil 43, as in a third modified example shown in FIG. 18. Also, as in a fourth modified example shown in FIG. 19, three coils 43 connected in series may be arranged side by side, while the outer stator core 42 and the inner stator core 42 may be arranged side by side, and end portions of the stator cores 42 may be inserted in insertion holes of the coils 43.

The other structure of the second embodiment is similar to or identical with that of the first embodiment.

In the second embodiment, two or more rows of rotor cores 32 are formed and fixed in the circumferential direction of the rotor base 31, and two or more rows of stator cores 42 are formed and fixed in the circumferential direction of the stator base 41. Thus, the number of the rotor cores 32 and that of the stator cores 42 can be easily increased, and the output torque relative to the motor size can be further improved.

The other effects of the second embodiment are similar to or identical with those of the first embodiment.

Third Embodiment

In a third embodiment, an axial gap motor 1 that can be cooled will be described. While this embodiment will be described with reference to a figure in which a single row of rotor cores 32 and a single row of stator core 42 are provided as in the first embodiment, two or more rows of rotor cores 32 and two or more rows of stator cores 42 may be provided as in the second embodiment.

Figure 20:
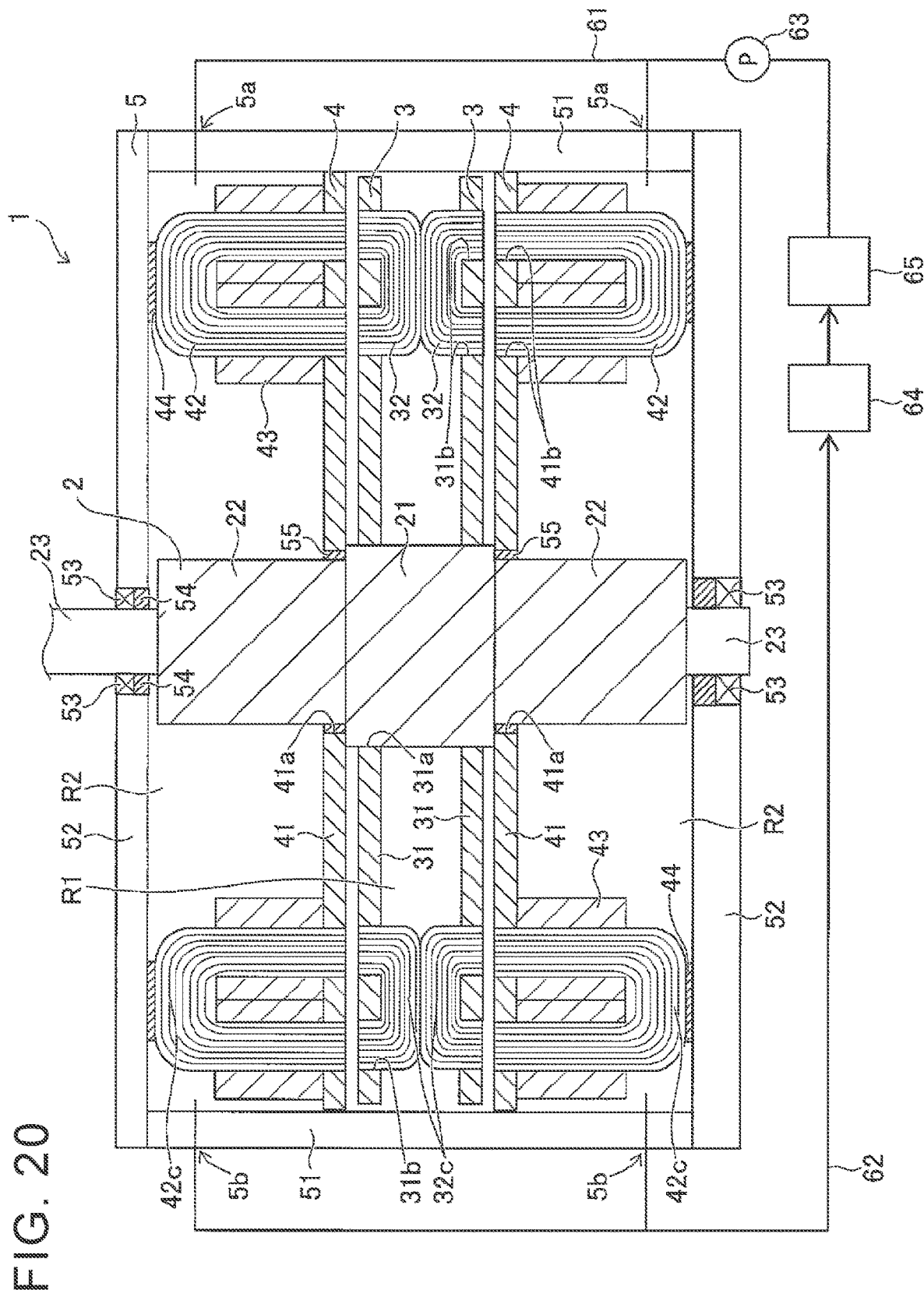
FIG. 20 is a schematic cross-sectional view showing the overall configuration of an axial gap motor according to a third embodiment of the disclosure, and a pump, etc. for cooling.

In the third embodiment, the rotors 3 and the stators 4 are housed in the case 5 in a sealed state, as shown in FIG. 20. More specifically, a seal member 54, in addition to the bearing member 53, is disposed between an inner wall of an insertion hole of each lid portion 52 through which the rotary shaft 2 is inserted, and an outer circumferential surface of each small-diameter portion 23 of the rotary shaft 2. The seal member 54 is located adjacent to the inner side of the case 5, relative to the bearing member 53, and prevents a coolant that will be described later from leaking to the outside of the case 5. The seal member 54 is not particularly limited, but a labyrinth seal, mechanical seal, packing, or the like, may be used as the seal member 54.

Also, a seal member 55 is disposed between an inner wall of the insertion hole 41a of each stator base 41, and an outer circumferential surface of each middle-diameter portion 22 of the rotary shaft 2. The seal member 55 prevents the coolant from leaking from a first region R1 that will be described later, to second regions R2 that will also be described later. The seal member 55 is not particularly limited, but a labyrinth seal, mechanical seal, packing, or the like, may be used as the seal member 55.

The interior of the case 5 is partitioned by the stator bases 41 and the seal members 55, into a plurality of (three in this embodiment) regions in a sealed state, in the axial direction of the rotary shaft 2. Here, the interior of the case 5 is partitioned into a first region R1 in which the rotors 3 are placed, and two second regions R2 which are disposed on the opposite sides of the first region R1, and in which the rotors 3 are not placed. Then, the second regions R2 are filled with the coolant. The coolant is not particularly limited, but insulating oil, for example, may be used. As the insulating oil, insulating oil specified according to JIS C 2320, or oil, such as automatic transmission fluid (ATF), may be used. In this case, the insulating property against the drive voltage of the motor can be sufficiently assured.

The case 5 is provided with coolant inlets 5a and coolant outlets 5b, so that the coolant flows through the second regions R2. More specifically, the coolant inlets 5a into which downstream ends of a coolant supply pipe 61 are inserted are provided in portions of the side portion 51 of the case 5 which partially define the second regions R2, and the coolant outlets 5b into which upstream ends of a coolant discharge pipe 62 are inserted are provided in portions of the side portion 51 located opposite to the coolant inlets 5a.

A pump 63 is provided between a downstream end of the coolant discharge pipe 62 and an upstream end of the coolant supply pipe 61. Also, in the middle of the coolant discharge pipe 62, a cooler 64 that cools the coolant, and a coolant tank 65 that stores the coolant, are provided.

The method of cooling by use of the cooler 64 is not limited to any particular method. The cooler 64 may consist of cooling fins, or may be a chiller (coolant circulation device), or may cool the coolant by other methods.

In this embodiment, when the pump 63 is driven, the coolant is pumped up from the coolant tank 65, and is fed to the second regions R2 through the coolant supply pipe 61. The coolant flows through the case 5 while absorbing heat (in particular, heat of the coils 43) in the second regions R2, and is discharged through the coolant discharge pipe 62. Then, the coolant is cooled by the cooler 64, and then returns to the coolant tank 65.

In this embodiment, the seal members 54, 55 are provided, and the second regions R2 are cooled in the sealed state. However, a bag, such as a plastic bag, which is made of resin and has flexibility or a high degree of freedom in deformation, may be placed in the second region R2, for example, and the coolant may be caused to flow through the bag. With this arrangement, the seal members 54, 55 may not be provided. Also, in this case, a coolant having no insulating property may be used.

The other structure of the third embodiment is similar to or identical with those of the first and second embodiments.

In this embodiment, the interior of the case 5 is partitioned into the first region R1 in which the rotors 3 are placed, and the second regions R2 in which the coils 43 are placed, and the case 5 is provided with the coolant inlets 5a and the coolant outlets 5b, so that the coolant flows through the second regions R2, as described above. With this arrangement, the coolant deprives heat of the coils 43 when flowing through the second regions R2, so that the coils 43 that generate heat during energization are cooled by the coolant, and the temperature of the axial gap motor 1 is less likely or unlikely to be high. Also, the coolant is inhibited from flowing through the first region R1 in which the rotors 3 are placed; therefore, the coolant is prevented from becoming a load on the rotating rotors 3, and impeding rotation of the rotors 3.

The other effects of the third embodiment are similar to or identical with those of the first and second embodiments.

Fourth Embodiment

In a fourth embodiment, an axial gap motor 1 capable of surely providing high output torque will be described.

Figure 21:
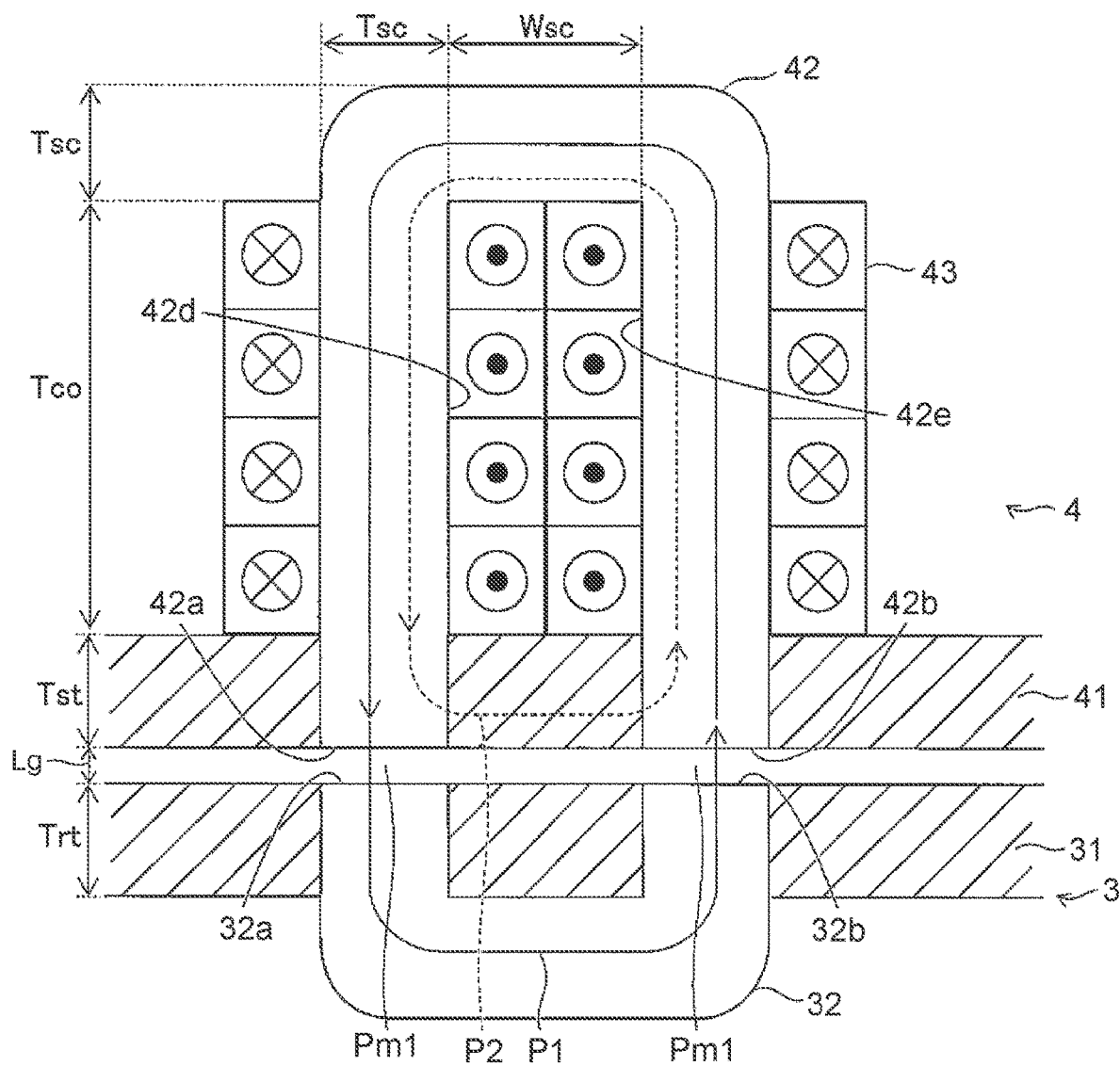
FIG. 21 is a schematic cross-sectional view showing the structure of a stator core, a rotor core, and their vicinity of an axial gap motor according to a fourth embodiment of the disclosure.

As shown in FIG. 21, in a condition where the end faces 32a, 32b of the rotor core 32 are opposed to the end faces 42a, 42b of the stator core 42, the magnetic flux emits from the end face 42a of the stator core 42, and enters the end face 32a of the rotor core 32. Then, after passing through the inside of the rotor core 32, the magnetic flux emits from the end face 32b, and enters the end face 42b of the stator core 42. Here, a first path P1 is established as a path along which the magnetic flux passes through the rotor core 32, stator core 42, and magnetic paths Pm1 between the rotor core 32 and the stator core 42 (see solid-line arrow P1 in FIG. 21).

In the meantime, it is not the entire magnetic flux generated in the stator core 42 that emits from the end face 42a and enters the end face 32a of the rotor core 32. More specifically, the stator core 42 has a pair of inner faces 42d, 42e opposed to each other and formed continuously with the end faces 42a, 42b, respectively. Then, a part of the magnetic flux that passes through the stator core 42 emits from the inner face 42d and enters the inner face 42e. Also, since gaps are formed between the end faces 42a, 42b of the stator core 42 and the end faces 32a, 32b of the rotor core 32, a part of the magnetic flux emits from the end face 42a and enters the end face 42b without passing through the rotor core 32. In the following description, the magnetic flux that emits from the inner face 42d and enters the inner face 42e, and the magnetic flux that emits from the end face 42a and enters the end face 42b without passing through the rotor core 32, will be called "leakage flux". It is, however, to be noted that the gaps between the end faces 42a, 42b of the stator core 42 and the end faces 32a, 32b of the rotor core 32 are narrow (less than 1 mm); therefore, substantially the entire magnetic flux that emits from the end face 42a of the stator core 42 enters the end face 32a of the rotor core 32. Namely, substantially the entire leakage flux is provided by the magnetic flux that emits from the inner face 42d and enters the inner face 42e, and the proportion of the magnetic flux that emits from the end face 42a and enters the end face 42b without passing through the rotor core 32 is negligibly small. Thus, in the following description, the leakage flux will be defined as the magnetic flux that emits from the inner face 42d and enters the inner face 42e. Here, a second path P2 is established as a path along which the magnetic flux passes through the stator core 42 and between the inner faces 42d, 42e (see broken-line arrow P2 in FIG. 21). While the leakage flux emits from the entire area of the inner face 42d and enters the entire area of the inner face 42e, the path along which the leakage flux passes is schematically represented by a single arrow in FIG. 21.

As the leakage flux increases, the magnetic flux that passes through the rotor core 32 is reduced, and the output torque of the axial gap motor 1 is reduced. For example, the leakage flux increases as the distance Wsc between the inner faces 42d, 42e of the stator core 42 is reduced. However, the stator 4 as shown in FIG. 21 is normally designed, so that the distance Wsc between the inner faces 42d, 42e of the stator core 42 is reduced, so as to reduce the amount of materials used for the cores and coils. As the distance Wsc is reduced, the leakage flux is more likely to be increased, and the output torque is more likely to be reduced.

Thus, in this embodiment, the leakage flux is reduced, so as to obtain high output torque. The amount of leakage flux, namely, the amount of magnetic flux that passes along the second path P2, is determined by magnetic resistance Rm1 [1/H] of the first path P1 and magnetic resistance Rm2 [1/H] of the second path P2. In the following, the method of calculating the magnetic resistance Rm1 [1/H] of the first path P1 and the magnetic resistance Rm2 [1/H] of the second path P2 will be described.

Generally, the magnetic resistance Rm [1/H] is calculated according to Eq. (1) below, using $\mu$ [H/m] representing the magnetic permeability of the material, S [m$^2$] representing the cross-sectional area through which the magnetic flux passes, and L [m] representing the magnetic path length (the length over which the magnetic flux passes).

$$Rm = \frac{L}{\mu * S} \quad (1)$$

Figure 22:
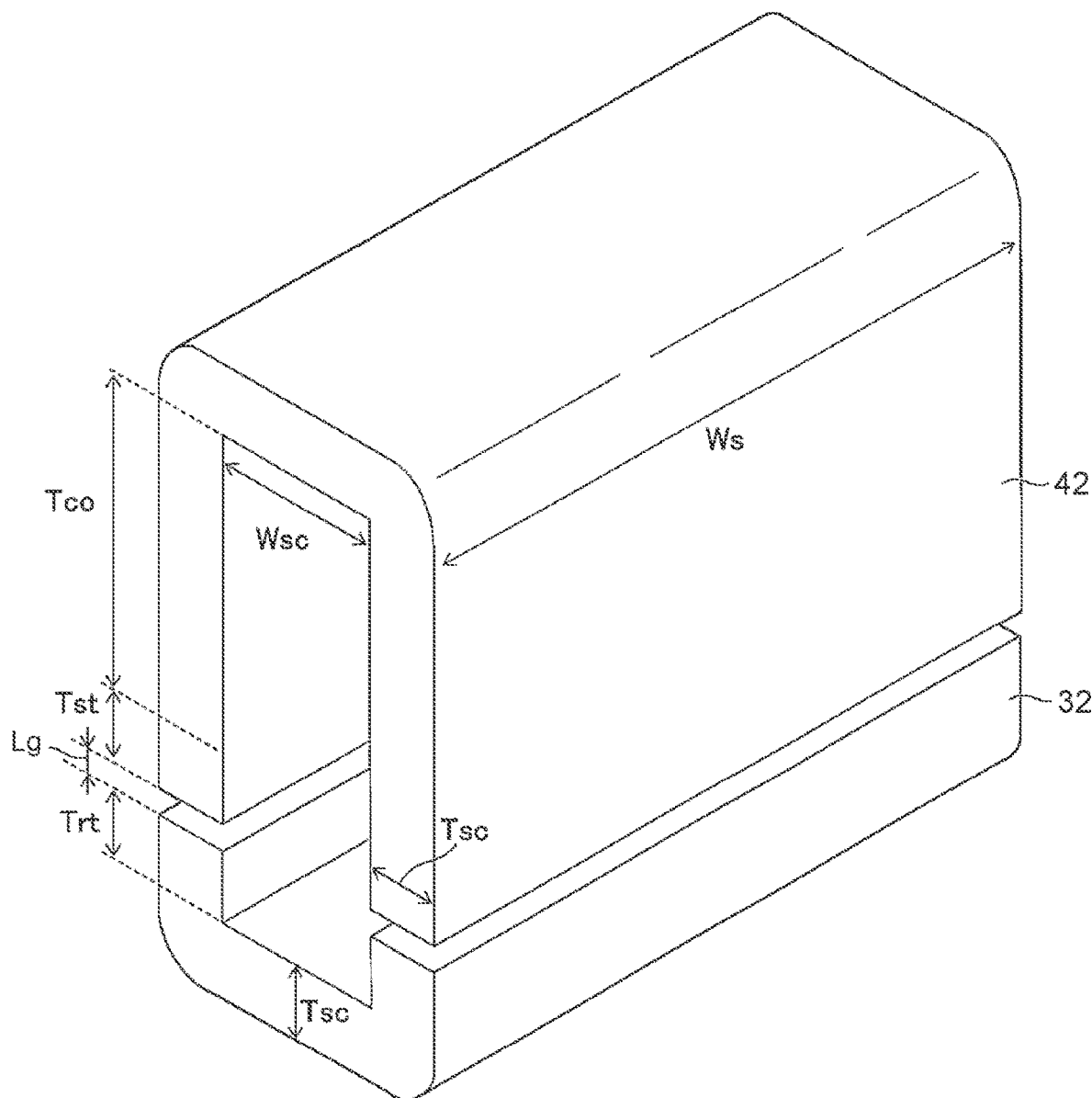
FIG. 22 is a perspective view showing the structure of the stator core and rotor core of the axial gap motor according to the fourth embodiment of the disclosure.

The magnetic resistance Rm1 [1/H] of the first path P1 and the magnetic resistance Rm2 [1/H] of the second path P2 will be calculated, using Eq. (1) above. As shown in FIG. 21 and FIG. 22, Wsc [m] denotes the distance between the inner faces of the stator core 42 and those of the rotor core 32, Ws [m] denotes the depth (the width of the strip-shaped magnetic steel sheet) of the stator core 42 and the rotor core 32, Tsc [m] denotes the lamination thickness of the stator core 42 and the rotor core 32, Tco [m] denotes the height of portions of the inner faces 42d, 42e of the stator core 42 to which the coils 43 are opposed, Tst [m] denotes the height of portions of the inner faces 42d, 42e of the stator core 42 to which the coils 43 are not opposed (in this embodiment, portions opposed to the stator base 41), Trt [m] denotes the height of the inner faces of the rotor core 32 (in this embodiment, portions opposed to the rotor base 31), and Lg [m] denotes a gap length between the end faces 32a, 32b of the rotor core 32 and the end faces 42a, 42b of the stator core 42. Also, $\mu$ [H/m] denotes the magnetic permeability of the magnetic steel sheet, and $\mu_0$ [H/m] denotes the magnetic permeability of free space. The magnetic permeability of the stator base 41 and the coils 43 is substantially equal to the permeability of free space, and therefore, the permeability of free space $\mu_0$ [H/m] is used. In this case, the magnetic resistance Rm1 [1/H] of the first path P1 and the magnetic resistance Rm2 [1/H] of the second path P2 can be calculated according to Eq. (2) and Eq. (3) below, while using Eq. (1) above.

$$Rm1 = \frac{2(Tco + Tst + Trt + Wsc)}{\mu * Tsc * Ws} + \frac{2 * Lg}{\mu_0 * Tsc * Ws} \quad (2)$$

$$Rm2 = \frac{2 * Tco + 2 * Tst + Wsc}{\mu * Tsc * Ws} + \frac{Wsc}{\mu_0 * Ws * (Tco + Tst)} \quad (3)$$

The first term on the right-hand side of Eq. (2) indicates the magnetic resistance of the inside of the stator core 42 and rotor core 32, and the second term on the right-hand side indicates the magnetic resistance of the magnetic paths Pm1 between the end faces 32a, 32b of the rotor core 32 and the end faces 42a, 42b of the stator core 42. Where Sr denotes the area of each of the end faces 32a, 32b of the rotor core 32, Sr=Tsc*Ws.

Also, the first term on the right-hand side of Eq. (3) indicates the magnetic resistance of the inside of the stator core 42, and the second term on the right-hand side indicates the magnetic resistance between the inner faces 42d, 42e of the stator core 42. Where Ss denotes the area of each of the inner faces 42d, 42e of the stator core 42, Ss=Ws*(Tco+Tst).

Next, the ratio of the magnetic flux density $\phi 1$ [T] of the first path P1 to the magnetic flux density $\phi 2$ [T] of the second path P2 is obtained. Here, the ratio $\mu/\mu_0$ of the magnetic permeability $\mu$ [H/m] of the magnetic steel sheet to the magnetic permeability $\mu_0$ [H/m] of free space is equal to about 80000; therefore, the first term on the right-hand side of Eq. (2) and the first term on the right-hand side of Eq. (3) are negligible. Namely, the magnetic resistance Rm1 [1/H] of the first path P1 can be regarded as the magnetic resistance of the magnetic paths Pm1, and the magnetic resistance Rm2 [1/H] of the second path P2 can be regarded as the magnetic resistance between the inner face 42d and the inner face 42e. Also, the magnetic flux density $\phi 1$ [T] and the magnetic flux density $\phi 2$ [T] are inversely proportional to the magnetic resistance Rm1 [1/H] and the magnetic resistance Rm2 [1/H], respectively. Accordingly, the ratio of the magnetic flux density $\phi 1$ [T] of the first path P1 to the magnetic flux density $\phi 2$ [T] of the second path P2 is expressed by Eq. (4) below.

$$\frac{\phi 1}{\phi 2} = \frac{Rm2}{Rm1} = \frac{Wsc}{2 * Lg} \times \frac{Tsc}{Tco + Tst} = K \quad (4)$$

In Eq. (4), K denotes the ratio of the magnetic flux density $\phi 1$ [T] to the magnetic flux density $\phi 2$ [T].

Then, the ratio (which will also be called "torque ratio") of the output torque to the output torque where it is assumed that there is no leakage flux will be obtained. Here, the output torque is proportional to the square of the magnetic flux density, and the saturated magnetic flux density of the magnetic steel sheet is expressed as Bm=$\phi 1+\phi 2$ [T]; therefore, the torque ratio Tr is expressed by Eq. (5) below.

$$Tr = \frac{\phi 1^2}{Bm^2} = \frac{\phi 1^2}{(\phi 1 + \phi 2)^2} = \frac{(\phi 1/\phi 2)^2}{(\phi 1/\phi 2 + 1)^2} = \frac{K^2}{(K+1)^2} \quad (5)$$

Figure 23:
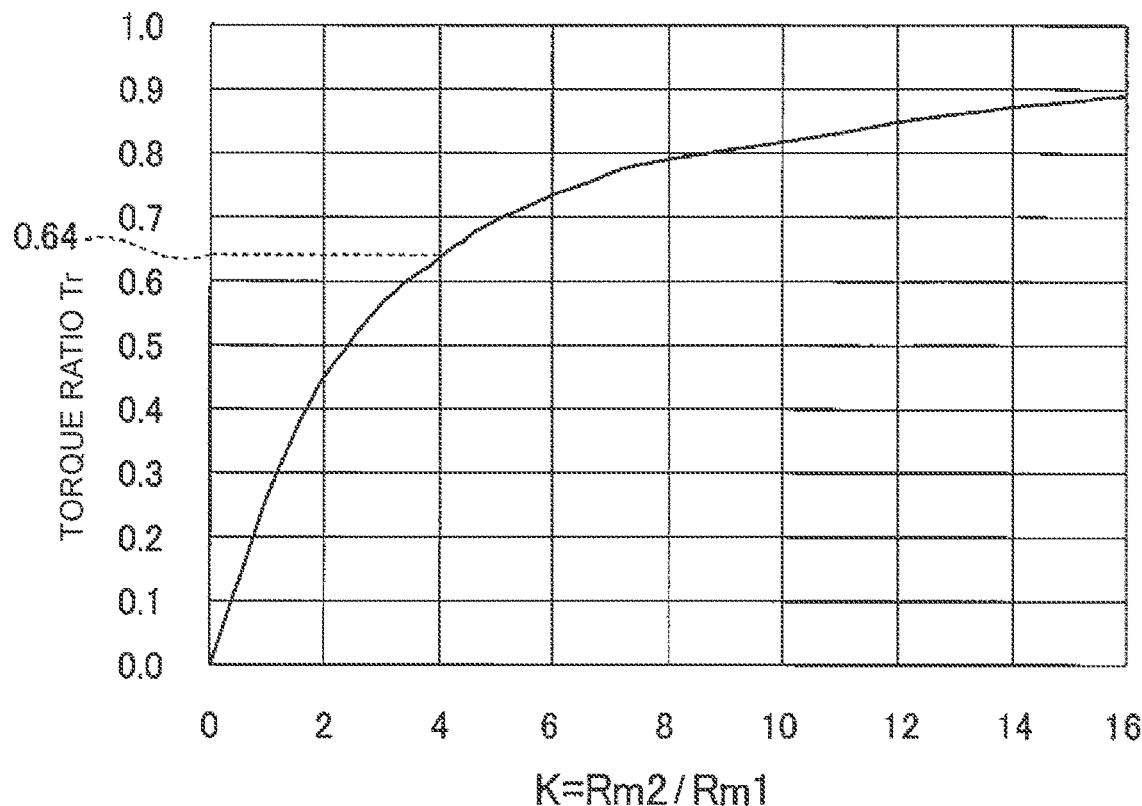
FIG. 23 is a view showing the relationship between K(=Rm2/Rm1) and the torque ratio Tr.
Figure 24:
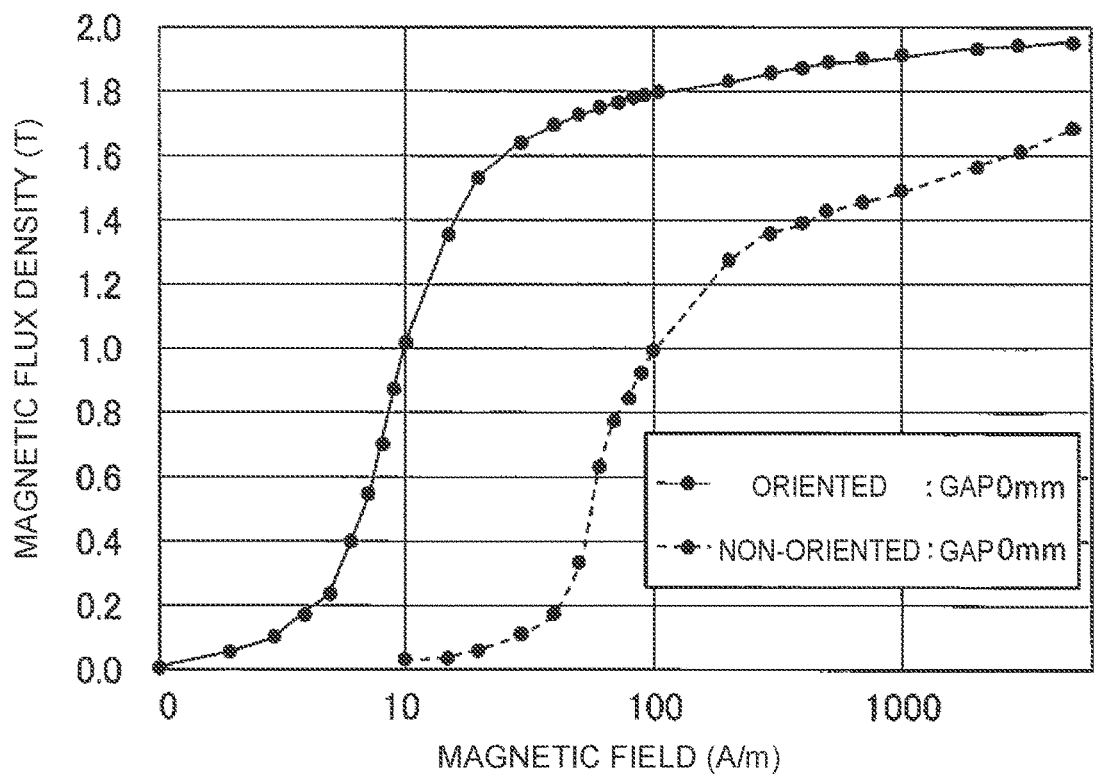
FIG. 24 is a view showing the relationship between the magnetic field strength and the magnetic flux density, when oriented magnetic steel sheets and non-oriented magnetic steel sheets are used for the rotor cores and the stator cores.

The relationship between K and the torque ratio Tr as shown in FIG. 23 is obtained from Eq. (5). FIG. 24 is a graph indicating the relationship between the magnetic field strength and the magnetic flux density, when the oriented magnetic steel sheet or non-oriented magnetic steel sheet is used for the rotor core 32 and the stator core 42, and the gap between the rotor core 32 and the stator core 42 is set to 0 mm (no gap) (no leakage flux). As shown in FIG. 24, when the non-oriented magnetic steel sheet is used, a large magnetic field is not required until the magnetic flux density reaches 1.5 [T], but a considerably large magnetic field is required once the magnetic flux density exceeds 1.5 [T]. Thus, when the non-oriented magnetic steel sheet is used, a considerably large electric field is required so as to make the magnetic flux density larger than 1.5 [T]; thus, 1.5 [T] is the upper limit of the magnetic flux density in actual use. In this embodiment, the axial gap motor 1 is constructed so as to provide output torque that is larger than the output torque obtained when the non-oriented magnetic steel sheet is used.

Here, since the saturated magnetic flux density of the magnetic steel sheet is 1.9 [T], output torque that is larger than the output torque obtained when the non-oriented magnetic steel sheet is used is obtained, when K>$\phi 1/\phi 2$=1.5/(1.9−1.5)=3.75, using Eq. (4). In this embodiment, the distance Wsc [m], lamination thickness Tsc [m], height Tco [m], height Tst [m], and gap length Lg [m] are set, so as to satisfy K≥4.0, as will be described later. When K≥4.0 is satisfied, the torque ratio Tr that is equal to or larger than 0.64 can be obtained, as shown in FIG. 23.

Figure 25:
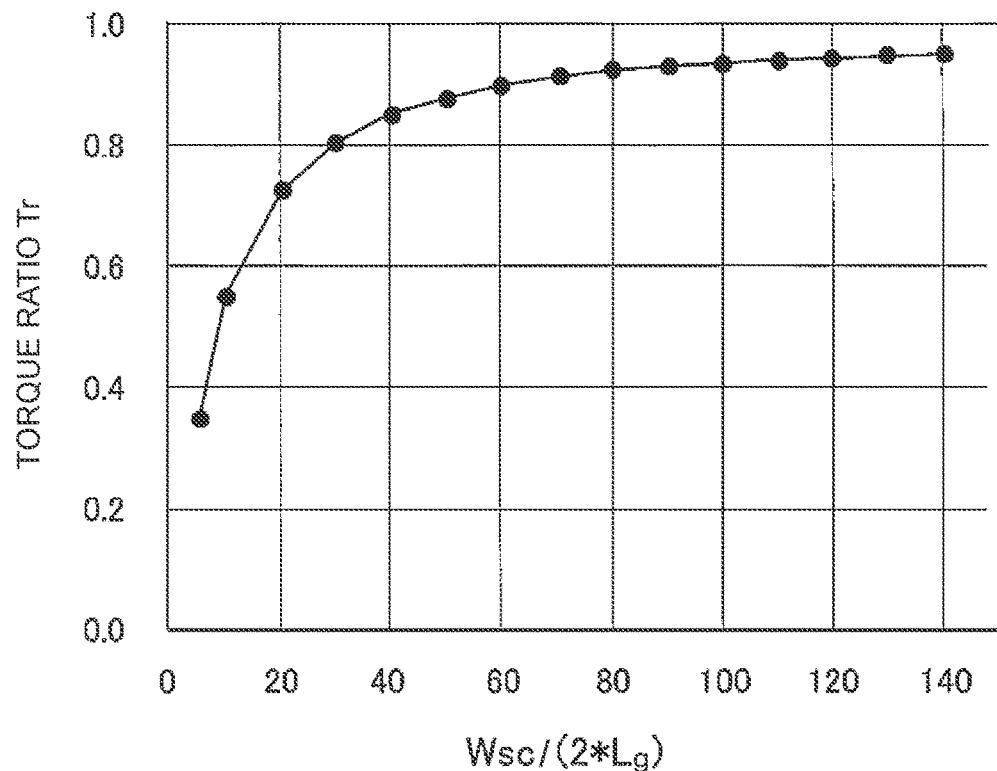
FIG. 25 is a view showing the relationship between Wsc/(2*Lg) and the torque ratio Tr.
Figure 26:
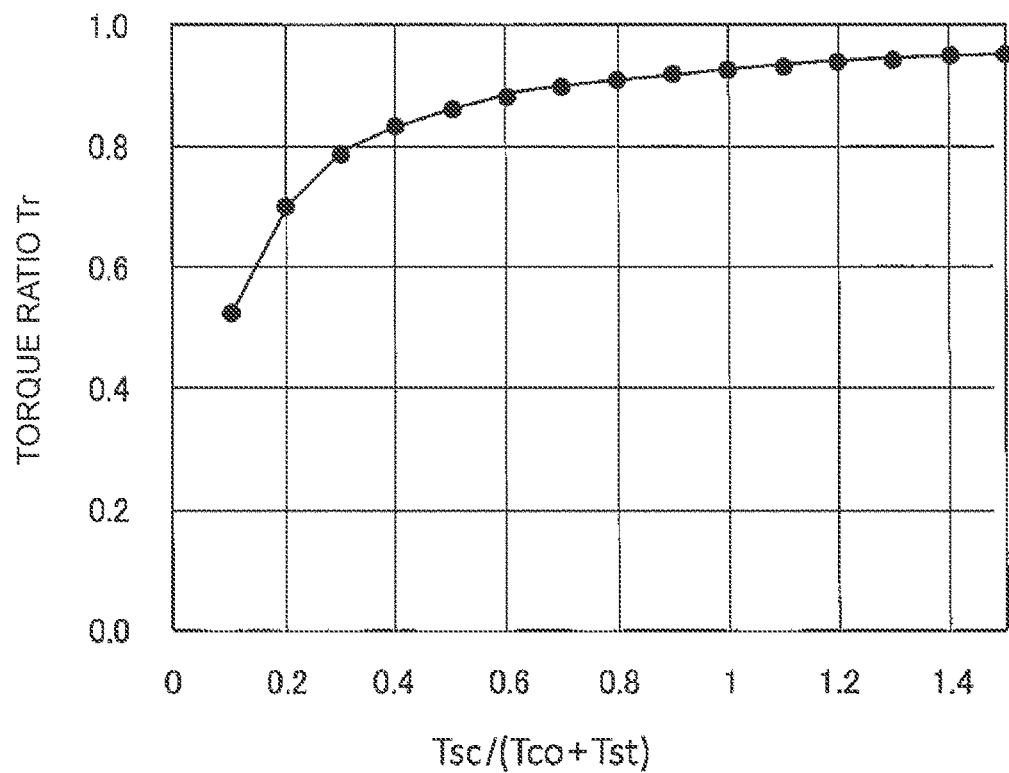
FIG. 26 is a view showing the relationship between Tsc/(Tco+Tst) and the torque ratio Tr.

From Eq. (4) and Eq. (5), the relationship between the torque ratio Tr and Wsc/(2*Lg) as shown in FIG. 25, for example, is obtained, and the relationship between the torque ratio Tr and Tsc/(Tco+Tst) as shown in FIG. 26, for example, is obtained. FIG. 25 is a graph obtained when Tsc/(Tco+Tst) is set to a certain fixed value, and FIG. 26 is a graph obtained when Wsc/(2*Lg) is set to another fixed value. Wsc/(2*Lg) indicates the ratio of the distance (length) between the inner faces 42d, 42e of the second path P2, to the length of the magnetic paths Pm1 of the first path P1. Also, Tsc/(Tco+Tst) indicates the ratio of the cross-sectional area of the magnetic path Pm1 of the first path P1 to the cross-sectional area between the inner faces 42d, 42e of the second path P2 (the areas of the inner faces 42d, 42e).

As described above, the leakage flux (the magnetic flux that passes between the inner faces 42d, 42e) needs to be reduced, so as to obtain high output torque. Also, in order to reduce the leakage flux, the ratio of the magnetic resistance between the inner faces 42d, 42e to the magnetic resistance of the magnetic paths Pm1 may be increased.

More specifically, the magnetic resistance as expressed by Eq. (1) above is proportional to the magnetic path length (the length over which the magnetic flux passes), and is inversely proportional to the cross-sectional area through which the magnetic flux passes. As the magnetic length Lg of the magnetic path Pm1 increases, the magnetic resistance of the magnetic path Pm1 increases, and thus the leakage flux is increased. Also, as the cross-sectional area (in this embodiment, Sr=Tsc×Ws) of the magnetic path Pm1 increases, the magnetic resistance of the magnetic path Pm1 is reduced, and thus the leakage flux is reduced. Meanwhile, as the distance Wsc between the inner faces 42d, 42e increases, the magnetic resistance between the inner faces 42d, 42e increases, and thus the leakage flux is reduced. Also, as the cross-sectional area between the inner faces 42d, 42e (in this embodiment, Ss=(Tco+Tst)×Ws) increases, the magnetic resistance between the inner faces 42d, 42e is reduced, and thus the leakage flux is increased. Therefore, the leakage flux is reduced as the ratio Wsc/Lg of the length (distance Wsc) between the inner faces 42d, 42e to the magnetic path length (the gap length Lg) of the magnetic path Pm1 is increased, and the ratio Tsc/(Tco+Tst) of the cross-sectional area (in this embodiment, Tsc×Ws) through which the magnetic flux passes along the magnetic path Pm1 to the cross-sectional area (in this embodiment, (Tco+Tst)×Ws) through which the magnetic flux passes between the inner faces 42d, 42e is increased. Thus, Wsc/Lg and Tsc/(Tco+Tst) have great influences on the output torque of the axial gap motor 1.

As shown in FIG. 25, the gradient of the graph is large when Wsc/(2*Lg) is smaller than 20; therefore, it is preferable to set Wsc/(2*Lg) to 20 or larger when the torque ratio Tr is to be increased. However, if Wsc/(2*Lg) is excessively increased, the size of the stator core 42 is increased, and the number of the stator cores 42 that can be installed on the stator base 41 is reduced. Thus, Wsc/(2*Lg) is preferably equal to or smaller than 140, and is more preferably equal to or smaller than 40.

As shown in FIG. 26, the gradient of the graph is large when Tsc/(Tco+Tst) is smaller than 0.2; therefore, it is preferable to set Tsc/(Tco+Tst) to 0.2 or larger when the torque ratio Tr is to be increased. Namely, it is preferable that Sr/Ss=Tsc/(Tco+Tst)≥0.2. However, if Tsc/(Tco+Tst) is excessively increased, the lamination thickness of the stator core 42 becomes excessively large, or the number of turns of the coil 43 becomes excessively small. Thus, Tsc/(Tco+Tst) is preferably equal to or smaller than 1.5, and is more preferably equal to or smaller than 0.4.

Thus, the torque ratio Tr can be easily increased, by making Wsc/(2*Lg) equal to or larger than 20, and making Sr/Ss equal to or larger than 0.2. In this case, K becomes equal to or larger than 4.0, thus satisfying 3.75<K.

In this embodiment, the axial gap motor 1 is constructed, using the rotor cores 32 and stator cores 42 formed from the oriented magnetic steel sheets, so as to satisfy Wsc/(2*Lg) ≥20, and Sr/Ss≥0.2, as described above. As a result, larger output torque can be obtained, as compared with output torque obtained where an ideal axial gap motor that is free from flux leakage is assumed to be constructed, using rotor cores and stator cores formed from non-oriented magnetic steel sheets. Thus, the output torque can be surely increased, as compared with the case where the rotor cores and stator cores formed from the non-oriented magnetic steel sheets are used.

The other structure and effect of the fourth embodiment are similar to or identical with those of the first to third embodiments.

The embodiments disclosed herein should be considered as being not restrictive but exemplary in all aspects. The scope of the disclosure is defined by the appended claims, rather than description of the above embodiments, and further includes all changes within the range of the claims and equivalents thereof.

While the axial gap motor is constructed, using two rotors and two stators, in the above embodiments, the disclosure is not limited to this arrangement, but the axial gap motor may be constructed, using one rotor and one stator, for example. When two rotors and two stators are provided, the output torque relative to the motor size can be improved, as compared with the case where one rotor and one stator are provided. Also, the axial gap motor may be constructed, using three or more rotors and three or more stators. In this case, as described above in the above embodiments, it is preferable to provide two or more structural units, each of which consists of two rotors and two stators between which the rotors are interposed, in terms of deflection of the rotor bases, the axial size of the axial gap motor, and displacement of the center of gravity.

While the rotor cores of the two rotors are fixed to each other in the above embodiments, the disclosure is not limited to this arrangement, but the rotor cores of the two rotors may not be fixed to each other.

In the above embodiments, the rotor cores of the two rotors are disposed at the same angular positions, and the stator cores of the two stators are disposed at the same angular positions. However, the disclosure is not limited to this arrangement. The stator cores (or rotor cores) of the two stators (or rotors) may be disposed at different angular positions. For example, the stator cores of one of the two stators may be shifted by a half of the angular pitch (7.5° in the above embodiments), relative to those of the other stator. With the angular positions thus shifted, fluctuations in torque (which will also be called "torque ripples") can be reduced.

While two rows of the rotor cores and two rows of the stator cores are provided in the second embodiment, the disclosure is not limited to this arrangement, but three or more rows of rotor cores and three or more rows of stator cores may be provided.

Also, in the second embodiment, the same number of rotor cores are provided as the inner rotor cores and the outer rotor cores, and the inner rotor cores are disposed at the same angles as the outer rotor cores about the rotary shaft. However, the disclosure is not limited to this arrangement, but the number of the inner rotor cores may be different from the number of the outer rotor cores. Also, the inner rotor cores may be disposed at different angles (positions shifted in the circumferential direction) from the outer rotor cores about the rotary shaft. Similarly, the number of the inner stator cores may be different from the number of the outer stator cores. Also, the inner stator cores may be disposed at different angles (positions shifted in the circumferential direction) from the outer stator cores about the rotary shaft.

While the equations representing the relationships among Ns, Nr, and ε are indicated by way of example when the patterns of combinations of the number of stator cores and the number of rotor cores are obtained in the first embodiment, it is possible to rotate the rotor even when neither of the above equations is satisfied.

In the above embodiments, bearing members may be provided between the outer peripheries of the rotor bases and the inner surface of the side portion of the case, and between the inner walls of the insertion holes of the stator bases and the outer circumferential surface of the rotary shaft. With this arrangement, vibrations caused by decentering can be reduced even when the rotor, or the like, is decentered.

Fifth Embodiment

Figure 27:
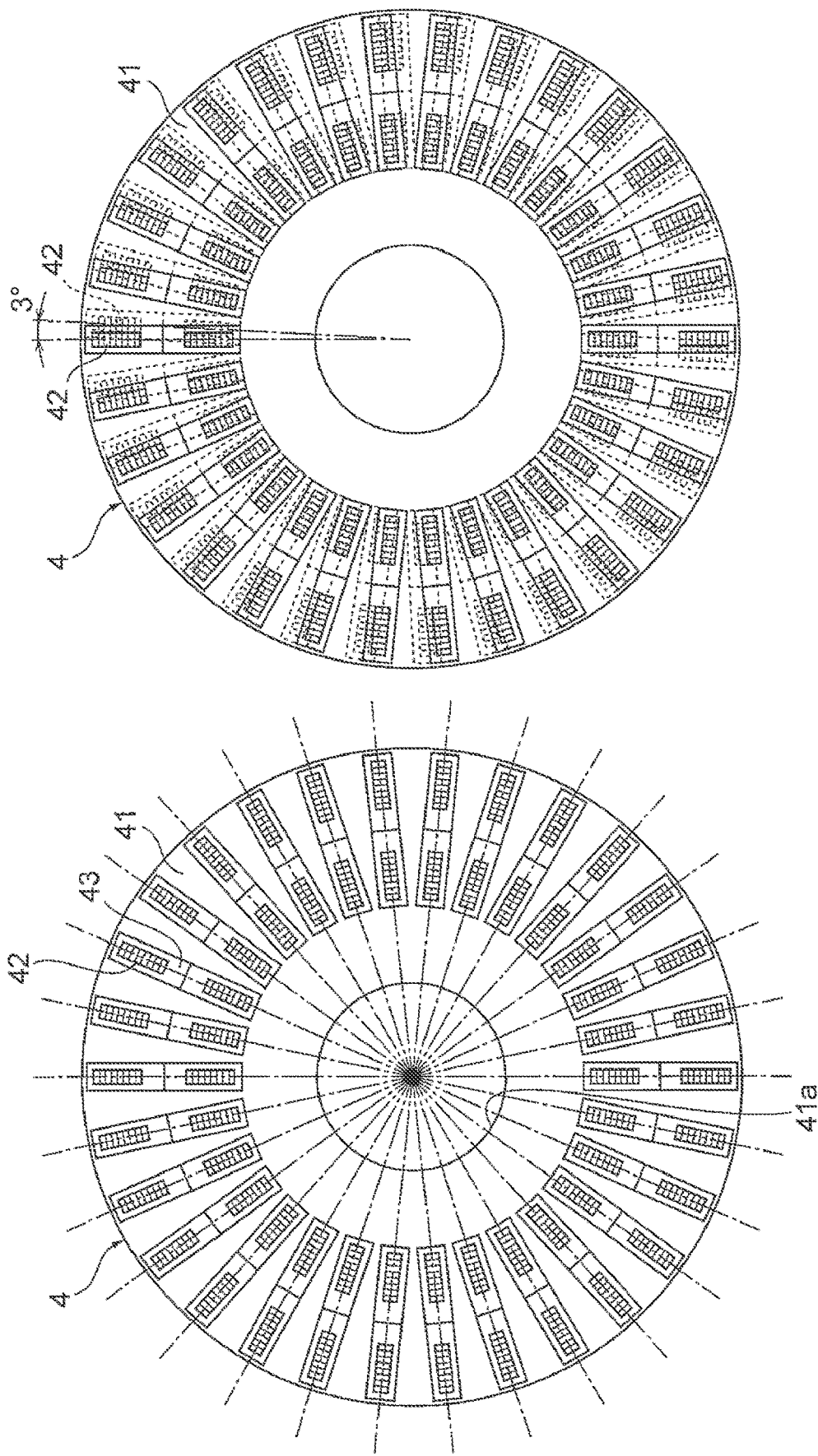
FIG. 27 is a cross-sectional view showing a stator of an axial gap motor according to a fifth embodiment of the disclosure.
Figure 28:
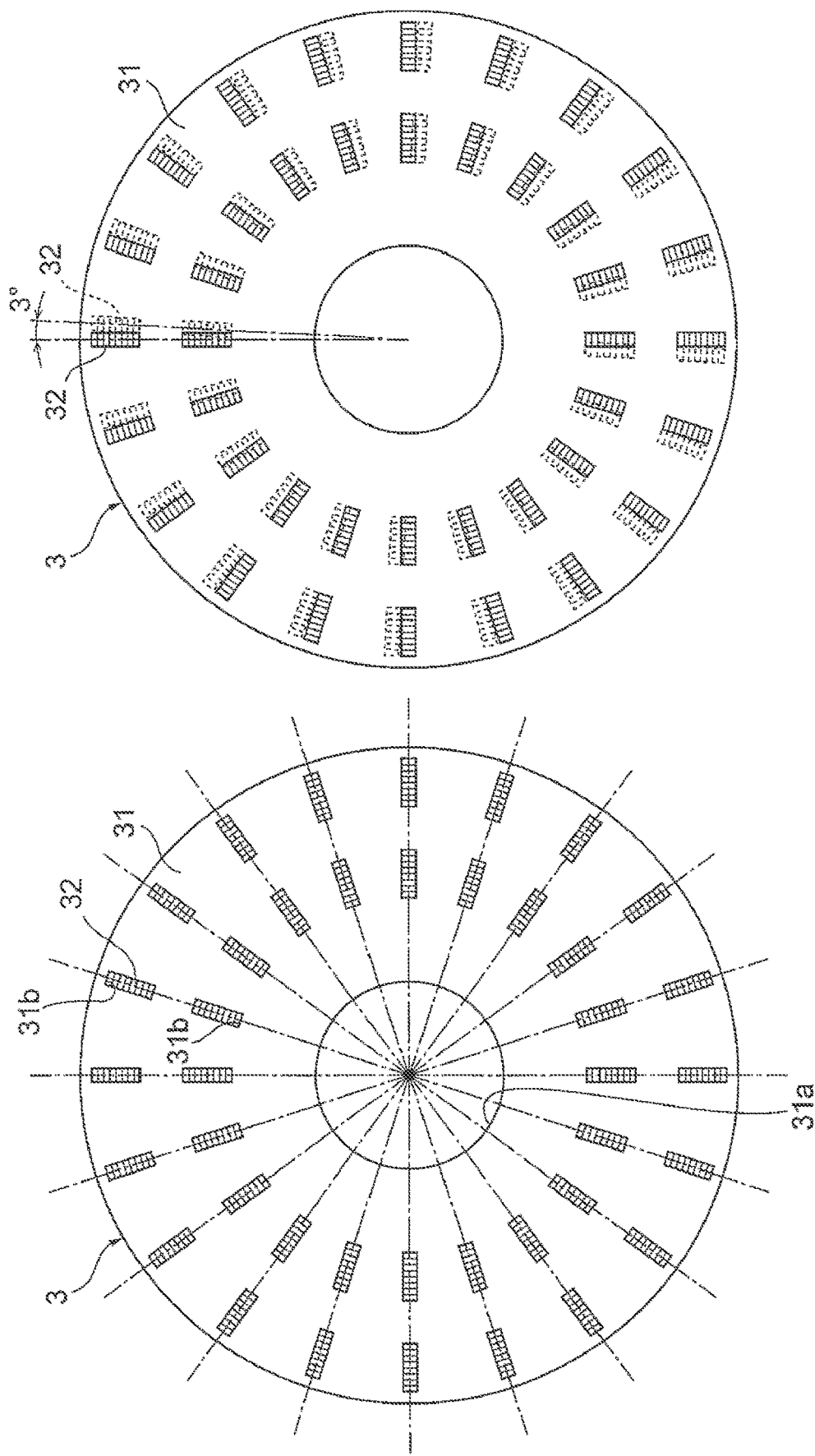
FIG. 28 is a cross-sectional view showing a rotor of the axial gap motor according to the fifth embodiment of the disclosure.

Referring to FIG. 1, FIG. 27, and FIG. 28, an axial gap motor 1 according to a fifth embodiment of the disclosure will be described. The axial gap motor 1 of this embodiment is a three-phase drive motor, and has two pairs of stators 4 and rotors 3 stacked in the axial direction of the rotary shaft 2. The two pairs of stators 4 and rotors 3 are arranged, such that two rotors 3 are interposed between two stators 4, as in the first embodiment shown in FIG. 1. On the paper of FIG. 1, one stator 4 and one rotor 3 located in the upper section will be referred to as the first pair, and one stator 4 and one rotor 3 located in the lower section will be referred to as the second pair.

As shown in the left drawing of FIG. 27, the stator 4 consists of a disk-shaped stator base 41 made of a non-magnetic material, 30 pieces (in other words, 30 poles) of stator cores 42 fixed and arranged in the circumferential direction of the stator base 41, and coils 43 wound around the stator cores 42. Thus, the number of stator cores Ns is equal to 30, and the angle θs between the stator cores is expressed as θs=360°/Ns=12°. Also, as shown in the left drawing of FIG. 28, the rotor 3 consists of a disk-shaped rotor base 31 made of a non-magnetic material, and 20 pieces (in other words, 20 poles) of rotor cores 32 fixed and arranged in the circumferential direction of the rotor base 31. Thus, the number of rotor cores Nr is equal to 20, and the angle θr between the rotor cores is expressed as θr=360°/Nr=18°. In this case, the step angle ε is expressed as ε=360° (1/Nr−1/Ns=6°).

As shown in the right drawing of FIG. 27, in this embodiment, the stator cores 42 (indicated by solid lines in FIG. 27) of the second pair are disposed at positions rotated ε/2=3° about the rotary shaft 2, relative to the stator cores 42 (indicated by broken lines in FIG. 27) of the first pair. Also, as shown in the right drawing of FIG. 28, when the axial gap motor 1 is in the initial position, the rotor cores 32 (indicated by solid lines in FIG. 28) of the second pair are disposed at positions rotated ε/2=3° about the rotary shaft 2, relative to the rotor cores 32 (indicated by broken lines in FIG. 28) of the first pair. With the rotor cores 32 of the second pair thus rotated 3° relative to the rotor cores 32 of the first pair, the locations of the back portions 32c of the rotor cores 32 are shifted a little from each other, but the areas of overlapping portions of the back portions 32c are relatively large, as compared with those of non-overlapping portions. Accordingly, the rotor cores 32 may be fixed to each other, by fixing the overlapping portions of the back portions 32c by welding, bonding, or with resin belts.

The operation and effect of the axial gap motor 1 according to this embodiment will be described.

At the time of switching of energization during rotary driving of the axial gap motor, the end faces (i.e., the end faces 32a, 32b) of the rotor cores are located at the farthest positions from the end faces (i.e., the end faces 42a, 42b) of the stator cores; therefore, the magnetic resistance is maximized, and the magnetic flux density is small. Thus, the rotative force (i.e., torque) of the rotor 3 is small. Then, as the end faces of the rotor cores become closer to the end faces of the stator cores, the magnetic resistance is reduced, and the magnetic flux density is rapidly increased. As a result, the torque of the rotor 3 is rapidly increased. When the end faces of the rotor cores reach the positions where they are opposed to the end faces of the stator cores, the magnetic flux density is maximized, but the torque becomes equal to zero. With the torque varied in this manner, torque ripples are large, and the rotary driving of the axial gap motor lacks smoothness, namely, the axial gap motor fails to be rotated or driven smoothly.

To solve this problem, in the axial gap motor 1 according to this embodiment, the stator cores 42 of the second pair are disposed at positions rotated 3° (namely, ε/2) relative to the stator cores 42 of the first pair, and the rotor cores 32 of the second pair are disposed at positions rotated 3° (namely, ε/2) relative to the rotor cores 32 of the first pair. With this arrangement, torque ripples can be reduced, and the axial gap motor 1 is rotated or driven more smoothly.

In this embodiment, the axial gap motor 1 has two pairs of the stators 4 and rotors 3 stacked in the axial direction of the rotary shaft 2. However, the number of pairs is not particularly limited to two, provided that the axial gap motor 1 has n pairs (where n is a natural number equal to or larger than 2) of stators 4 and rotors 3 stacked in the axial direction of the rotary shaft 2. In this case, in the initial position, the rotor cores of the (n+1)-th pair may be disposed at positions rotated by an angle of ε/(n+1) relative to the rotor cores of the n-th pair, and the stator cores of the (n+1)-th pair may be disposed at positions rotated by an angle of ε/(n+1) relative to the stator cores of the n-th pair.

Sixth Embodiment

Figure 29:
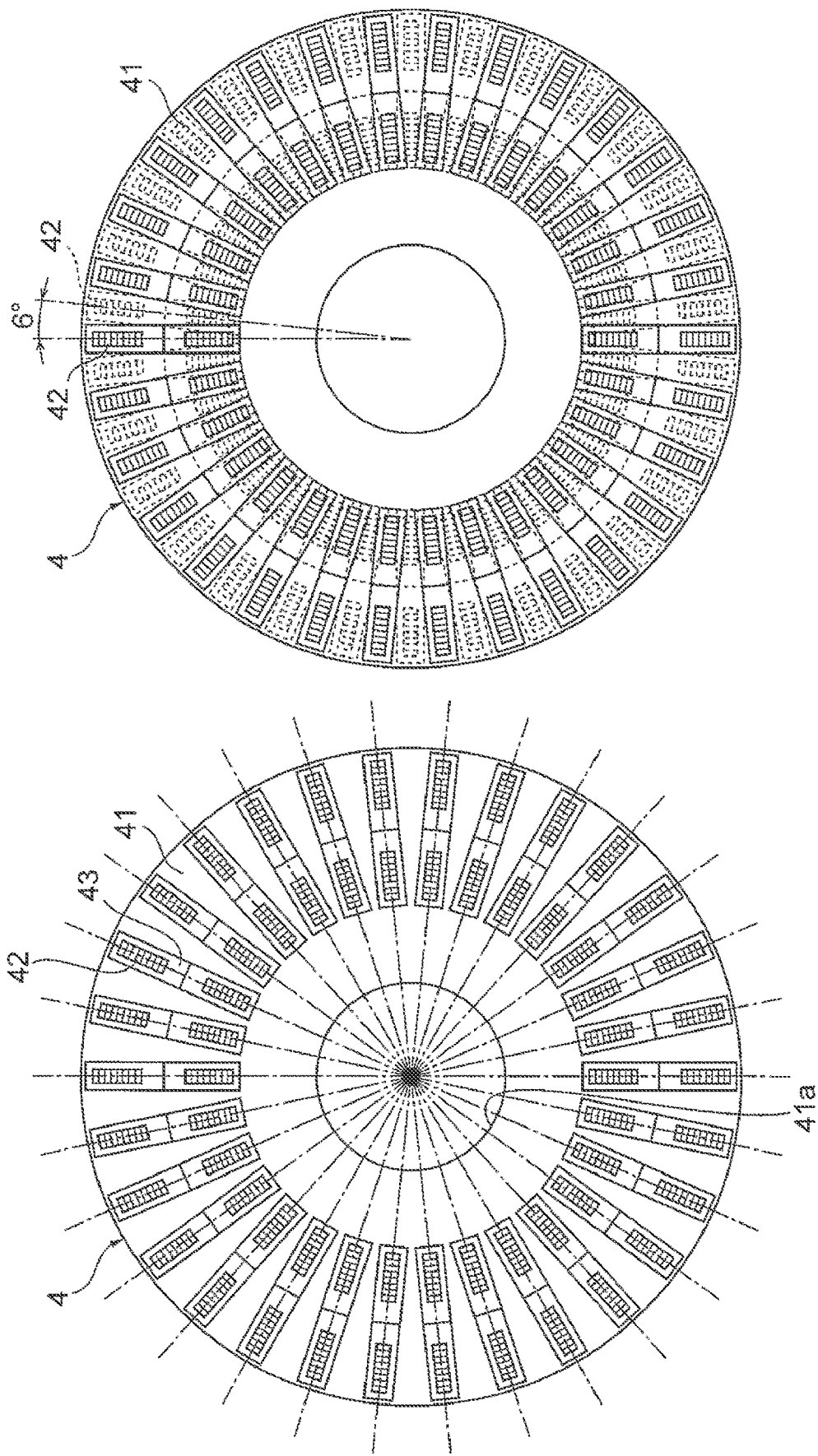
FIG. 29 is a cross-sectional view showing a stator of an axial gap motor according to a sixth embodiment of the disclosure.
Figure 30:
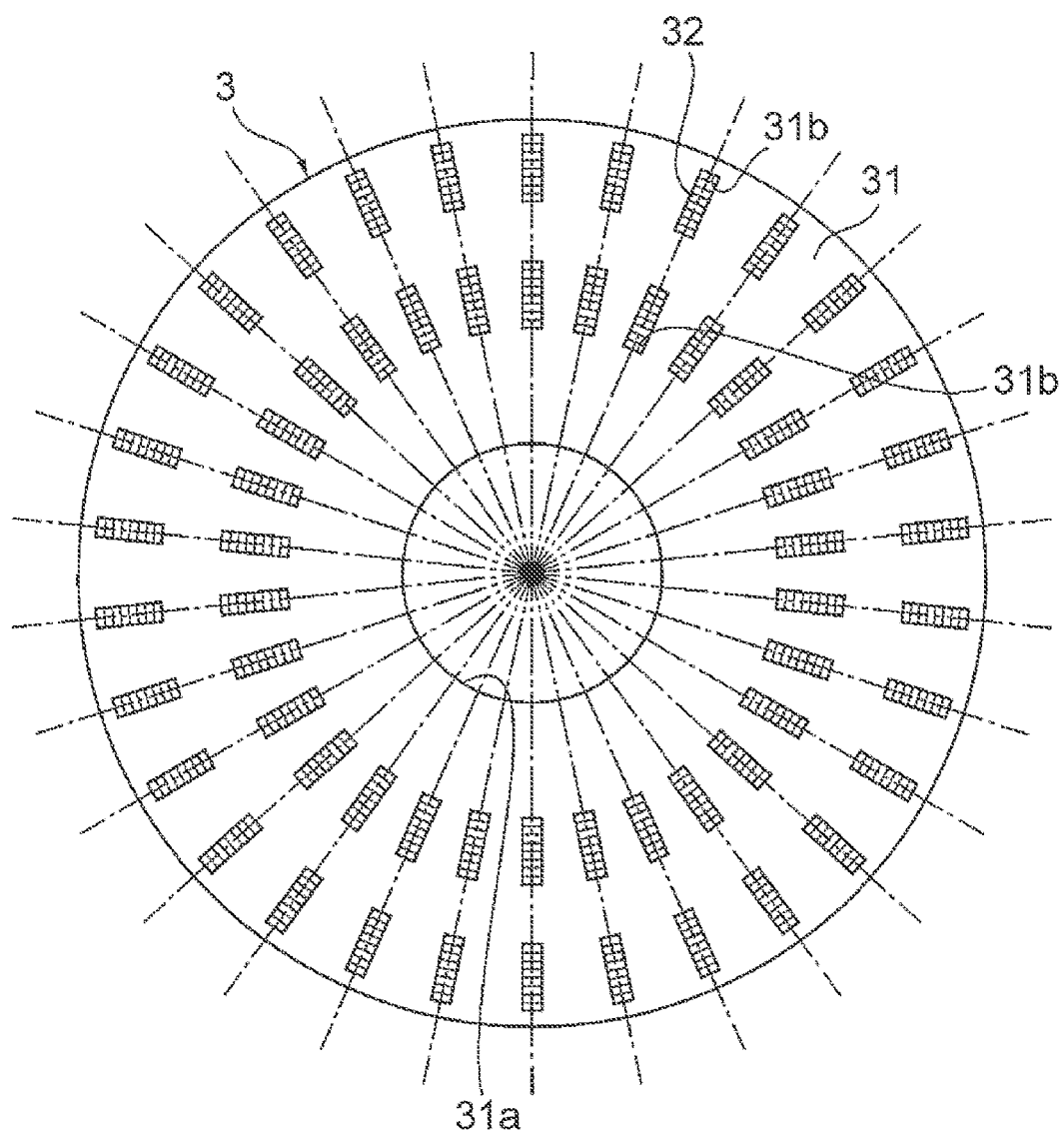
FIG. 30 is a cross-sectional view showing a rotor of the axial gap motor according to the sixth embodiment of the disclosure.

Referring to FIG. 1, FIG. 29, and FIG. 30, an axial gap motor 1 according to a sixth embodiment of the disclosure will be described. The axial gap motor 1 of this embodiment is a two-phase drive motor, and has two pairs of stators 4 and rotors 3 stacked in the axial direction of the rotary shaft 2. The two pairs of stators 4 and rotors 3 are arranged, such that two rotors 3 are interposed between two stators 4, as in the first embodiment shown in FIG. 1. On the paper of FIG. 1, one stator 4 and one rotor 3 located in the upper section will be referred to as the first pair, and one stator 4 and one rotor 3 located in the lower section will be referred to as the second pair.

As shown in the left drawing of FIG. 29, the stator 4 consists of a disk-shaped stator base 41 made of a non-magnetic material, 30 pieces (in other words, 30 poles) of stator cores 42 fixed and arranged in the circumferential direction of the stator base 41, and coils 43 wound around the stator cores 42. Thus, the number of stator cores Ns is equal to 30, and the angle θs between stator cores is expressed as θs=360°/Ns=12°. Also, as shown in the left drawing of FIG. 30, the rotor 3 consists of a disk-shaped rotor base 31 made of a non-magnetic material, and 30 pieces (in other words, 30 poles) of rotor cores 32 fixed and arranged in the circumferential direction of the rotor base 31. Thus, the number of rotor cores Nr is equal to 30, and the angle θr between rotor cores is equal to 360°/Nr=12°. Namely, in the axial gap motor 1 of this embodiment, the number of poles of the stator cores 42 is equal to the number of poles of the rotor cores 32 (Ns=Nr=30).

As shown in the right drawing of FIG. 29, in this embodiment, the stator cores 42 (indicated by solid lines in FIG. 29) of the second pair are disposed at positions rotated 360°/(2Ns=6°) about the rotary shaft 2, relative to the stator cores 42 (indicated by broken lines in FIG. 29) of the first pair. On the other hand, in the initial position, the rotor cores 32 of the second pair are arranged at the same positions as the rotor cores 32 of the first pair, namely, the rotor cores 32 of the second pair are aligned with the rotor cores 32 of the first pair.

The operation and effect of the axial gap motor 1 according to this embodiment will be described.

In the case of the two-phase drive axial gap motor having the structure of Ns=Nr, in a condition where the stator cores 42 of the second pair are aligned with the stator cores 42 of the first pair, it may be difficult to drive the rotors even when the coils wound around the stator cores are energized. To solve this problem, in the axial gap motor 1 according to this embodiment, the stator cores 42 of the second pair are disposed at positions rotated 360°/(2Ns=6°) about the rotary shaft 2, relative to the stator cores 42 of the first pair. Thus, when only the coils 43 wound around the stator cores 42 of the second pair are energized, the magnetic flux is generated in the stator cores 42, and the rotor cores 32 of the second pair are attracted to the stator cores 42 due to the magnetic flux, so that the rotor 3 of the second pair is rotated 6°. At the same time, the rotor 3 of the first pair fixed to the second pair is similarly rotated 6°.

Subsequently, when only the coils 43 wound around the stator cores 42 of the first pair are energized, the magnetic flux is generated in the stator cores 42, and the rotor cores 32 of the first pair are attracted to the stator cores 42 due to the magnetic flux, so that the rotor 3 of the first pair is further rotated 6°. At the same time, the rotor 3 of the second pair fixed to the first pair is similarly further rotated 6°. Thus, by sequentially switching energization, the rotors 3 are continuously rotated.

Also, with the two-phase drive axial gap motor 1 as described above, torque can be increased, and devices (e.g., insulated gate bipolar transistors and diodes) that constitute a drive circuit for one phase can be omitted, as compared with the case of a three-phase drive axial gap motor. Thus, the manufacturing cost can be expected to be reduced.

While the number of stator cores 42 of each pair and the number of rotor cores 32 of each pair are respectively 30 in this embodiment, the number of stator cores or rotor cores of each pair is not particularly limited to 30, provided that Ns=Nr is satisfied. However, it is preferable that Ns=Nr≥3, in view of the easiness with which the rotor is driven.

Seventh Embodiment

Figure 31:
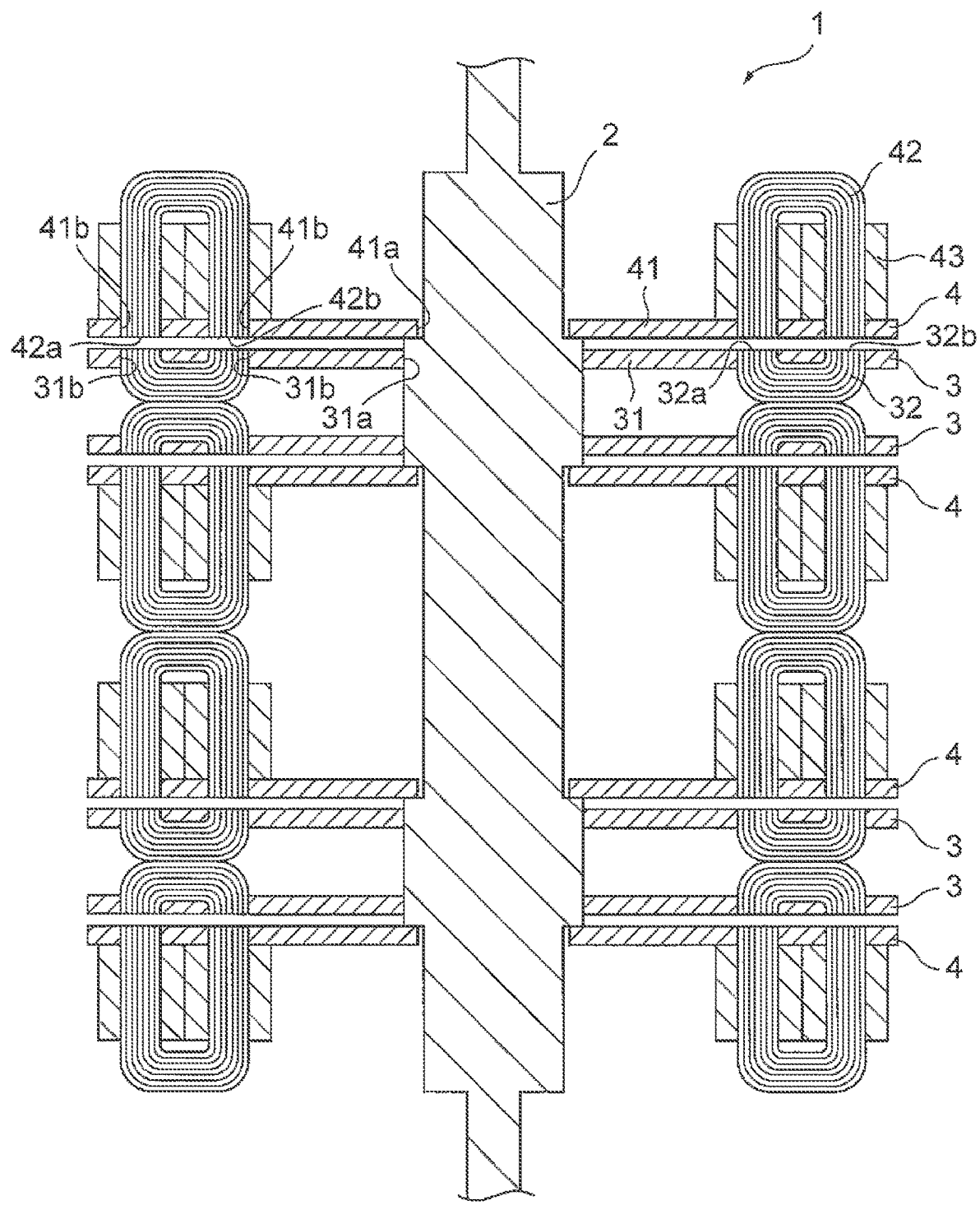
FIG. 31 is a schematic cross-sectional view showing the configuration of an axial gap motor according to a seventh embodiment of the disclosure.

Referring to FIG. 31, an axial gap motor 1 according to a seventh embodiment of the disclosure will be described. The axial gap motor 1 of this embodiment is a two-phase drive motor, and has four pairs of stators 4 and rotors 3 stacked in the axial direction of the rotary shaft 2. As shown in FIG. 31, the four pairs of stators 4 and rotors 3 are arranged, such that two rotors 3 are interposed between two stators 4, as in the first embodiment. More specifically, the first stator 4, first rotor 3, second rotor 3, second stator 4, third stator 4, third rotor 3, fourth rotor 3, and fourth stator 4 are arranged in this order, in the axial direction of the rotary shaft 2. In FIG. 31, a case that houses the stators 4 and the rotors 3 is not illustrated.

On the paper of FIG. 31, the first pair of stator 4 and rotor 3, the second pair of rotor 3 and stator 4, the third pair of stator 4 and rotor 3, and the fourth pair of rotor 3 and stator 4 are arranged in this order from the top to the bottom. In operation, the first pair and the third pair are driven in the first phase of the two-phase drive mode, and the second pair and the fourth pair are driven in the second phase of the two-phase drive mode.

The number of poles of stator cores 42 in each pair is the same as that of rotor cores 32 (Ns=Nr=30), and the structure of each pair is identical with that of the sixth embodiment.

Also, in this embodiment, the rotor cores 32 of the first pair and the rotor cores 32 of the second pair are located so as to be aligned with each other in the axial direction. Meanwhile, the rotor cores 32 of the third pair and the rotor cores 32 of the fourth pair are respectively located at positions rotated by an angle of 360°/(2Ns) in the direction of rotation of rotors, about the rotary shaft 2, relative to the rotor cores 32 of the first pair. For example, when the rotor cores 32 of the first pair and the rotor cores 32 of the second pair are located at the positions of 0°, the rotor cores 32 of the third pair and the rotor cores 32 of the fourth pair are respectively located at positions rotated 360°/(2Ns=6°) in the direction of rotation of rotors.

Thus, the rotor cores 32 of the first pair and the rotor cores 32 of the second pair are located so as to be aligned with each other in the axial direction, and the rotor cores 32 of the third pair and the rotor cores 32 of the fourth pair are located at the positions rotated by an angle of 360°/(2Ns), relative to the rotor cores 32 of the first pair. In this condition, the first pair and the third pair are driven in the first phase, and the second pair and the fourth pair are driven in the second phase, so that torque ripples can be reduced.

The torque ripples can be reduced by the above method, namely, by providing a phase difference through adjustment of the positions of the rotor cores 32 and/or the positions of the stator cores 42, but can also be reduced by providing a phase difference through control of drive current and voltage waveform. Further, these methods may be combined. To provide a phase difference through control of drive current and voltage waveform, the current rise time may be obtained, and the time of application of voltage may be advanced, or the voltage waveform of the second pair may be shifted 90° relative to the voltage waveform of the first pair.

Eighth Embodiment

Referring to FIG. 1 and FIG. 32 to FIG. 34, an axial gap motor 1 according to an eighth embodiment of the disclosure will be described. The axial gap motor 1 of this embodiment is a two-phase drive motor, and has two pairs of stators 4 and rotors 3 stacked in the axial direction of the rotary shaft 2. The two pairs of stators 4 and rotors 3 are arranged, such that two rotors 3 are interposed between two stators 4, as in the first embodiment shown in FIG. 1. On the paper of FIG. 1, one stator 4 and one rotor 3 located in the upper section will be referred to as "first pair", and the other stator 4 and the other rotor 3 located in the lower section will be referred to as "second pair".

Figure 32:
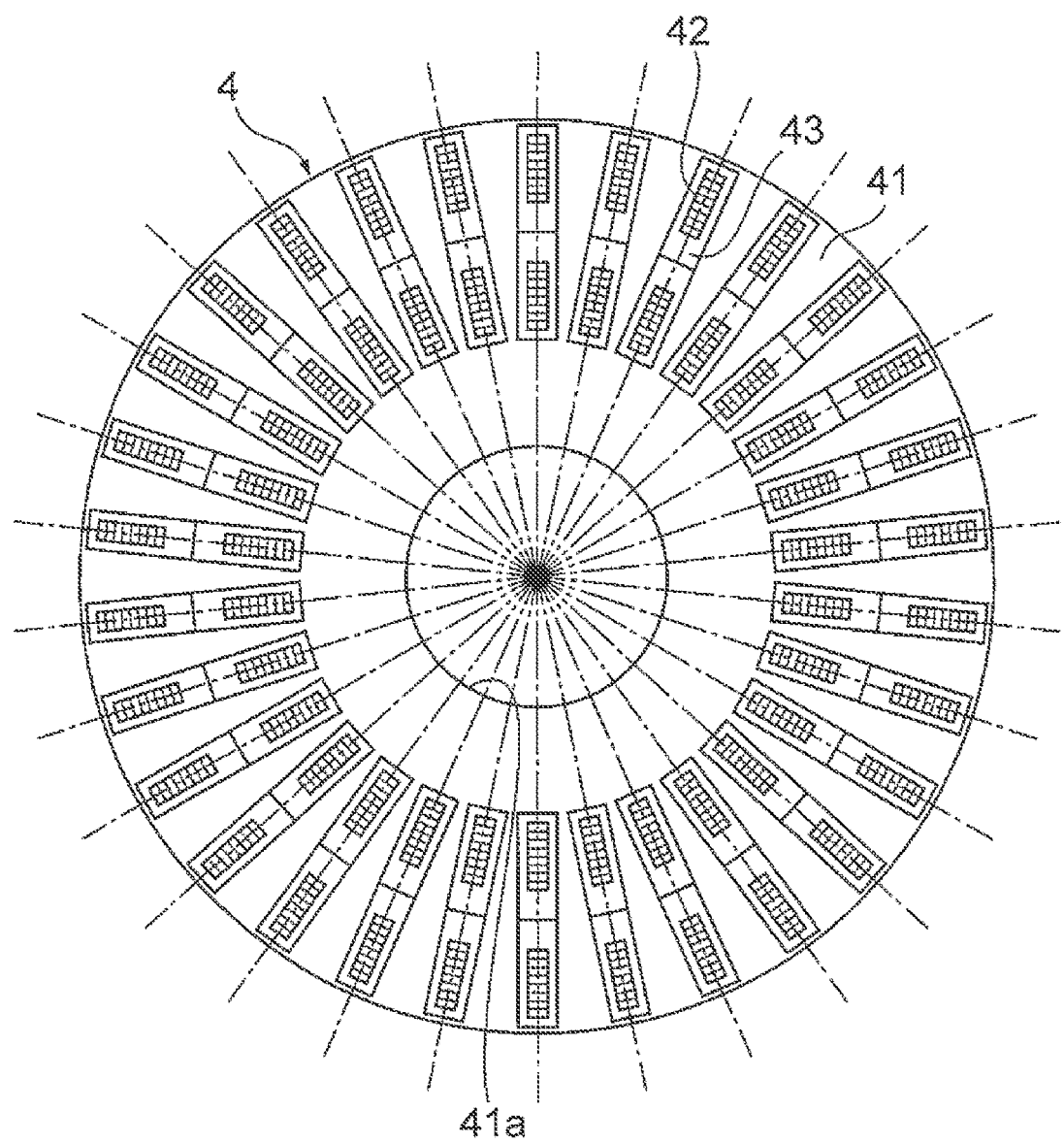
FIG. 32 is a cross-sectional view showing a stator of an axial gap motor according to an eighth embodiment of the disclosure.
Figure 33:
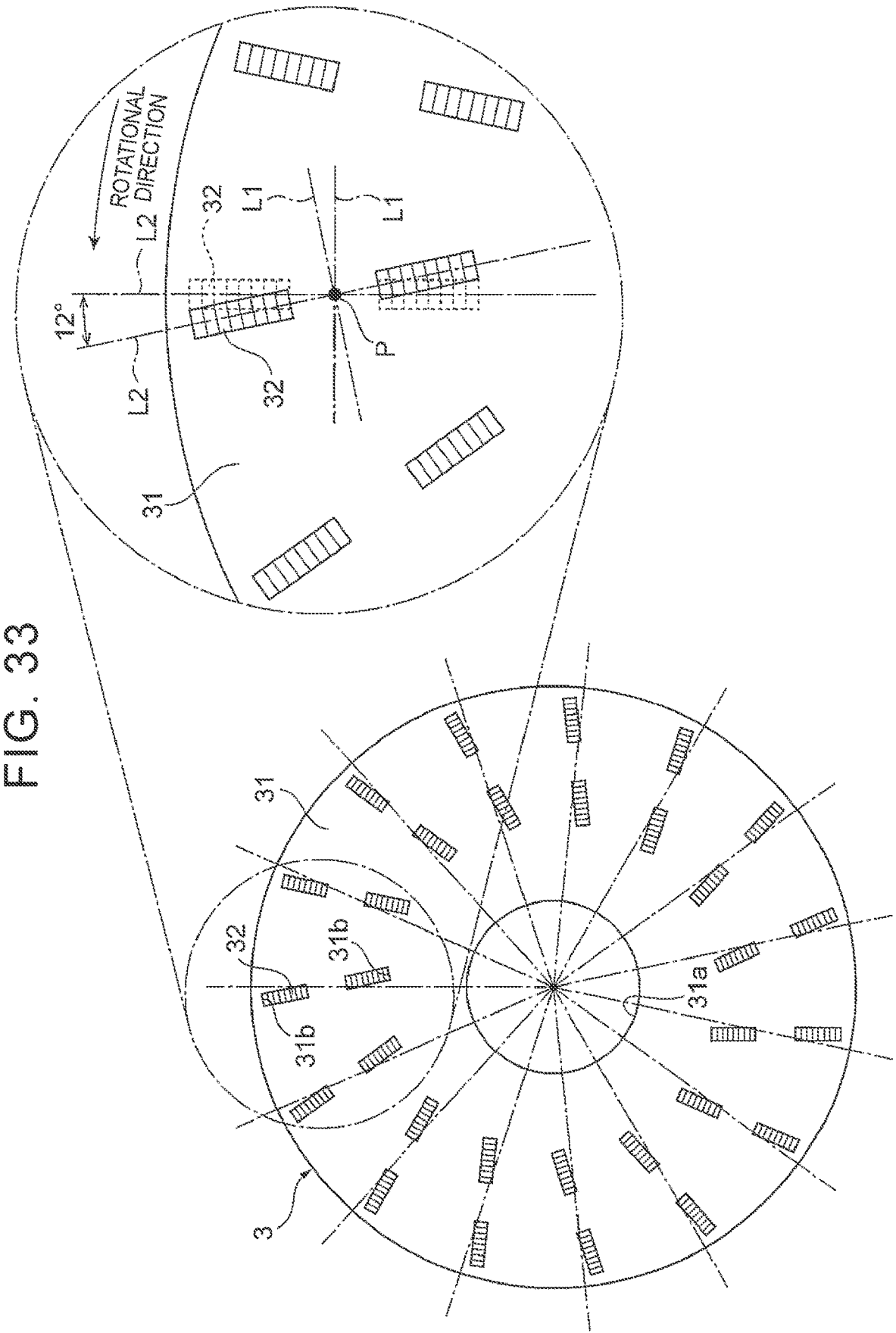
FIG. 33 is a cross-sectional view showing a rotor of the axial gap motor according to the eighth embodiment of the disclosure.

As shown in FIG. 32, the stator 4 consists of a disk-shaped stator base 41 made of a non-magnetic material, 30 pieces (in other words, 30 poles) of stator cores 42 fixed and arranged in the circumferential direction of the stator base 41, and coils 43 wound around the stator cores 42. Thus, the number of stator cores Ns is equal to 30, and the angle θs between stator cores is expressed as θs=360°/Ns=12°. Also, as shown in FIG. 33, the rotor 3 consists of a disk-shaped rotor base 31 made of a non-magnetic material, and 15 pieces (in other words, 15 poles) of rotor cores 32 fixed and arranged in the circumferential direction of the rotor base 31. Thus, the number of rotor cores Nr is equal to 15, and the angle θr between rotor cores is equal to 360°/Nr=24°. Namely, the axial gap motor 1 of this embodiment has the structure of Ns=2Nr. In this case, the step angle ε is expressed as ε=360° (1/Nr−1/Ns=12°).

In this embodiment, the rotor cores 32 are oriented such that each of the rotor cores 32 is inclined by an angle of 360°/Ns in the rotational direction of the rotor, relative to the radial direction of the rotor base 31, about the center of rotation that is an intersecting point P of the axis L1 of the center of curvature of curved portions of the rotor core 32 and the central axis L2 of the rotor core 32 in the width direction (namely, the winding width direction). More specifically, as shown in the right-side enlarged view of FIG. 33, the rotor cores 32 are normally mounted in the rotor base 31, such that the central axis L2 of each rotor core 32 in the winding width direction is parallel to the radial direction of the rotor base 31 (in other words, the winding width direction of the rotor core 32 is parallel to the circumferential direction of the rotor base 31), as indicated by broken lines in FIG. 33. On the other hand, the rotor cores 32 of this embodiment are oriented such that each of the rotor cores 32 is inclined by 12° (namely, the angle θs between stator rotors) in the rotational direction of the rotor, relative to the radial direction of the rotor base 31, about the center of rotation that is the intersecting point P of the axis L1 of the center of curvature of the rotor core 32 and the central axis L2 of the rotor core 32 in the winding width direction.

The operation and effect of the axial gap motor 1 according to this embodiment will be described.

In the two-phase drive axial gap motor having the structure of Ns=2Nr, when each rotor core is located at a middle position between right and left adjacent stator cores, the rotor core is attracted to the right and left adjacent stator cores, and the rotor core and stator cores are brought into a balanced state, thus making it difficult to drive the motor.

Figure 34:
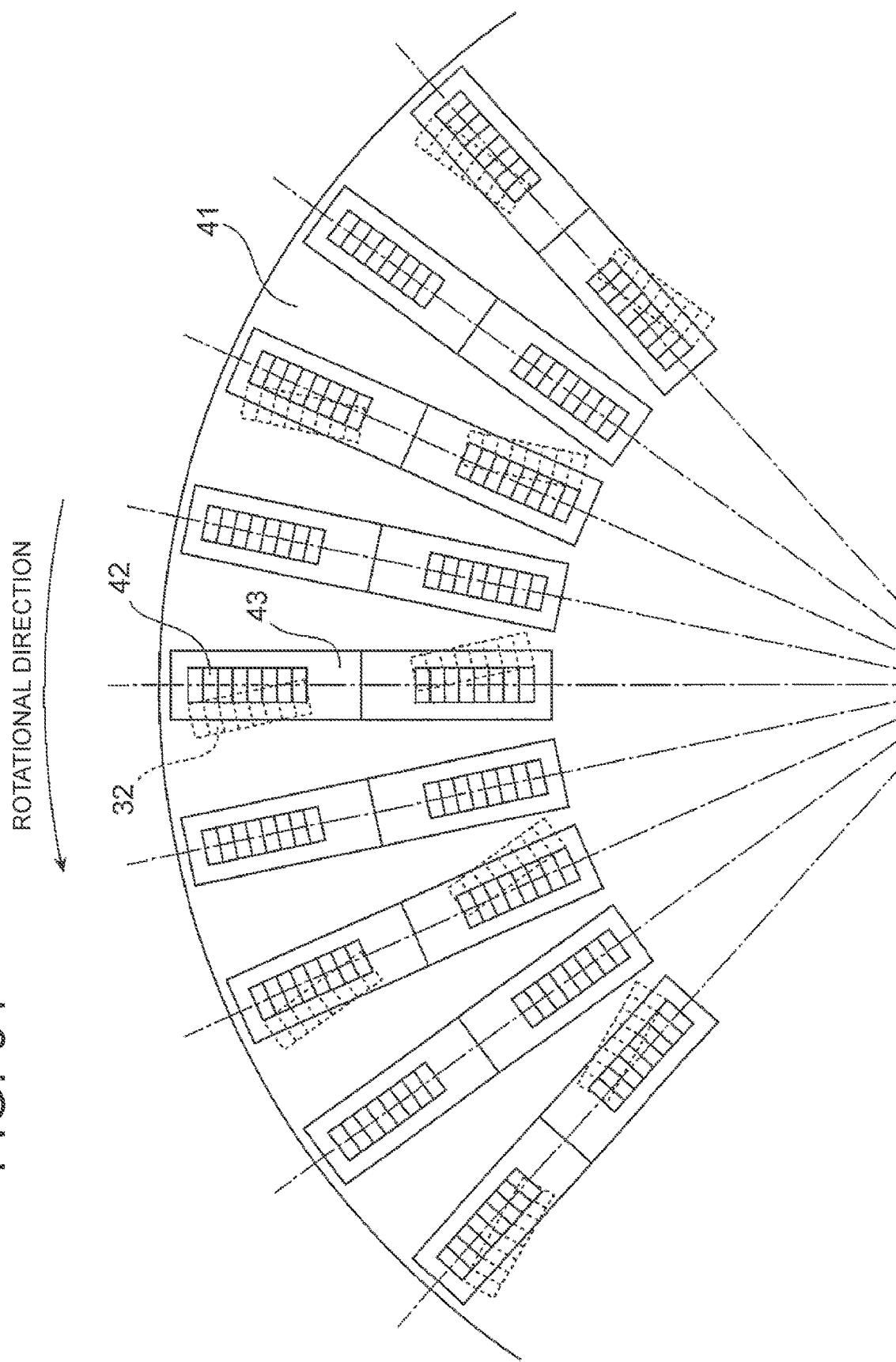
FIG. 34 is a partial cross-sectional view showing a condition in which rotor cores and stator cores are positioned.

To solve this problem, the rotor cores 32 in the axial gap motor 1 of this embodiment are oriented such that each rotor core 32 is inclined by an angle of 360°/Ns in the rotational direction of the rotor, relative to the radial direction of the rotor base 31, about the intersecting point P as the center of rotation. As a result, as shown in FIG. 34, the rotor core 32 becomes closer to and parallel to the stator core 42 located ahead in the rotational direction of the rotor (in FIG. 34, the stator core 42 located to the left of the rotor core 32). In this condition, when the coils 43 wound around the stator core 42 located ahead of the rotor core 32 in question are energized, the magnetic flux is generated in the stator core 42, and the magnetic flux thus generated is likely to flow in the rotor core 32 in question. Accordingly, the rotor core 32 is likely to be attracted to the stator core 42 ahead, so that the rotor 3 is rotated in the rotational direction of the rotor.

Also, with the axial gap motor 1 according to this embodiment, the torque can be increased, and torque ripples can be reduced. Furthermore, with the two-phase drive axial gap motor 1, devices (e.g., insulated gate bipolar transistors and diodes) that constitute a drive circuit for one phase can be omitted, as compared with the case of a three-phase drive axial gap motor. Thus, the manufacturing cost can be expected to be reduced.

While the two-phase drive axial gap motor 1 having the structure of Ns=2Nr has been described in this embodiment, this disclosure may also be applied to a two-phase drive axial gap motor having the structure of Ns=Nr. In the case of the two-phase drive axial gap motor having the structure of Ns=Nr, the rotor cores may be oriented such that each rotor core is rotated at an angle of 360°/(2Ns) in the rotational direction of the rotor, relative to the radial direction of the rotor base, about the intersecting point P as the center of rotation.

Ninth Embodiment

Figure 35:
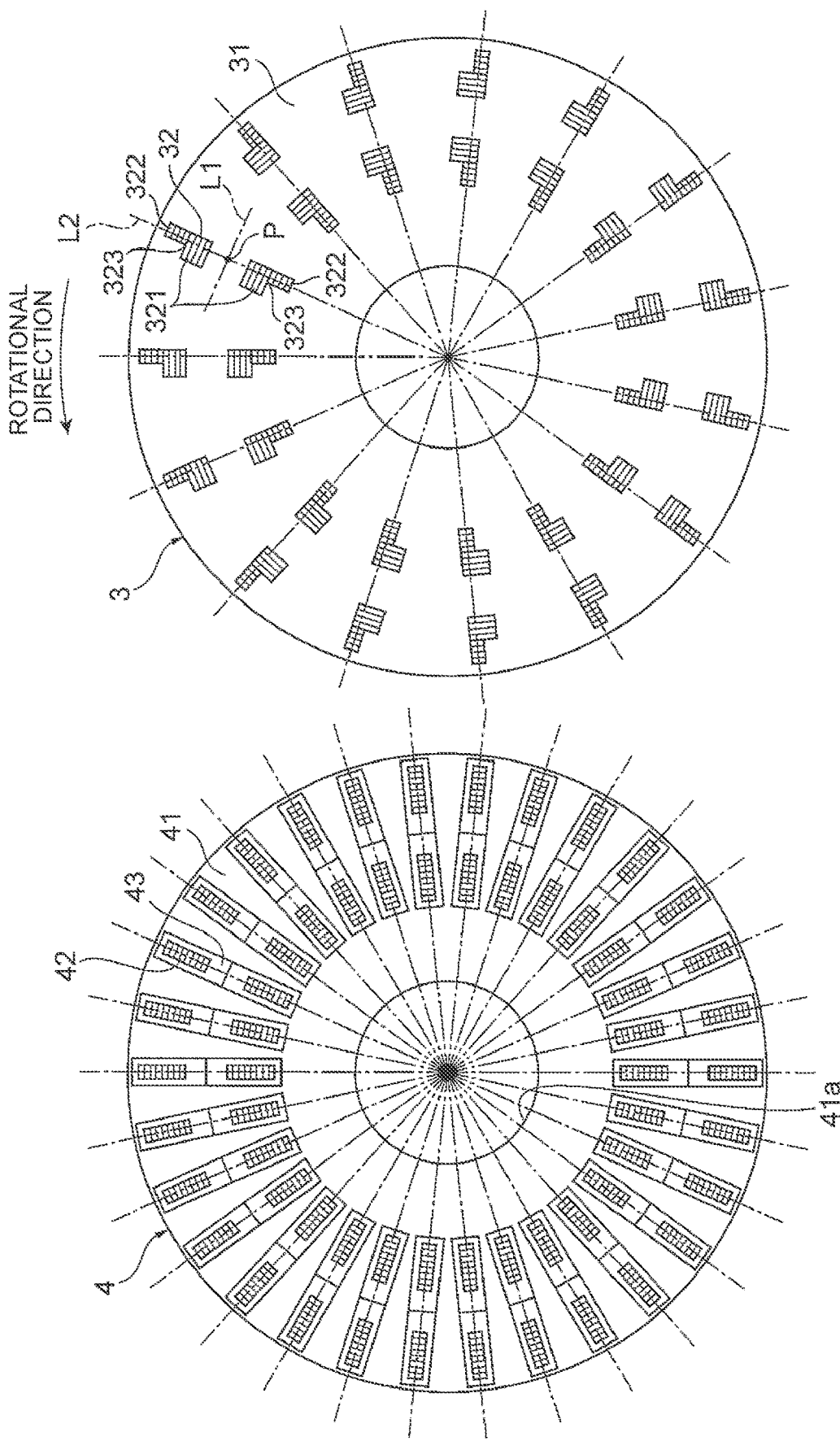
FIG. 35 is a cross-sectional view showing a stator and a rotor of an axial gap motor according to a ninth embodiment of the disclosure.
Figure 36:
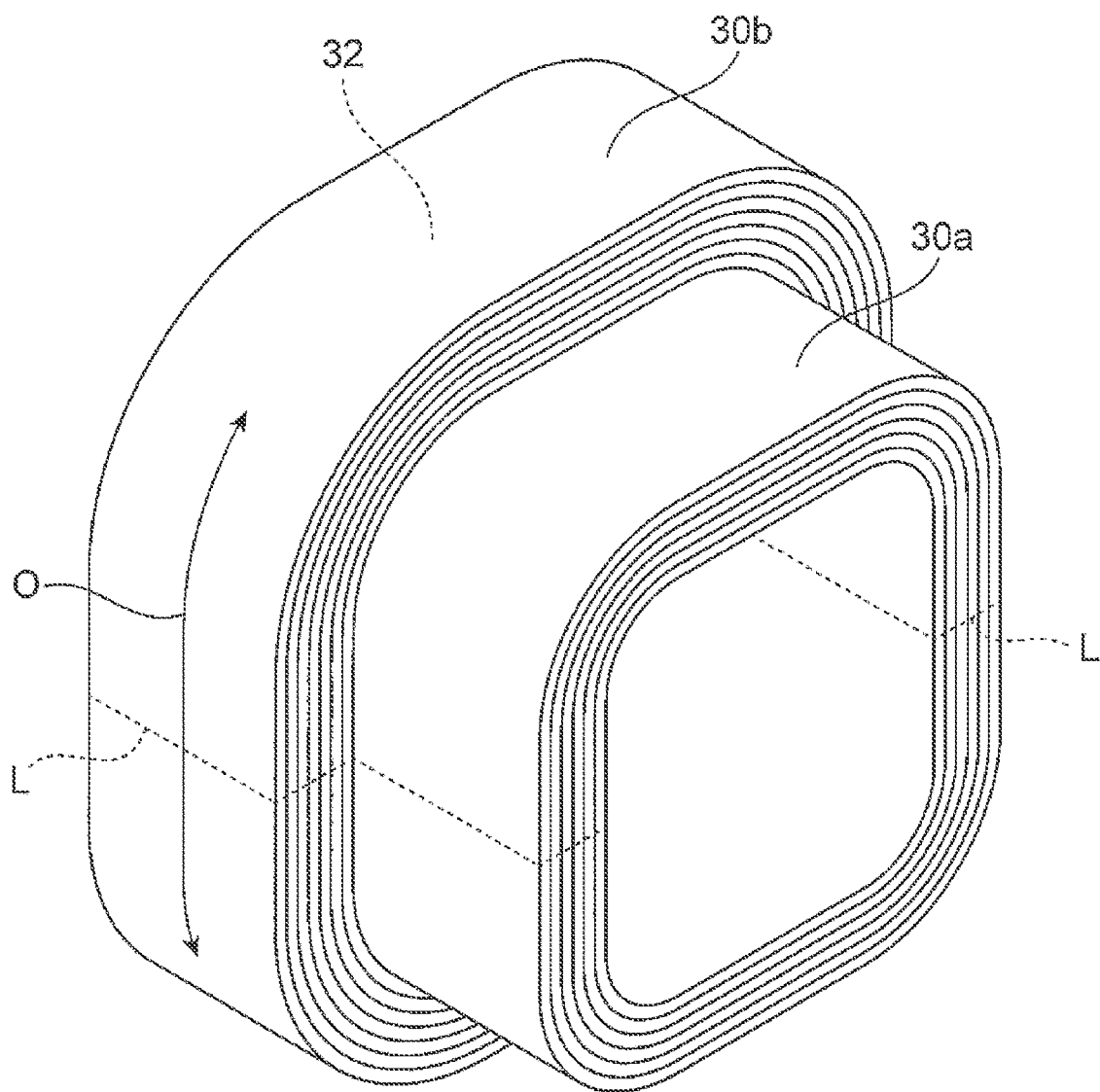
FIG. 36 is a perspective view useful for describing a method of producing rotor cores of the axial gap motor according to the ninth embodiment of the disclosure.

Referring to FIG. 1, FIG. 35, and FIG. 36, an axial gap motor 1 according to a ninth embodiment of the disclosure will be described. The axial gap motor 1 of this embodiment is a two-phase drive motor, and has two pairs of stators 4 and rotors 3 stacked in the axial direction of the rotary shaft 2. The two pairs of stators 4 and rotors 3 are arranged such that two rotors 3 are interposed between two stators 4, as in the first embodiment as shown in FIG. 1.

As shown in FIG. 3, the rotor cores 32 of the first embodiment are formed by dividing the wound body 3*a* formed by winding a strip-shaped soft magnetic material having a constant width into a plurality of turns while aligning it, into two segments, in a direction intersecting with the circumferential direction. Accordingly, the rotor core 32 thus formed has rectangular end faces, and has a symmetric structure with respect to the winding width direction. Namely, the rotor core 32 is symmetrical with respect to the central axis L2 in the winding width direction. On the other hand, the rotor cores 32 of this embodiment have an asymmetric structure in the winding width direction.

More specifically, as shown in the right drawing of FIG. 35, the rotor 3 consists of a disk-shaped rotor base 31 made of a non-magnetic material, and 15 pieces (in other words, 15 poles) of rotor cores 32 fixed and arranged in the circumferential direction of the rotor base 31. Each of the rotor cores 32 has a large-width inner portion 321 that is located on the side closer to the axis L1 of the center of curvature of curved portions of the rotor core 32, and protrudes in the rotational direction of the rotor, and a small-width outer portion 322 located on the side remote from the axis L1 of the center of curvature. Then, a stepped portion 323 is formed between the large-width inner portion 321 and the small-width outer portion 322.

The rotor core 32 having the asymmetric structure is formed, as shown in FIG. 36 by way of example, by winding a strip-shaped soft magnetic material (such as an oriented magnetic steel sheet) having a relatively large width into a plurality of turns while aligning it, to form a large-width wound body 30a, joining a strip-shaped soft magnetic material (such as an oriented magnetic steel sheet) having a relatively small width, to the end of the large-width wound body 30a thus formed, by spot welding, winding the strip-shaped soft magnetic material having the relatively small width into a plurality of turns while aligning it, to form a small-width wound body 30b, and then dividing these wound bodies in a direction intersecting with the circumferential direction (arrow O direction) of the wound bodies. In FIG. 36, reference sign L denotes the position at which the wound bodies are divided.

On the other hand, the stator 4 consists of a disk-shaped stator base 41 made of a non-magnetic material, 30 pieces (in other words, 30 poles) of stator cores 42 fixed and arranged in the circumferential direction of the stator base 41, and coils 43 wound on the stator cores 42, as shown in the left drawing of FIG. 35. The stator core 42 has a constant width as in the first embodiment, and has a symmetric structure in the winding width direction.

The operation and effect of the axial gap motor 1 according to this embodiment will be described.

In the two-phase drive axial gap motor having the structure of Ns=2Nr, for example, after the coils 43 wound on the first-phase stator cores 42 are energized, and the stator cores 42 and the rotor cores 32 are located at the synchronous positions, the coils 43 wound on the second-phase stator cores 42 are energized. In this case, the distance between the stator cores 42 thus energized and the rotor cores 32 attracted to the stator cores 42 is relatively large, thus causing problems of large magnetic resistance, and insufficiency of the initial torque (in other words, the initial rotary force).

To solve this problem, in the axial gap motor 1 according to this embodiment, the rotor core 32 has the large-width inner portion 321 that is located on the side closer to the axis L1 of the center of curvature of the rotor core 32 and protrudes in the rotational direction of the rotor, and the small-width outer portion 322 located on the side remote from the axis L1 of the center of curvature. Since the rotor core 32 has the large-width inner portion 321 that protrudes in the rotational direction of the rotor, the initial torque at the time of switching of energization can be increased, and torque ripples can be reduced.

Figure 37:
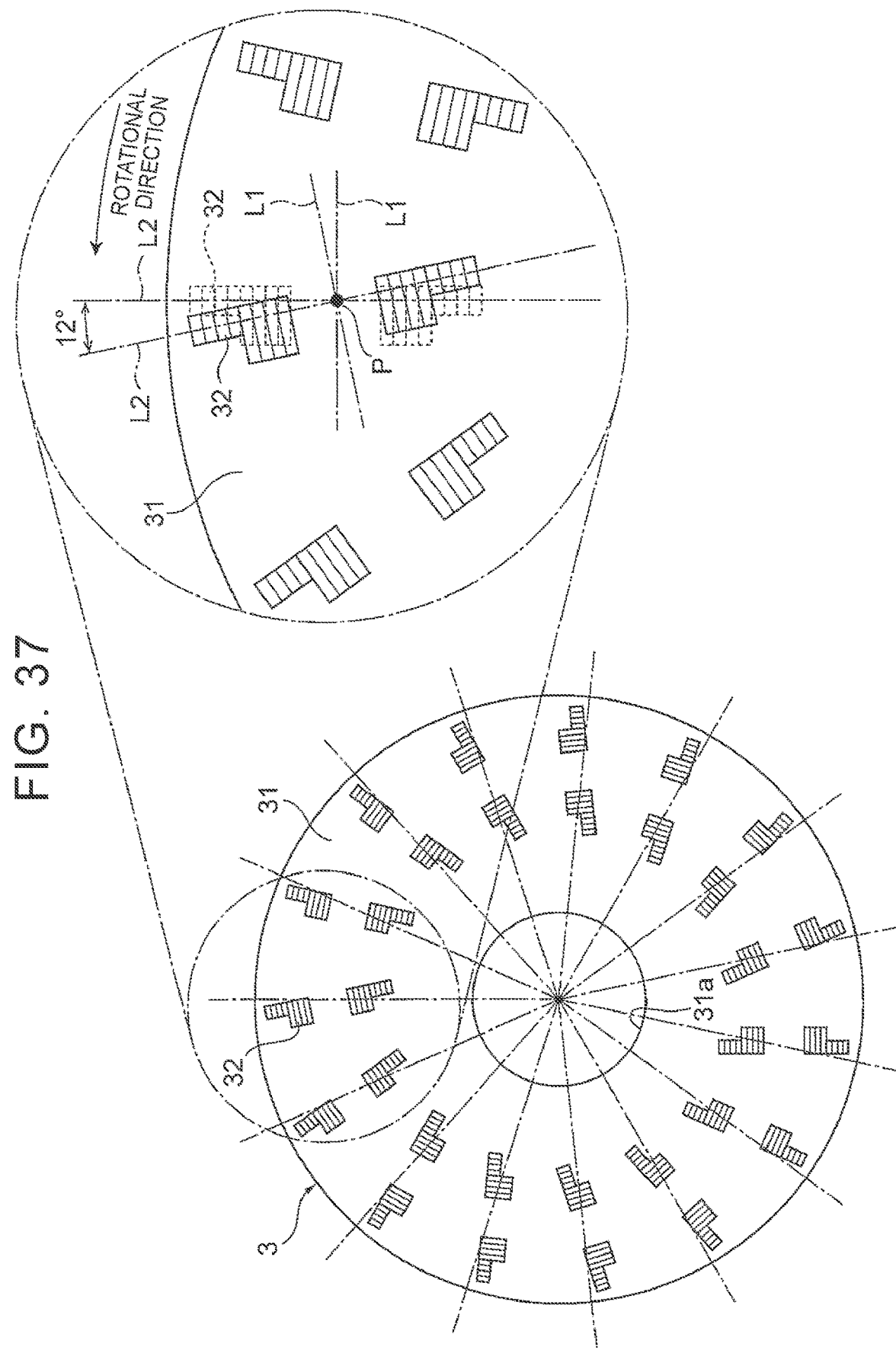
FIG. 37 is a cross-sectional view showing the rotor cores when inclined.

In the axial gap motor 1 of this embodiment, as shown in FIG. 37 by way of example, the rotor cores 32 are preferably oriented such that each rotor core 32 is inclined 12° in the rotational direction of the rotor, relative to the radial direction of the rotor base 31, about the center of rotation that is the intersecting point P of the axis L1 of the center of curvature of the rotor core 32 and the central axis L2 in the winding width direction. In this manner, the effects of increasing torque and reducing torque ripples can be further enhanced.

While the rotor core 32 has the large-width inner portion 321 that is located on the side closer to the axis L1 of the center of curvature of the rotor core 32 and protrudes in the rotational direction of the rotor, and the small-width outer portion 322 located on the side remote from the axis L1 of the center of curvature in this embodiment, various modified examples may be considered, provided that the rotor core 32 has an asymmetric structure when viewed in the winding width direction. For example, the position of the large-width portion and that of the small-width portion may be reversed. Namely, a small-width portion may be located on the side closer to the axis L1 of the center of curvature of the rotor core 32, and a large-width portion may be located on the side remote from the axis L1 of the center of curvature. Also, two or more large-width portions and two or more small-width portions may be alternately positioned. In any of these cases, the same effects as described above can be obtained.

Figure 38:
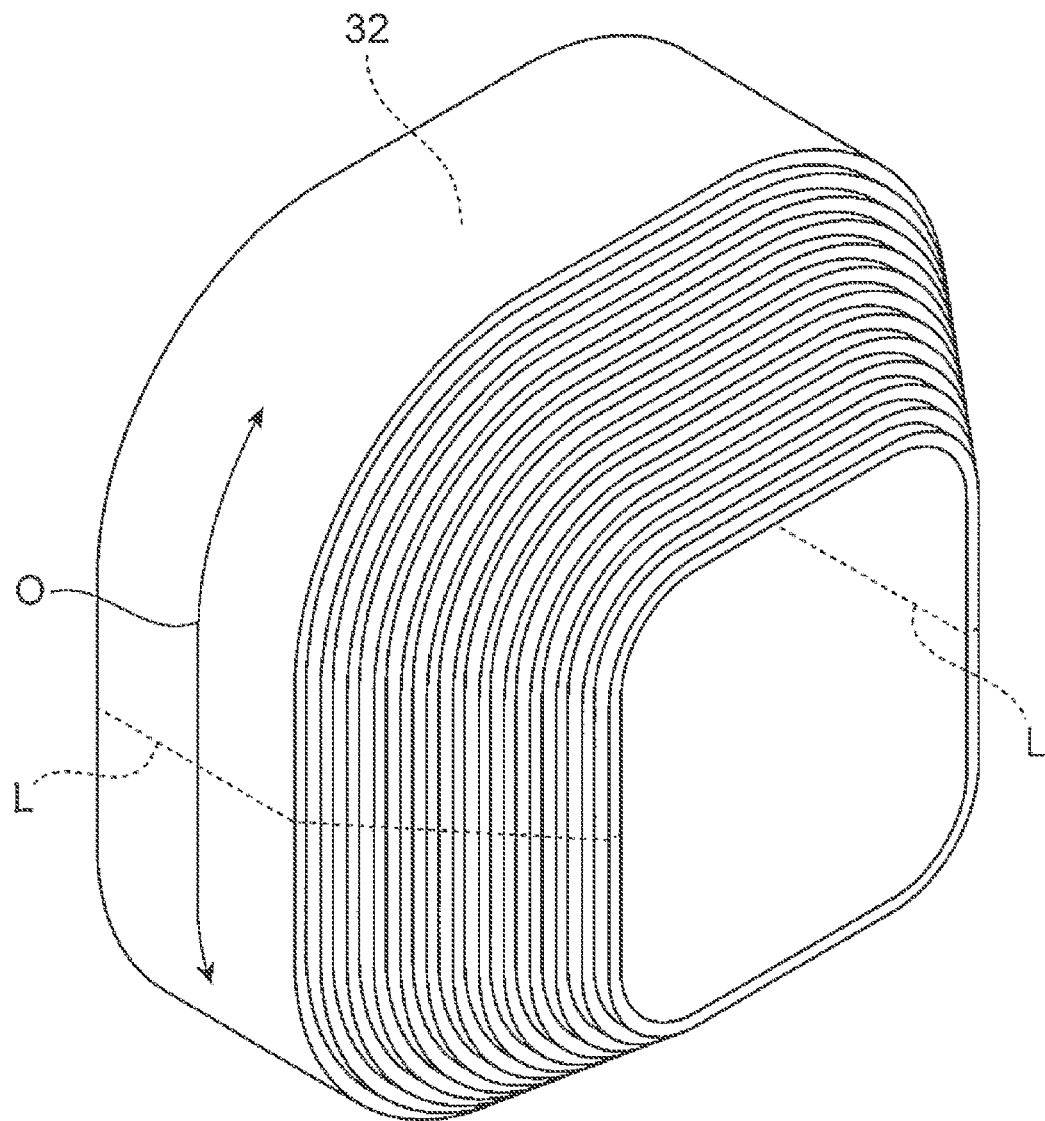
FIG. 38 is a perspective view useful for describing a method of producing rotor cores.

Also, as shown in FIG. 38 by way of example, the rotor cores 32 may be formed by winding a strip-shaped soft magnetic material (oriented magnetic steel sheet) having the same width into a plurality of turns while displacing the sheet a little in one direction, to provide a wound body, and dividing the wound body in a direction that intersects with the circumferential direction (arrow O direction). FIG. 38 indicates the position L at which the wound body is divided into two segments. End faces (namely, end faces 32a 32b) of the rotor core 32 formed by dividing the wound body assume a rhomboidal shape.

With the end faces of the rotor core 32 thus assuming a rhomboidal shape, when the rotor is rotated, the area of the end faces of the rotor core 32 and the end faces of the stator core 42 which are opposed to each other is gradually increased, and is gradually reduced at the time of alignment as the synchronous positions. Thus, rapid torque variations can be reduced, and torque ripples can be reduced. Further, the axial gap motor is more smoothly rotated or driven.

Tenth Embodiment

Figure 39:
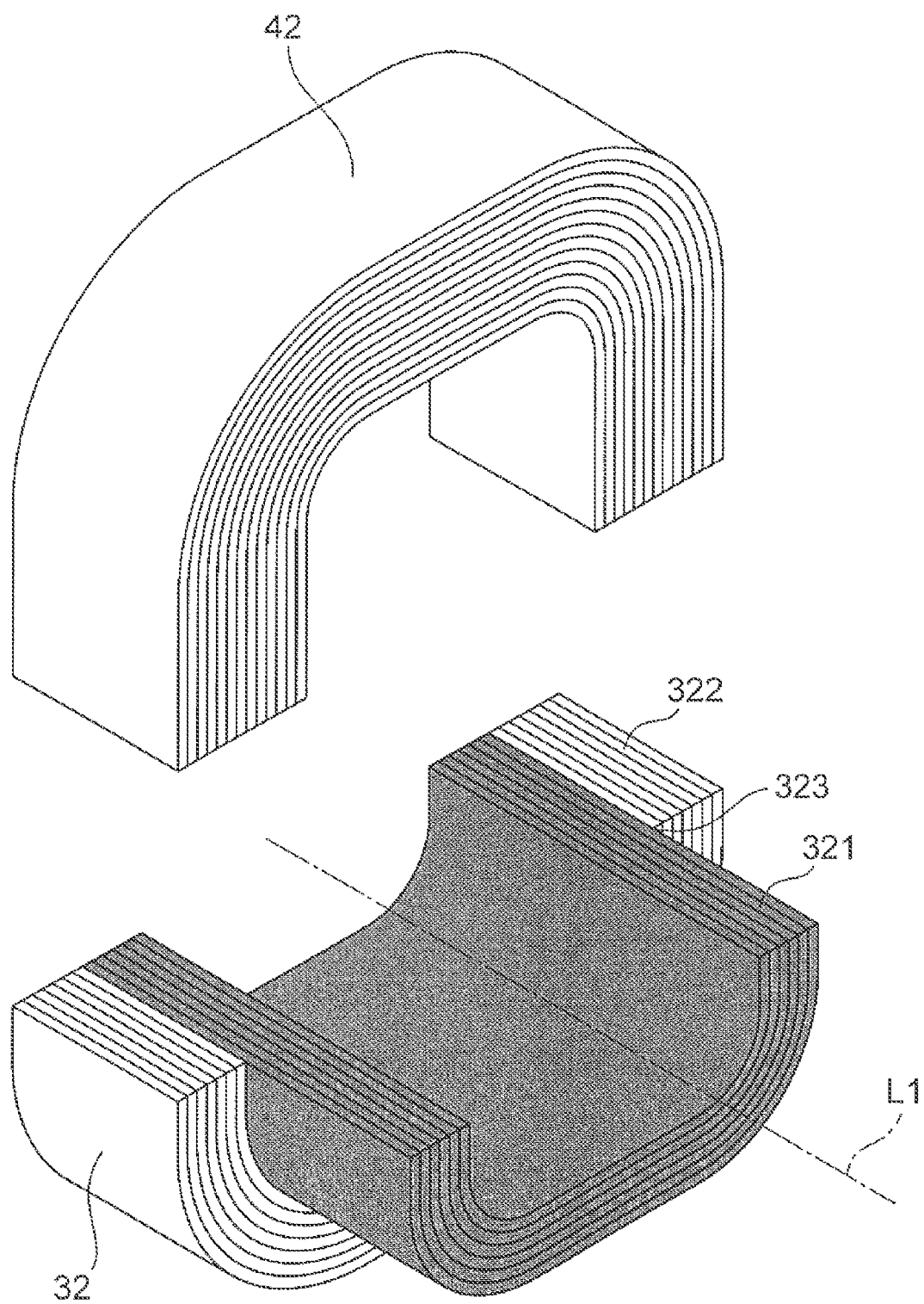
FIG. 39 is a perspective view showing a stator core and a rotor core of an axial gap motor according to a tenth embodiment of the disclosure.

Referring to FIG. 39, an axial gap motor 1 according to a tenth embodiment of the disclosure will be described. The axial gap motor 1 of this embodiment is different from that of the ninth embodiment in that different soft magnetic materials are used for the large-width inner portion 321 and the small-width outer portion 322 of the rotor core 32. In the following, only the difference will be described.

More specifically, as shown in FIG. 39, the large-width inner portion 321 located on the side closer to the axis L1 of the center of curvature of the rotor core 32 is formed of a soft magnetic material having a low iron loss and a high magnetic permeability (see a gray portion in FIG. 39). Examples of the soft magnetic material having the low iron loss and the high magnetic permeability include permalloy, nanocrystalline soft magnetic material, amorphous soft magnetic material, and ferritic soft magnetic material. On the other hand, the small-width outer portion 322 located on the side remote from the axis L1 of the center of curvature of the rotor core 32 is formed of a soft magnetic material having a high magnetic flux density. Examples of the soft magnetic material having the high magnetic flux density include an oriented magnetic steel sheet, and permendur as an alloy of iron and cobalt.

On the other hand, the stator core 42 has a constant width, and is formed of a soft magnetic material having a high magnetic flux density, like the small-width outer portion 322 of the rotor core 32.

With this embodiment, various types of axial gap motors, such as high-speed and low-loss type, low-speed and high-torque type, and low cost type, can be provided, depending on the use of the axial gap motor, by using different soft magnetic materials for the large-width inner portion 321 and small-width outer portion 322 of the rotor core 32. Thus, variations in the axial gap motor can be increased. For example, axial gap motors that can be used in various applications can be provided by selecting one of the combinations of materials as indicated in TABLE 4 below.

Eleventh Embodiment

Figure 40:
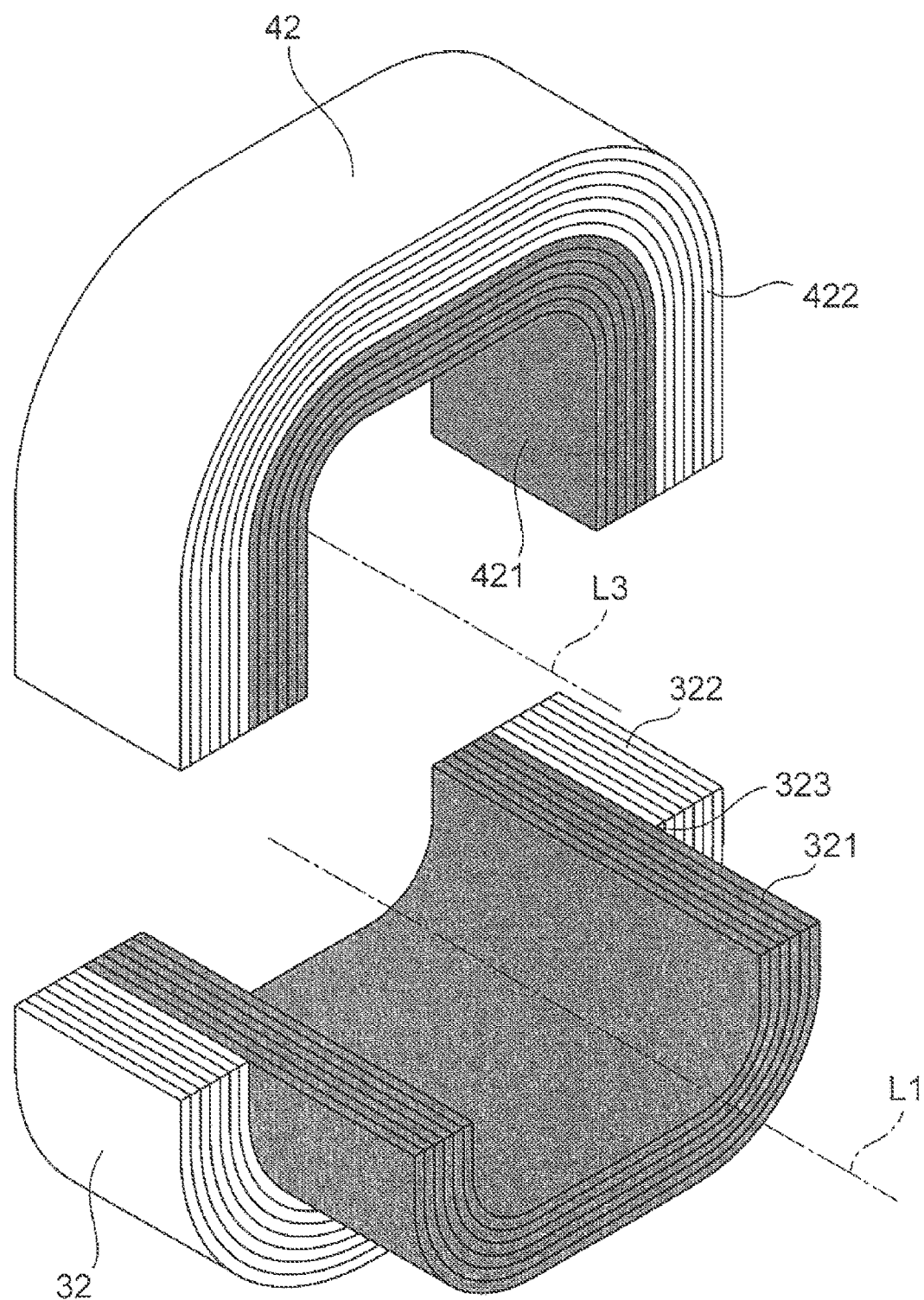
FIG. 40 is a perspective view showing a stator core and a rotor core of an axial gap motor according to an eleventh embodiment of the disclosure.

Referring to FIG. 40, an axial gap motor 1 according to an eleventh embodiment of the disclosure will be described. In the axial gap motor 1 of this embodiment, the rotor core 32 has a large-width inner portion 321 (see a gray portion in FIG. 40) and a small-width outer portion 322, and the large-width inner portion 321 and the small-width outer portion 322 are made of different materials, as in the tenth embodiment. On the other hand, the stator core 42 has a constant width, but has an inner core portion 421 (see a gray portion in FIG. 40) formed of the same material as the large-width inner portion 321, and an outer core portion 422 formed of the same material as the small-width outer portion 322, so as to correspond to the rotor core 32, unlike the tenth embodiment.

More specifically, as shown in FIG. 40, the inner core portion 421 corresponds to the large-width inner portion 321 of the rotor core 32, and is located on the side closer to the axis L3 of the center of curvature of curved portions of the stator core 42. The inner core portion 421 is formed of a soft magnetic material having a low iron loss and a high magnetic permeability, for example, like the large-width inner

TABLE 4

| Motor Use | Material of Large-width Inner Portion | Material of Small-width Outer Portion and Stator Core |
|---|---|---|
| high-speed rotation high speed & low torque special use · high cost | permalloy nanocrystalline soft magnetic material amorphous soft magnetic material | permalloy nanocrystalline soft magnetic material amorphous soft magnetic material |
| middle to high-speed rotation middle to high speed & low torque special use · little high cost | amorphous soft magnetic material | oriented magnetic steel sheet non-oriented magnetic steel sheet |
| low to high-speed rotation low to high torque general purpose, mass production · low cost | cold-rolled steel sheet hot-rolled steel sheet non-oriented magnetic steel sheet oriented magnetic steel sheet ferritic soft magnetic material | cold-rolled steel sheet hot-rolled steel sheet non-oriented magnetic steel sheet oriented magnetic steel sheet ferritic soft magnetic material |
| low to high-speed rotation high torque special use · high cost | permendur as alloy of iron and cobalt oriented magnetic steel sheet | permendur as alloy of iron and cobalt |

As indicated in TABLE 5 below, the inventors of this application prepared Sample 1 in which the stator cores and the rotor cores are made of the same material, and Sample 2 and Sample 3 in which the large-width inner portion 321 and the small-width outer portion 322 are made of different materials as in this embodiment, and checked the maximum torque ratio and iron loss ratio of each sample thus prepared. The results are that the maximum torque ratio of Sample 2 was about 1.18 times as large as that of Sample 1, and the iron loss ratio of Sample 3 was about 0.85 times as large as that of Sample 1.

portion 321. The outer core portion 422 corresponds to the small-width outer portion 322 of the rotor core 32, and is disposed on the side remote from the axis L3 of the center of curvature of the stator core 42. The outer core portion 422 is formed of a soft magnetic material having a high flux density, for example, like the small-width outer portion 322. The inner core portion 421 and the outer core portion 422 have the same width.

With this embodiment, various types of axial gap motors, such as high-speed and low-loss type, low-speed and high-torque type, and low cost type, can be provided, depending

TABLE 5

| | Material of Stator Core | Material of Small-width Outer Portion | Material of Large-width Inner Portion | Maximum Torque Ratio | Iron Loss Ratio |
|---|---|---|---|---|---|
| Sample 1 | oriented magnetic steel sheet | oriented magnetic steel sheet | oriented magnetic steel sheet | 1.00 | 1.00 |
| Sample 2 | oriented magnetic steel sheet | oriented magnetic steel sheet | permendur | 1.18 | 1.44 |
| Sample 3 | oriented magnetic steel sheet | oriented magnetic steel sheet | nanocrystalline soft magnetic material | 0.76 | 0.85 | on the use of the axial gap motor, by using different soft magnetic materials for the inner core portion 421 and outer core portion 422 of the stator core 42. Thus, variations in the axial gap motor can be increased. The combinations of the materials as indicated in TABLE 4 above may be respectively applied to the inner core portion 421 and the outer core portion 422 of this embodiment. Thus, combinations of various shapes and various materials are used for the rotor core 32 and the stator core 42, according to the use of the axial gap motor, so that axial gap motors for use in various applications can be provided.

Twelfth Embodiment

Figure 41:
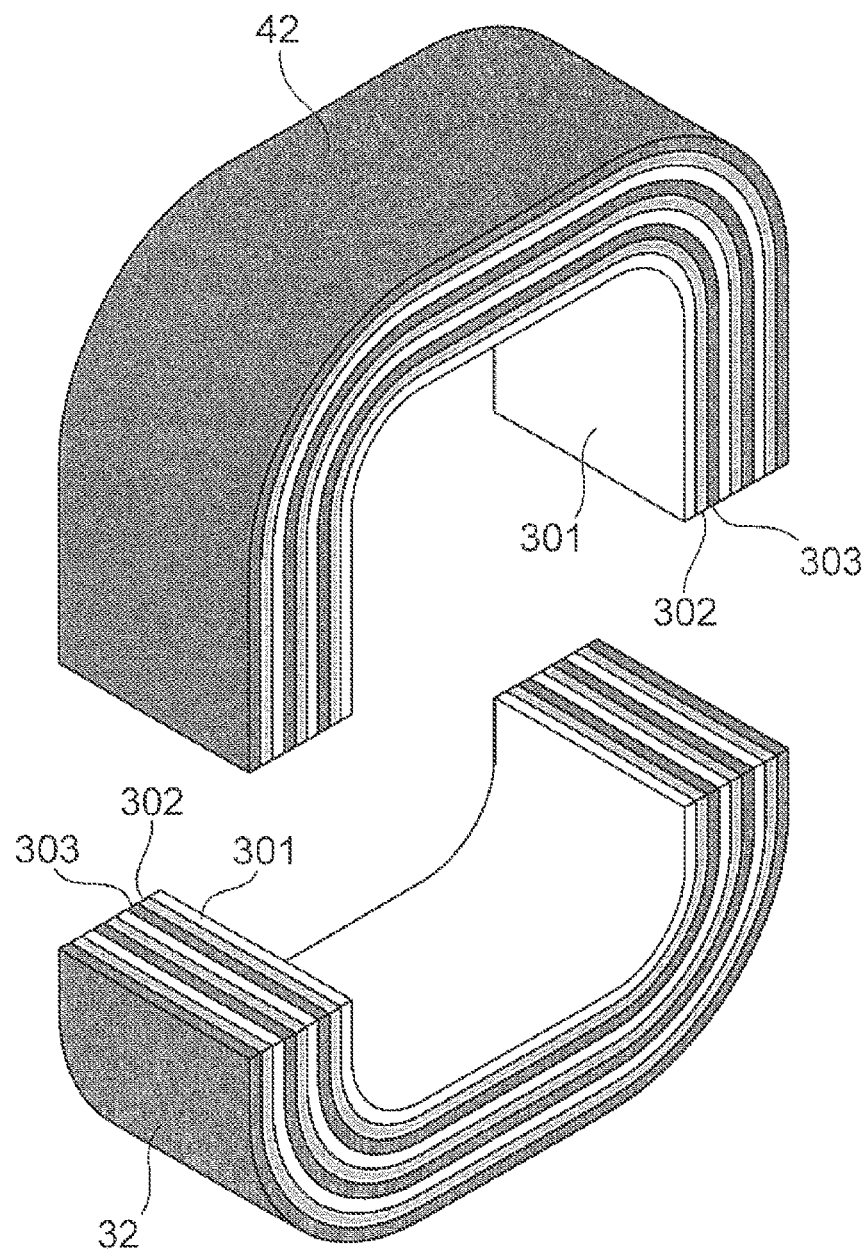
FIG. 41 is a perspective view showing a stator core and a rotor core of an axial gap motor according to a twelfth embodiment of the disclosure.

Referring to FIG. 41, an axial gap motor 1 according to a twelfth embodiment of the disclosure will be described. In the axial gap motor 1 of this embodiment, each of the rotor cores 32 and the stator cores 42 is formed by curving a plurality of types of strip-shaped soft magnetic materials into a U shape and stacking the soft magnetic materials such that adjacent ones of the soft magnetic materials are different from each other.

More specifically, each of the rotor cores 32 and the stator cores 42 is a cut core formed in the U-shape, and is a laminate of a plurality of thin sheets having the same width and made of three types of soft magnetic materials (a first material 301, a second material 302, and a third material 303). In each core, the first material 301, second material 302, and third material 303 are arranged in this order, from the inner side to the outer side.

Figure 42:
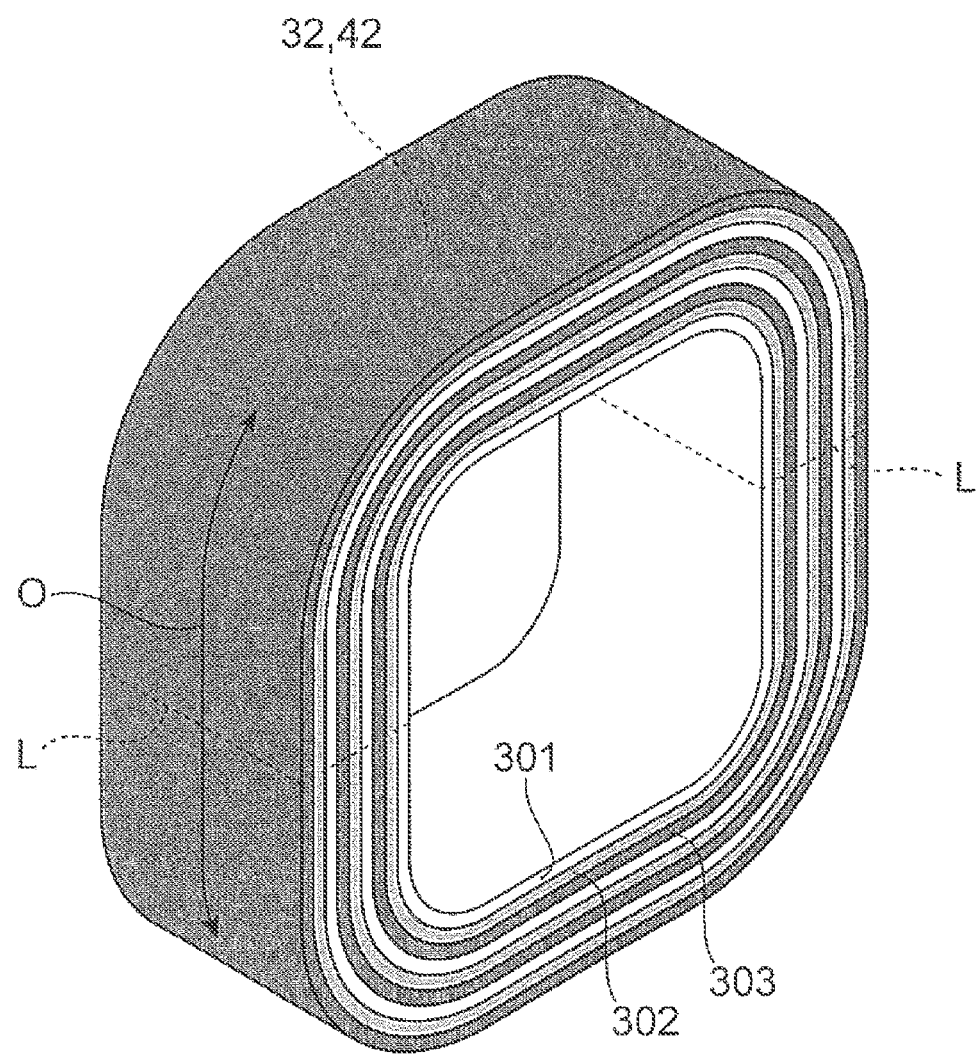
FIG. 42 is a perspective view useful for describing a method of producing the rotor core and stator core of the axial gap motor according to the twelfth embodiment of the disclosure.

The rotor cores 32 and stator cores 42 having the above structure are formed in the manner as follows, for example. As shown in FIG. 42, a wound body is formed by winding the strip-shaped first material 301, second material 302, and third material 303 having the same width to provide a predetermined number of turns, while arranging the first material 301, second material 302, and third material 303 in this order from the inner side to the outer side. Then, the wound body thus formed is divided into two segments in a direction intersecting with the circumferential direction (arrow O direction), to form the cores. In FIG. 42, the wound body is divided at the position L.

With this embodiment, various types of axial gap motors, such as high-speed and low-loss type, low-speed and high-torque type, and low cost type, having a multi-layer structure can be provided, depending on the use of the axial gap motor, by using different soft magnetic materials for the rotor cores 32 and the stator cores 42. Thus, variations in the axial gap motors can be increased.

The soft magnetic materials used in this embodiment may be selected from cold-rolled steel sheets, hot-rolled steel sheets, non-oriented magnetic steel sheets, oriented magnetic steel sheets, PC permalloy, PB permalloy, permendur, nanocrystalline soft magnetic material, amorphous soft magnetic material, ferritic soft magnetic material, and so forth. When a ferrite core having a U-shaped cross section is formed using a strip-shaped ferritic soft magnetic material, the ferrite core is sandwiched between and integrated with an outer metallic core and an inner metallic core, so that a high-speed (high-frequency) axial gap motor having a small iron loss can be provided.

Also, when permalloy, nanocrystalline soft magnetic material, or amorphous soft magnetic material, which is coated with no insulating film, is sandwiched between oriented magnetic steel sheets coated with insulating films, or non-oriented magnetic steel sheets coated with insulating films, to provide a wound core, there is no need to perform insulating treatment on between adjacent sheets, and thus, an axial gap motor having a small iron loss can be provided. Further, when permendur coated with no insulating film is sandwiched between oriented magnetic steel sheets coated with insulating films, or non-oriented magnetic steel sheets coated with insulating films, to provide a wound core, an axial gap motor having a high magnetic flux density, or high torque, can be provided. Further, since the rotor core has a smaller space factor, the rotor core may have an increased cross-sectional area provided by the cold-rolled steel sheet (s) or hot-rolled steel sheet(s), so that an axial gap motor can be provided at a relatively low cost.

Thirteenth Embodiment

Figure 43:
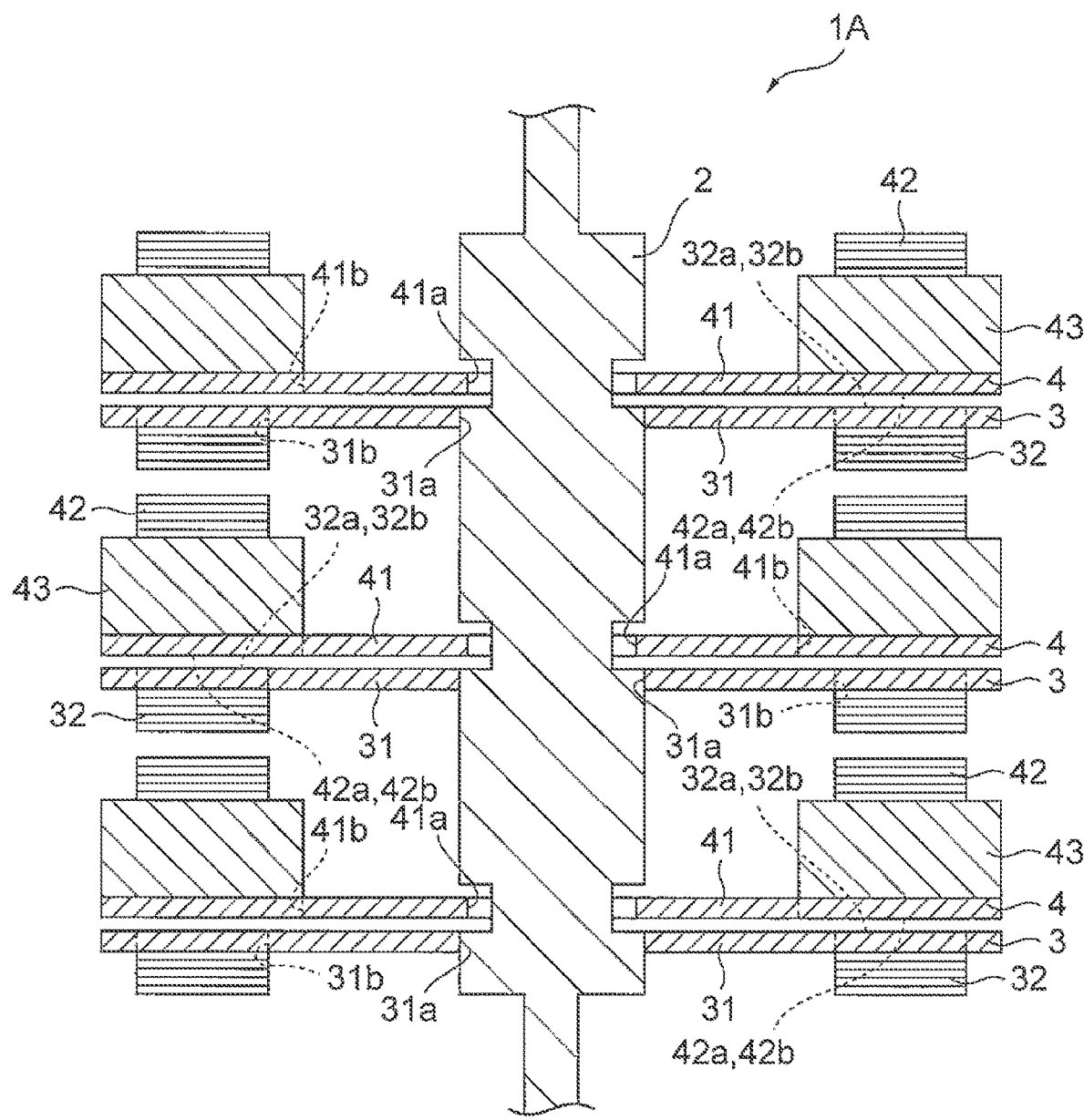
FIG. 43 is a schematic cross-sectional view showing the configuration of an axial gap motor according to a thirteenth embodiment of the disclosure.
Figure 44:
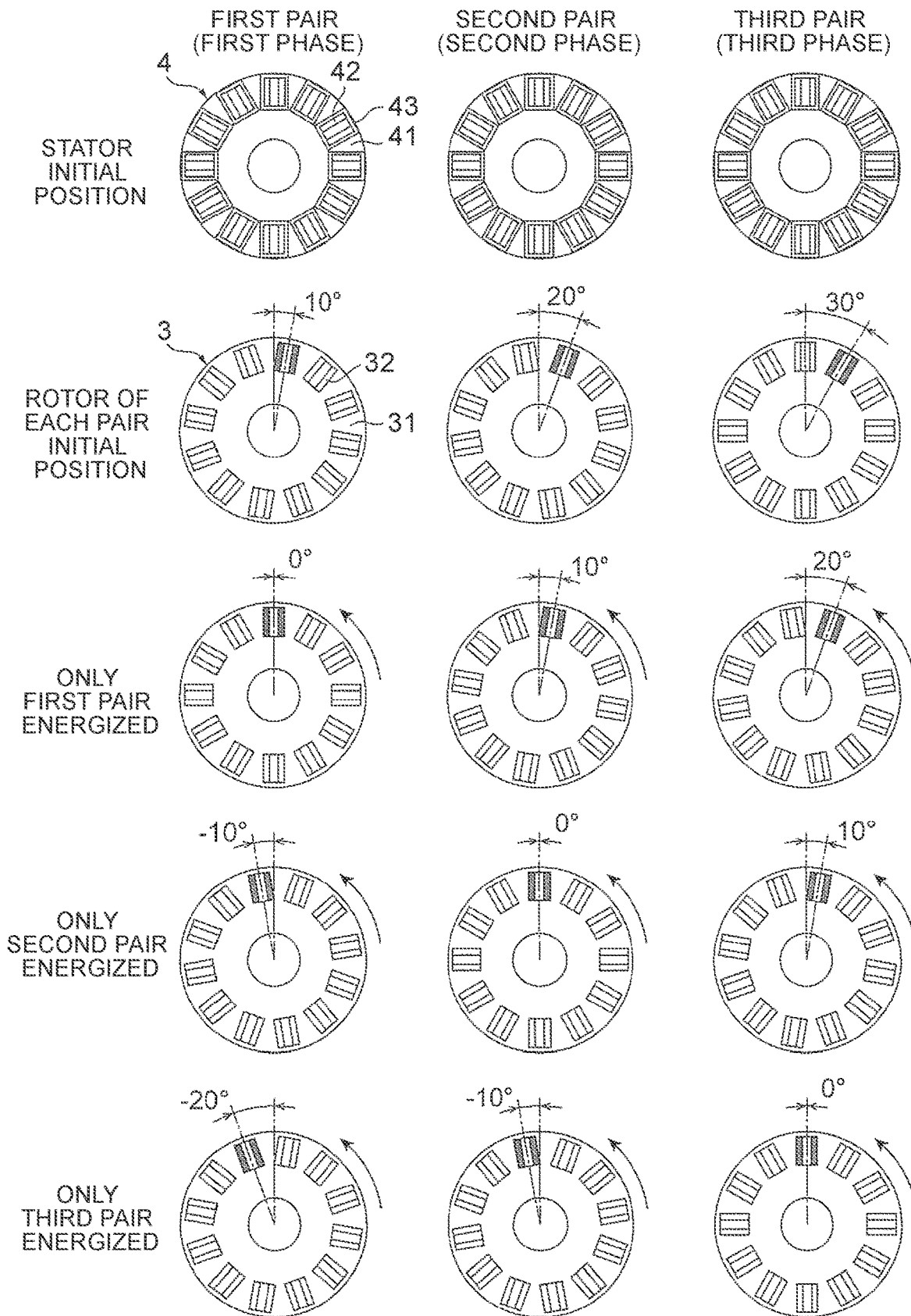
FIG. 44 is a cross-sectional view useful for describing energization of the axial gap motor according to the thirteen embodiment of the disclosure.

Referring next to FIG. 43 and FIG. 44, an axial gap motor 1A according to a thirteenth embodiment of the disclosure will be described. The axial gap motor 1A of this embodiment is different from those of the above embodiments in terms of the orientation of the rotor cores 32 and the stator cores 42. Namely, in the first embodiment through the twelfth embodiment, the stator core 42 and the rotor core 32 are oriented such that the winding width direction of each core is in parallel with the circumferential direction of the base of the core. On the other hand, in this embodiment, the stator core 42 and the rotor core 32 are oriented such that the width direction (namely, the winding width direction) of each core is in parallel with the radial direction of the base of the core.

More specifically, as shown in FIG. 43, the axial gap motor 1A of this embodiment is a three-phase drive motor, and has three pairs of stators 4 and rotors 3 stacked in the axial direction of the rotary shaft 2. The stators 4 and rotors 3 of the three pairs are alternately arranged (specifically, in the order of the first stator 4, first rotor 3, second stator 4, second rotor 3, third stator 4, and third rotor 3) in the axial direction of the rotary shaft 2. On the paper of FIG. 43, the stator 4 and rotor 3 located in the upper section will be referred to as the first pair, and the stator 4 and rotor 3 located in the lower section will be referred to as the third pair, while the stator 4 and rotor 3 located between the first pair and the third pair will be referred to as the second pair. In FIG. 43, a case that houses the stators 4 and the rotors 3 is not illustrated.

As shown in FIG. 43 and FIG. 44, the stator 4 consists of a disk-shaped stator base 41 made of a non-magnetic material, 12 pieces (in other words, 12 poles) of stator cores 42 fixed and arranged in a circumferential direction of the stator base 41, and coils 43 wound around the stator cores 42, like the stator 4 of the first embodiment, for example. While each stator core 42 has a structure similar to that of the stator core 42 of the first embodiment, the stator core 42 is inserted in and fixed to the through holes 41b, in a condition where its winding width direction is in parallel with the radial direction of the stator base 41, in other words, the direction of lamination of the strip-shaped soft magnetic material in the end faces 42a, 42b of the stator core 42 is in parallel with the circumferential direction of the stator base 41, unlike the stator core 42 of the first embodiment.

The rotor 3 consists of a disk-shaped rotor base 31, and 12 pieces (in other words, 12 poles) of rotor cores 32 fixed and arranged in the circumferential direction of the rotor base 31, like the rotor 3 of the first embodiment, for example. While each rotor core 32 has a structure similar to that of the rotor core 32 of the first embodiment, the rotor core 32 is inserted in and fixed to the through holes 31b, in a condition where its winding width direction is in parallel with the radial direction of the rotor base 31, in other words, the direction of lamination of the strip-shaped soft magnetic material in the end faces 32a, 32b of the rotor core 32 is in parallel with the circumferential direction of the rotor base 31, unlike the rotor core 32 of the first embodiment.

In the axial gap motor 1A of this embodiment, the number of poles of the stator cores 42 is equal to that of the rotor cores 32 (Ns=Nr=12). The axial gap motor 1A is driven by switching energization of each pair so that the rotor 3 of each pair is rotated by a step angle ε=360°/(3Ns=10°) upon each energization.

As shown in FIG. 44, in the initial position, the rotor cores 32 of the first pair are located at positions rotated 10° clockwise about the rotary shaft 2, relative to the stator cores 42 of the first pair. The rotor cores 32 of the second pair are located at positions rotated 20° clockwise about the rotary shaft 2, relative to the stator cores 42 of the second pair. The rotor cores 32 of the third pair are located at positions rotated 30° clockwise about the rotary shaft 2, relative to the stator cores 42 of the third pair.

Then, when only the coils 43 wound around the stator cores 42 of the first pair are energized (only the first pair is energized), magnetic flux is generated in the stator cores 42, and the rotor cores 32 of the first pair are attracted to the stator cores 42 due to the magnetic flux, so that the rotor 3 of the first pair is rotated 10° counterclockwise (see an arrow in FIG. 44). At this time, the rotors 3 of the second pair and third pair are also rotated 10° counterclockwise, respectively, in accordance with rotation of the rotor 3 of the first pair. Accordingly, as a result of energization of only the coils 43 wound around the stator cores 42 of the first pair, the rotor cores 32 of the first pair are positioned at 0° relative to the stator cores 42 of the first pair (namely, the rotor cores 32 and the stator cores 42 of the first pair are located at the same angular positions), and the rotor cores 32 of the second pair are positioned at 10° clockwise relative to the stator cores 42 of the second pair, while the rotor cores 32 of the third pair are positioned at 20° clockwise relative to the stator cores 42 of the third pair, as shown in FIG. 44.

Subsequently, when only the coils 43 wound around the stator cores 42 of the second pair are energized (only the second pair is energized), magnetic flux is generated in the stator cores 42, and the rotor cores 32 of the second pair are attracted to the stator cores 42 due to the magnetic flux, so that the rotor 3 of the second pair is rotated 10° counterclockwise. At this time, the rotors 3 of the first pair and third pair are also rotated 10° counterclockwise, respectively, in accordance with rotation of the rotor 3 of the second pair. Accordingly, as a result of energization of only the coils 43 wound around the stator cores 42 of the second pair, the rotor cores 32 of the first pair are positioned at 10° (−10° in FIG. 44) counterclockwise relative to the stator cores 42 of the first pair, and the rotor cores 32 of the second pair are positioned at 0° relative to the stator cores 42 of the second pair (namely, the rotor cores 32 and the stator cores 42 of the second pair are located at the same angular positions), while the rotor cores 32 of the third pair are positioned at 10° clockwise relative to the stator cores 42 of the third pair, as shown in FIG. 44.

Subsequently, when only the coils 43 wound around the stator cores 42 of the third pair are energized (only the third pair is energized), magnetic flux is generated in the stator cores 42, and the rotor cores 32 of the third pair are attracted to the stator cores 42 due to the magnetic flux, so that the rotor 3 of the third pair is rotated 10° counterclockwise. At this time, the rotors 3 of the first pair and second pair are also rotated 10° counterclockwise, respectively, in accordance with rotation of the rotor 3 of the third pair. Accordingly, as a result of energization of only the coils 43 wound around the stator cores 42 of the third pair, the rotor cores 32 of the first pair are positioned at 20° (−20° in FIG. 44) counterclockwise relative to the stator cores 42 of the first pair, and the rotor cores 32 of the second pair are positioned at 10° (−10° in FIG. 44) counterclockwise relative to the stator cores 42 of the second pair, while the rotor cores 32 of the third pair are positioned at 0° relative to the stator cores 42 of the third pair (namely, the rotor cores 32 and the stator cores 42 of the third pair are located at the same angular positions), as shown in FIG. 44.

Then, energization of each pair is switched repeatedly, so that the rotor 3 is continuously rotated.

In the axial gap motor 1A of this embodiment, the stator cores 42 and the rotor cores 32 are oriented such that the width direction of each of the cores is in parallel with the radial direction of the stator or rotor base. Thus, as compared with the case where the stator cores 42 and the rotor cores 32 are oriented such that the width direction of each of the cores is in parallel with the circumferential direction of the stator or rotor base (for example, the axial gap motor of the first embodiment), the torque average radius and the core width needed for rotation can be increased, and the torque can be further increased. The torque average radius mentioned herein means the distance from the center of the rotary shaft 2 to an intersecting point of the axis of the center of curvature of curved portions of the stator core 42 and the central axis of the stator core 42 in the winding width direction.

As shown in TABLE 6 below, the inventors of this application prepared a sample of the first embodiment in which the stator cores and the rotor cores are oriented such that the width direction of each core is in parallel with the circumferential direction of the base, and a sample of this embodiment in which the stator cores and the rotor cores are oriented such that the width direction of each core is in parallel with the radial direction of the base. When these samples were compared with each other under the same condition (Ns=6, Nr=4), the torque average radius of the sample of this embodiment was about 1.1 times as large as that of the sample of the first embodiment, and the core width of the sample of this embodiment was about 1.2 times as large as that of the sample of the first embodiment, while the torque ratio per core of the sample of this embodiment was about 1.4 times as large as that of the sample of the first embodiment.

TABLE 6

| Ns = 6, Nr = 4 | Torque Average Radius | Core Width | Torque Ratio per Core |
|---|---|---|---|
| Sample of First Embodiment (core width direction in parallel with base circumferential direction) | 1 | 1 | 1 |
| Sample of this Embodiment (core width direction in parallel with base radial direction) | 1.1 | 1.2 | 1.4 |

While some embodiments of the disclosure have been described in detail, the disclosure is not limited to the illustrated embodiments, but various changes in design may be made, without departing from the principle of the disclosure described in the appended claims. For example, the disclosure may be applied to combinations of two or more of the illustrated embodiments.

What is claimed is:

1. An axial gap motor comprising a rotor fixed to a rotary shaft, and a stator opposed to the rotor in an axial direction of the rotary shaft with a gap provided between the stator and the rotor, wherein:
the rotor includes a rotor base made of a non-magnetic material, and a plurality of rotor cores fixed and arranged in a circumferential direction of the rotor base;
the stator includes a stator base made of a non-magnetic material, a plurality of stator cores fixed and arranged in a circumferential direction of the stator base, and coils wound around the stator cores;
each of the rotor cores is made of a soft magnetic material, and has a first end face and a second end face;
the rotor cores are curved, such that the first end face and the second end face face in the same direction;
each of the stator cores is made of a soft magnetic material, and has a third end face and a fourth end face;
the stator cores are curved, such that the third end face and the fourth end face face in the same direction;
the first end face and the second end face of each of the rotor cores and the third end face and the fourth end face of each of the stator cores are in exposed states; and
the first end face and the second end face of each of the rotor cores are respectively opposed to the third end face and the fourth end face of a corresponding one of the stator cores,
wherein each of the rotor cores has an asymmetric structure in a width direction of the rotor core, and each of the rotor cores has a large-width inner portion that is disposed on a side closer to an axis of a center of curvature of the rotor core and protrudes in a rotational direction of the rotor, and a small-width outer portion disposed on a side remote from the axis of the center of curvature of the rotor core.

2. The axial gap motor according to claim 1, wherein:
the rotor comprises a first rotor and a second rotor, and the stator comprises a first stator and a second stator;
the first rotor and the second rotor are disposed between the first stator and the second stator, in the axial direction of the rotary shaft; and
a portion of each of the rotor cores of the first rotor opposite to the first end face and the second end face is fixed to a portion of each of the rotor cores of the second rotor opposite to the first end face and the second end face.

3. The axial gap motor according to claim 1, wherein:
a plurality of rows of the rotor cores is formed and fixed in the circumferential direction of the rotor base; and
a plurality of rows of the stator cores is formed and fixed in the circumferential direction of the stator base.

4. The axial gap motor according to claim 1, wherein:
each of the rotor cores is formed with the first end face and the second end face, by dividing a wound body comprising a plurality of turns of a strip-shaped soft magnetic material, in a direction intersecting with a circumferential direction of the wound body;
each of the stator cores is formed with the third end face and the fourth end face, by dividing the wound body comprising the plurality of turns of the strip-shaped soft magnetic material, in the direction intersecting with the circumferential direction of the wound body; and
the strip-shaped soft magnetic material comprises an oriented magnetic steel sheet having a crystal orientation that is aligned with a longitudinal direction.

5. The axial gap motor according to claim 1, wherein:
the rotary shaft has a rotor fixed portion to which the rotor base is fixed;
the stator base has an insertion hole in which the rotary shaft is inserted; and
the rotor fixed portion has a larger diameter than an inside diameter of the insertion hole of the stator base.

6. The axial gap motor according to claim 1, further comprising a case that rotatably supports the rotary shaft, and houses the rotor and the stator in a sealed state, wherein:
an interior of the case is partitioned by the stator base in the axial direction of the rotary shaft, into a first region in which the rotor is placed, and a second region in which the coils are placed; and
the case is provided with a coolant inlet and a coolant outlet which allow a coolant to flow through the second region.

7. The axial gap motor according to claim 1, wherein:
each of the stator cores has a first inner face and a second inner face that are opposed to each other and are provided continuously with the third end face and the fourth end face, respectively; and
where Lg is a distance between the first end face of each of the rotor cores and the third end face of each of the stator cores, Sr is an area of the first end face of each of the rotor cores, Wsc is a distance between the first inner face and the second inner face of each of the stator cores, and Ss is an area of the first inner face of each of the stator cores, Wsc/(2*Lg)≥20, Sr/Ss≥0.2 are satisfied.

8. The axial gap motor according to claim 1, wherein:
the axial gap motor has two or more pairs of the stator and the rotor which are stacked in the axial direction of the rotary shaft, and
in an initial position, the rotor cores of an (n+1)-th pair are located at positions rotated by an angle of ε/(n+1) about the rotary shaft, relative to the rotor cores of an n-th pair, and the stator cores of the (n+1)-th pair are located at positions rotated by the angle of ε/(n+1) about the rotary shaft, relative to the stator cores of the n-th pair, where ε is a step angle.

9. The axial gap motor according to claim 1, wherein, where Ns is the number of the stator cores, the rotor cores are inclined at an angle of 360°/Ns in a rotational direction of the rotor relative to a radial direction of the rotor base, about an intersecting point of an axis of a center of curvature of each of the rotor cores 32 and a central axis of each of the rotor cores in a width direction.

10. The axial gap motor according to claim 1, wherein the large-width inner portion of each of the rotor cores is made of a first soft magnetic material, and the small-width outer portion is made of a second soft magnetic material that is different from the first soft magnetic material.

11. The axial gap motor according to claim 10, wherein each of the stator cores has a constant width, and has an inner core portion that is disposed on a side closer to an axis of a center of curvature of the stator core, and is made of the same material as the large-width inner portion of each of the rotor cores, and an outer core portion that is disposed on a side remote from the axis of the center of curvature of the stator core, and is made of the same material as the small-width outer portion of each of the rotor cores.

12. An axial gap motor comprising a rotor fixed to a rotary shaft, and a stator opposed to the rotor in an axial direction of the rotary shaft with a gap provided between the stator and the rotor, wherein:
- the rotor includes a rotor base made of a non-magnetic material, and a plurality of rotor cores fixed and arranged in a circumferential direction of the rotor base;
- the stator includes a stator base made of a non-magnetic material, a plurality of stator cores fixed and arranged in a circumferential direction of the stator base, and coils wound around the stator cores;
- each of the rotor cores is made of a soft magnetic material, and has a first end face and a second end face;
- the rotor cores are curved, such that the first end face and the second end face face in the same direction;
- each of the stator cores is made of a soft magnetic material, and has a third end face and a fourth end face;
- the stator cores are curved, such that the third end face and the fourth end face face in the same direction;
- the first end face and the second end face of each of the rotor cores and the third end face and the fourth end face of each of the stator cores are in exposed states; and
- the first end face and the second end face of each of the rotor cores are respectively opposed to the third end face and the fourth end face of a corresponding one of the stator cores,
- wherein each of the rotor cores and the stator cores is a laminate body of a plurality of curved sheets comprising a plurality of types of strip-shaped soft magnetic materials, in which adjacent ones of the curved sheets are made of different types of soft magnetic materials.

13. An axial gap motor comprising a rotor fixed to a rotary shaft, and a stator opposed to the rotor in an axial direction of the rotary shaft with a gap provided between the stator and the rotor, wherein:
- the rotor includes a rotor base made of a non-magnetic material, and a plurality of rotor cores fixed and arranged in a circumferential direction of the rotor base;
- the stator includes a stator base made of a non-magnetic material, a plurality of stator cores fixed and arranged in a circumferential direction of the stator base, and coils wound around the stator cores;
- each of the rotor cores is made of a soft magnetic material, and has a first end face and a second end face;
- the rotor cores are curved, such that the first end face and the second end face face in the same direction;
- each of the stator cores is made of a soft magnetic material, and has a third end face and a fourth end face;
- the stator cores are curved, such that the third end face and the fourth end face face in the same direction;
- the first end face and the second end face of each of the rotor cores and the third end face and the fourth end face of each of the stator cores are in exposed states; and
- the first end face and the second end face of each of the rotor cores are respectively opposed to the third end face and the fourth end face of a corresponding one of the stator cores, wherein:
- the axial gap motor has two or more pairs of the stator and the rotor stacked in the axial direction of the rotary shaft, and
- the number of poles of the stator cores is equal to that of the rotor cores, and the stator cores and the rotor cores are oriented such that a width direction of each of the stator cores is in parallel with a radial direction of the stator base, and a width direction of each of the rotor cores is in parallel with a radial direction of the rotor base; and
- where Ns is the number of the stator cores, and $\varepsilon$ is a step angle that is equal to $360°/(3Ns)$, energization of each pair is switched, such that the rotor of each pair is rotated by $\varepsilon$ upon each energization.

\* \* \* \* \*